(12) United States Patent
Belen et al.

(10) Patent No.: US 12,049,967 B2
(45) Date of Patent: Jul. 30, 2024

(54) PIPE COUPLINGS

(71) Applicant: ASC Engineered Solutions, LLC, Portsmouth, NH (US)

(72) Inventors: Jordan Cameron Belen, West Warwick, RI (US); Thomas Borawski, Coventry, RI (US); Matthew William McNamara, Portsmouth, RI (US)

(73) Assignee: ASC ENGINEERED SOLUTIONS, LLC, Exeter, NH (US)

( * ) Notice: Subject to any disclaimer, the term of this patent is extended or adjusted under 35 U.S.C. 154(b) by 0 days.

(21) Appl. No.: 18/125,261

(22) Filed: Mar. 23, 2023

(65) Prior Publication Data

US 2023/0228351 A1    Jul. 20, 2023

Related U.S. Application Data

(62) Division of application No. 16/591,156, filed on Oct. 2, 2019, now Pat. No. 11,644,130, which is a division
(Continued)

(51) Int. Cl.
*F16L 21/00*    (2006.01)
*F16L 17/04*    (2006.01)
(Continued)

(52) U.S. Cl.
CPC ............. *F16L 21/005* (2013.01); *F16L 17/04* (2013.01); *F16L 23/04* (2013.01); *F16L 23/22* (2013.01); *F16L 3/1066* (2013.01)

(58) Field of Classification Search
CPC ......... F16L 21/065; F16L 21/03; F16L 17/04; F16L 23/04
See application file for complete search history.

(56) References Cited

U.S. PATENT DOCUMENTS 1,541,601 A    6/1925    Tribe
2,744,771 A    5/1956    Laurent
(Continued)

FOREIGN PATENT DOCUMENTS

DE    10006029    8/2001
GB    2169682    7/1986
(Continued)

OTHER PUBLICATIONS

Ohnemus, Gregory Nicholas Stagliano; Final Office Action for U.S. Appl. No. 15/378,125, filed Dec. 14, 2016, mailed Feb. 17, 2022, 32 pgs.
(Continued)

*Primary Examiner* — Matthew Troutman
*Assistant Examiner* — Fannie C Kee
(74) *Attorney, Agent, or Firm* — McAndrews, Held & Malloy, Ltd.

(57) ABSTRACT

A method of installing a 3-piece pipe coupling to connect a first pipe element to a second pipe element includes the steps of bringing the 3-piece pipe coupling into engagement with a first connection groove located proximate a first pipe element end of the first pipe element and with a second connection groove located proximate a second pipe element end of the second pipe element, the 3-piece pipe coupling comprising three pieces; and tightening the 3-piece pipe coupling about the first and second pipe element ends with a fastener extending through a first fastener pad and through a second fastener pad formed at respective distal ends of two pieces of the three pieces comprising the 3-piece pipe coupling.

11 Claims, 51 Drawing Sheets

Related U.S. Application Data of application No. 15/378,125, filed on Dec. 14, 2016, now Pat. No. 11,378,208.

(51) Int. Cl.
*F16L 23/04* (2006.01)
*F16L 23/22* (2006.01)
*F16L 3/10* (2006.01)

(56) References Cited

U.S. PATENT DOCUMENTS

| | | | | |
|---|---|---|---|---|
| 2,809,584 | A * | 10/1957 | Smith | F16L 21/065 |
| | | | | 446/212 |
| 3,042,430 | A * | 7/1962 | Granville | F16L 23/04 |
| | | | | 24/270 |
| 3,204,988 | A | 9/1965 | Ouderkirk et al. | |
| 3,351,352 | A | 11/1967 | Blakeley et al. | |
| 3,454,287 | A | 7/1969 | Thiessen | |
| 3,464,722 | A * | 9/1969 | Larkin | F16L 21/065 |
| | | | | 24/284 |
| 3,484,912 | A * | 12/1969 | Crain | F16L 23/04 |
| | | | | 24/279 |
| 4,186,947 | A | 2/1980 | Nixon | |
| 4,225,160 | A * | 9/1980 | Ortloff | F16L 23/04 |
| | | | | 285/408 |
| 4,350,350 | A | 9/1982 | Blakeley | |
| 4,522,434 | A | 6/1985 | Webb | |
| 4,568,115 | A * | 2/1986 | Zimmerly | F16L 21/065 |
| | | | | 285/411 |
| 4,714,229 | A * | 12/1987 | Force | F16L 21/065 |
| | | | | 248/62 |
| 4,722,561 | A | 2/1988 | Heckelthorn et al. | |
| 4,902,046 | A | 2/1990 | Maloberti | |
| 5,108,133 | A * | 4/1992 | Maloberti | F16L 23/04 |
| | | | | 285/34 |
| 5,498,042 | A | 3/1996 | Dole | |
| 5,527,073 | A | 6/1996 | Readman | |
| 5,911,446 | A | 6/1999 | McLennan et al. | |
| 5,947,533 | A | 9/1999 | Fisher et al. | |
| 6,170,884 | B1 | 1/2001 | McLennan et al. | |
| 6,234,545 | B1 * | 5/2001 | Babuder | F16L 23/04 |
| | | | | 285/364 |
| 6,312,025 | B1 | 11/2001 | Wolfsdorf | |
| 6,502,865 | B1 | 1/2003 | Steele | |
| 7,086,131 | B2 | 8/2006 | Gibb et al. | |
| 7,950,701 | B2 | 5/2011 | Dole et al. | |
| 8,028,378 | B2 * | 10/2011 | Shor | F16L 23/04 |
| | | | | 24/19 |
| 8,282,136 | B2 | 10/2012 | Vandal et al. | |
| 8,517,430 | B2 | 8/2013 | Dole et al. | |
| 8,733,799 | B2 | 5/2014 | Gibb et al. | |
| 8,979,137 | B2 * | 3/2015 | Kimura | F16L 23/04 |
| | | | | 285/411 |
| 10,641,419 | B2 | 5/2020 | Ohnemus | |
| 10,711,929 | B1 * | 7/2020 | Lu | F16L 21/065 |
| 10,851,928 | B1 | 12/2020 | Lu et al. | |
| 11,181,213 | B2 | 11/2021 | Ohnemus et al. | |
| 11,378,208 | B2 | 7/2022 | Ohnemus et al. | |
| 11,644,130 | B2 | 5/2023 | Belen et al. | |
| 2006/0214422 | A1 | 9/2006 | Cuvo et al. | |
| 2008/0100062 | A1 | 5/2008 | Aston | |
| 2008/0284159 | A1 | 11/2008 | Krehl | |
| 2010/0025992 | A1 | 2/2010 | Spence | |
| 2010/0194104 | A1 | 8/2010 | Hennemann et al. | |
| 2012/0248767 | A1 | 10/2012 | Lippka | |
| 2013/0187345 | A1 | 7/2013 | Beagan, Jr. | |
| 2013/0257045 | A1 | 10/2013 | Mikami | |
| 2014/0021719 | A1 | 1/2014 | Salehi-Bakhtiari et al. | |
| 2015/0176728 | A1 | 6/2015 | Bowman | |
| 2016/0010771 | A1 | 1/2016 | Cheng-Sheng | |
| 2018/0163905 | A1 | 6/2018 | Ohnemus et al. | |
| 2018/0163906 | A1 | 6/2018 | Ohnemus et al. | |
| 2020/0032934 | A1 | 1/2020 | Belen et al. | |
| 2020/0224803 | A1 | 7/2020 | Ohnemus et al. | |
| 2022/0042627 | A1 | 2/2022 | Ohnemus et al. | |

FOREIGN PATENT DOCUMENTS

| | | |
|---|---|---|
| GB | 2218768 | 11/1989 |
| WO | 0159350 | 8/2001 |
| WO | 2020183480 | 9/2020 |

OTHER PUBLICATIONS

Ohnemus, Gregory Nicholas Stagliano; Non-Final Office Action for U.S. Appl. No. 15/378,125, filed Dec. 14, 2016, mailed Feb. 3, 2021, 30 pgs.

Ohnemus, Gregory Nicholas Stagliano; Non-Final Office Action for U.S. Appl. No. 15/378,125, filed Dec. 14, 2016, mailed Mar. 27, 2020, 36 pgs.

Ohnemus, Gregory Nicholas Stagliano; Notice of Allowance for U.S. Appl. No. 15/378,125, filed Dec. 14, 2016, mailed Mar. 28, 2022, 6 pgs.

Ohnemus, Gregory Nicholas Stagliano; Requirement for Restriction/Election for U.S. Appl. No. 15/378,125, filed Dec. 14, 2016, mailed Jun. 21, 2019, 9 pgs.

Belen, Jordan Cameron; Final Office Action for U.S. Appl. No. 16/591,156, filed Oct. 2, 2019, mailed Jul. 13, 2022, 19 pgs.

Belen, Jordan Cameron; Non-Final Office Action for U.S. Appl. No. 16/591,156, filed Oct. 2, 2019, mailed Dec. 16, 2021, 37 pgs.

Belen, Jordan Cameron; Notice of Allowance for U.S. Appl. No. 16/591,156, filed Oct. 2, 2019, mailed Dec. 23, 2022, 9 pgs.

Belen, Jordan Cameron; Requirement for Restriction/Election for U.S. Appl. No. 16/591,156, filed Oct. 2, 2019, mailed Feb. 23, 2021, 8 pgs.

Ohnemus, Gregory Nicholas Stagliano; Applicant-Initiated Interview Summary for U.S. Appl. No. 15/378,138, filed Dec. 14, 2016, mailed Jul. 16, 2019, 7 pgs.

Ohnemus, Gregory Nicholas Stagliano; Final Office Action for U.S. Appl. No. 15/378,138, filed Dec. 14, 2016, mailed Oct. 8, 2019, 14 pgs.

Ohnemus, Gregory Nicholas Stagliano; Notice of Allowance for U.S. Appl. No. 15/378,138, filed Dec. 14, 2016, mailed Jan. 9, 2020, 5 pgs.

Ohnemus, Gregory Nicholas Stagliano; Requirement for Restriction/Election for U.S. Appl. No. 15/378,138, filed Dec. 14, 2016, mailed Jan. 17, 2019, 8 pgs.

Ohnemus, Gregory Nicholas Stagliano; Supplemental Notice of Allowance for U.S. Appl. No. 15/378,138, filed Dec. 14, 2016, mailed Apr. 3, 2020, 7 pgs.

Ohnemus, Gregory Nicholas Staliano; Non-Final Office Action for U.S. Appl. No. 15/378,138, filed Dec. 14, 2016, mailed Apr. 19, 2019, 19 pgs.

Ohnemus, Gregory Nicholas Stagliano; Applicant-Initiated Interview Summary for U.S. Appl. No. 16/836,294, filed Mar. 31, 2020, mailed Mar. 5, 2021, 2 pgs.

Ohnemus, Gregory Nicholas Stagliano; Final Office Action for U.S. Appl. No. 16/836,294, filed Mar. 31, 2020, mailed Jun. 11, 2021, 14 pgs.

Ohnemus, Gregory Nicholas Stagliano; Non-Final Office Action for U.S. Appl. No. 16/836,294, filed Mar. 31, 2020, mailed Dec. 21, 2020, 17 pgs.

Ohnemus, Gregory Nicholas Stagliano; Notice of Allowance for U.S. Appl. No. 16/836,294, filed Mar. 31, 2020, mailed Jul. 15, 2021, 5 pgs.

Ohnemus, Gregory Nicholas Stagliano; Supplemental Notice of Allowance for U.S. Appl. No. 16/836,294, filed Mar. 31, 2020, mailed Oct. 22, 2021, 6 pgs.

Ohnemus, Gregory Nicholas Stagliano; Non-Final Office Action for U.S. Appl. No. 15/378,125, filed Dec. 14, 2016, mailed Jul. 21, 2021, 35 pgs.

Ohnemus, Gregory Nicholas Stagliano; Non-Final Office Action for U.S. Appl. No. 17/508,574, filed Oct. 22, 2021, mailed Jul. 11, 2023, 30 pgs.

(56) References Cited

OTHER PUBLICATIONS

Ohnemus, Gregory Nicholas Stagliano; Requirement for Restriction/Election for U.S. Appl. No. 17/508,574, filed Oct. 22, 2021, mailed May 26, 2023, 5 pgs.
Ohnemus, Gregory Nicholas Stagliano; Applicant-Initiated Interview Summary for U.S. Appl. No. 17/508,574, filed Oct. 22, 2021, mailed Oct. 6, 2023, 2 pgs.
Ohnemus, Gregory Nicholas Stagliano; Final Office Action for U.S. Appl. No. 17/508,574, filed Oct. 22, 2021, mailed Dec. 11, 2023, 18 pgs.

* cited by examiner

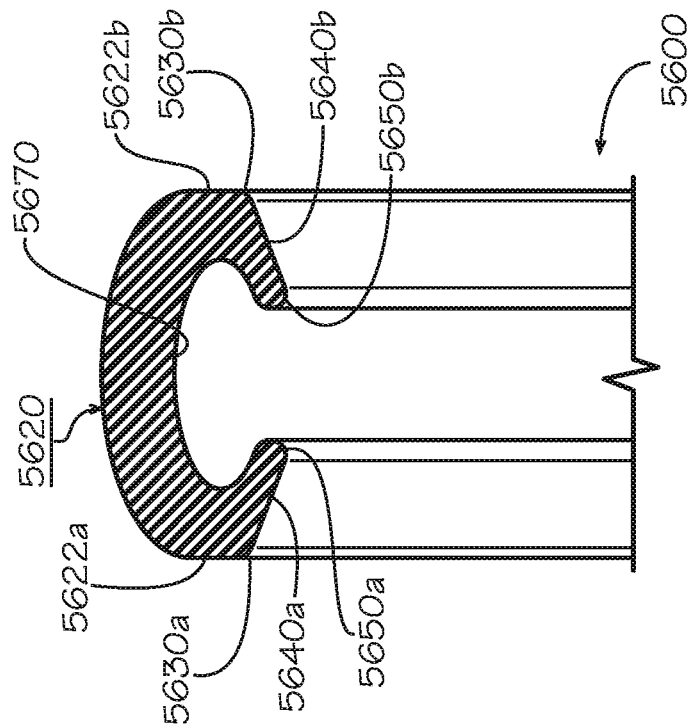
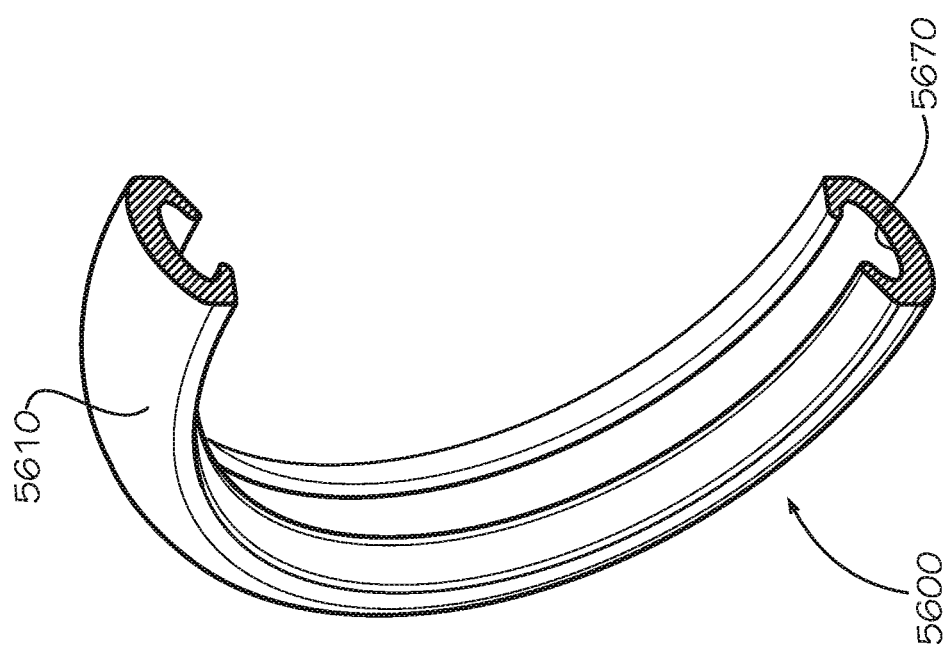

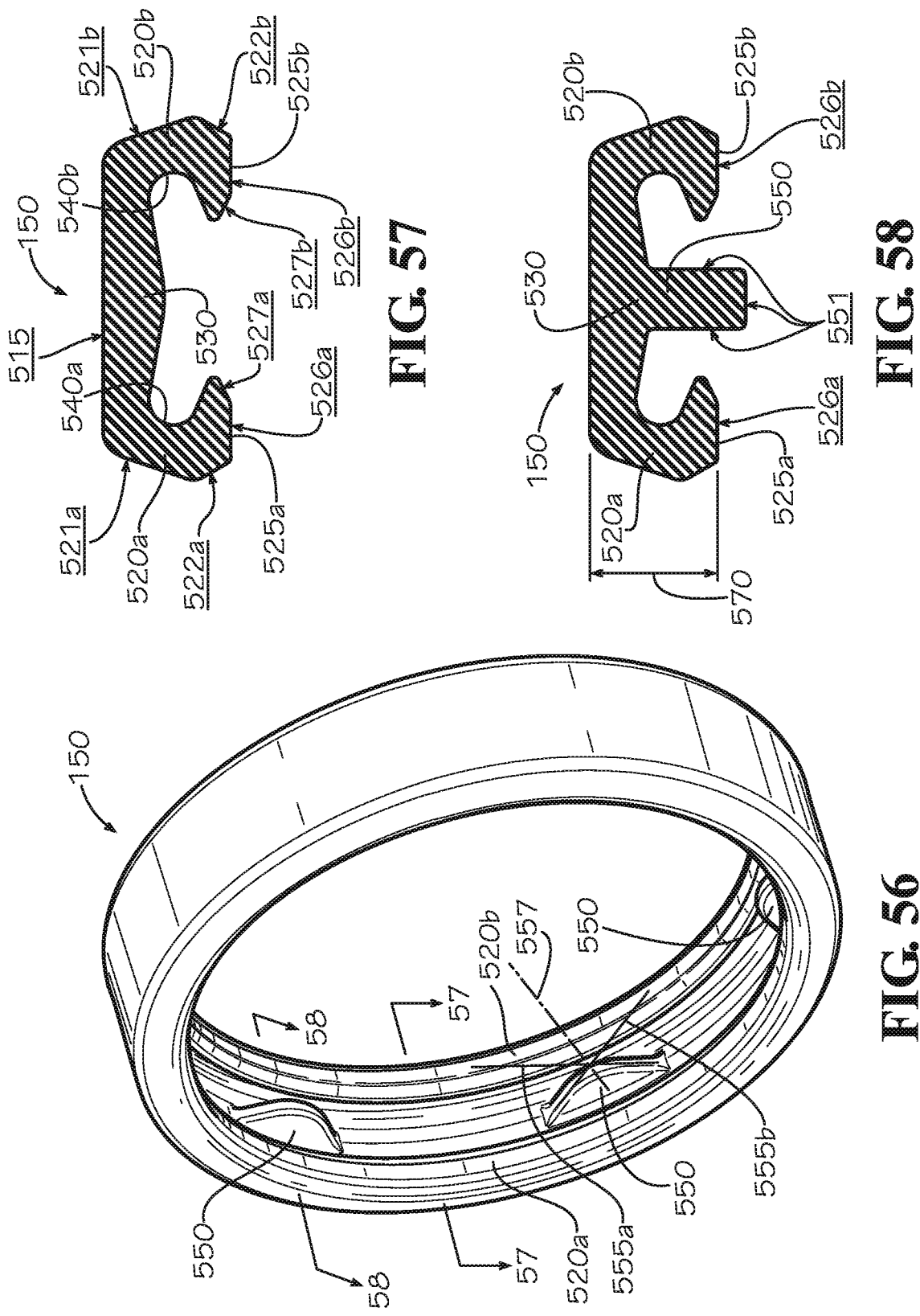

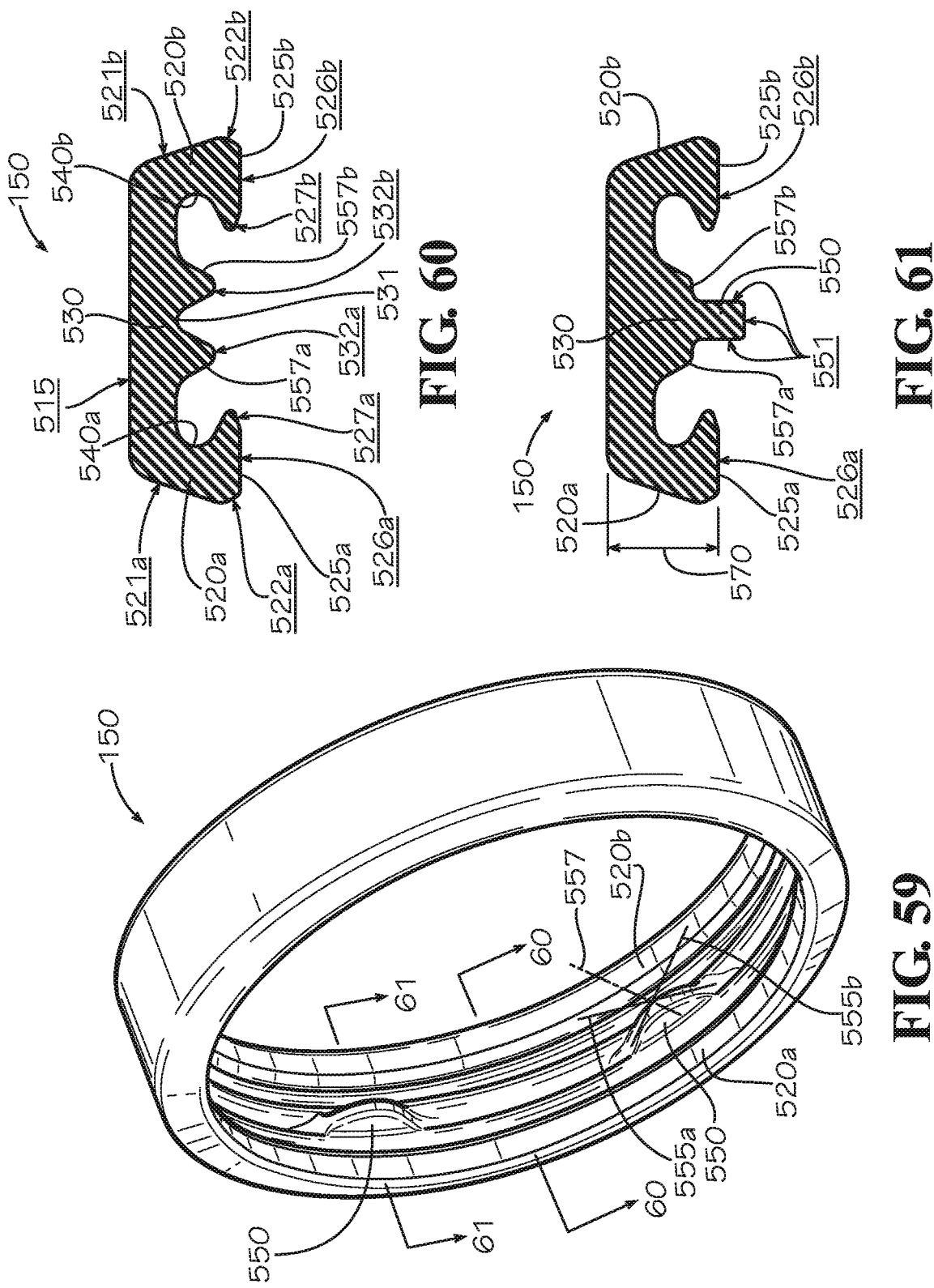

PIPE COUPLINGS

CROSS-REFERENCE TO RELATED APPLICATION

The present application is a division of U.S. patent application Ser. No. 16/591,156, filed Oct. 2, 2019, which is a division of U.S. patent application Ser. No. 15/378,125, filed Dec. 14, 2016, which issued as U.S. Pat. No. 11,378,208 on Jul. 5, 2022, the disclosures of which are hereby incorporated by reference herein in their entireties.

FIELD OF USE

This disclosure relates to piping. More specifically, this disclosure relates to pipe couplings.

RELATED ART

Pipe elements such as pipes, valves, and meters typically are not made of one piece. Rather, such pipe elements are formed in finite lengths and must be joined. One way of joining such pipe elements is with a pipe coupling. The pipe coupling typically includes a sealing member such as a gasket. Pipe couplings can be difficult to install, typically requiring the installation to both effectively seal a joint between the pipe elements and to prevent separation of the pipe elements against various internal or external forces.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pipe coupling comprising a first coupling segment defining opposed ends, one end of the first coupling segment defining a first pivotal mount, and another end of the first coupling segment defining a second pivotal mount; a second coupling segment defining opposed ends, a proximal end of the second coupling segment configured to pivotally connect to the first pivotal mount, and a distal end of the second coupling segment configured to receive a fastener; and a third coupling segment defining opposed ends, a proximal end of the third coupling segment configured to pivotally connect to the second pivotal mount, and a distal end of the third coupling segment configured to receive the fastener.

In another aspect, disclosed is a method of installing a pipe coupling to connect a first pipe element to a second pipe element, comprising the steps of bringing a 3-piece pipe coupling into engagement with a first connection groove located proximate a first pipe element end of the first pipe element and with a second connection groove located proximate a second pipe element end of the second pipe element; and tightening the 3-piece pipe coupling about the pipe element ends with a fastener extending through a first fastener pad and through a second fastener pad formed at respective distal ends of two of the three pieces comprising the pipe coupling.

In another aspect, disclosed is a method of installing a 3-piece pipe coupling to connect a first pipe element to a second pipe element, comprising the steps of bringing the 3-piece pipe coupling into engagement with a first connection groove located proximate a first pipe element end of the first pipe element and with a second connection groove located proximate a second pipe element end of the second pipe element, the 3-piece pipe coupling comprising three pieces; and tightening the 3-piece pipe coupling about the first and second pipe element ends with a fastener extending through a first fastener pad and through a second fastener pad formed at respective distal ends of two pieces of the three pieces comprising the 3-piece pipe coupling.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention. The drawings are not necessarily drawn to scale. Corresponding features and components throughout the figures may be designated by matching reference characters for the sake of consistency and clarity.

FIG. 53 is a perspective view of a semicircular portion of a gasket constructed according to another aspect of the current disclosure.

FIG. 54 is a sectional view of the gasket of FIG. 53.

FIG. 56 is a perspective view of a gasket for use in a pipe coupling such as the pipe coupling of FIG. 1 in accordance with another aspect of the current disclosure.

FIG. 57 is a sectional view of the gasket of FIG. 56 taken along line 57-57 in FIG. 56.

FIG. 58 is a sectional view of the gasket of FIG. 56 taken along line 58-58 in FIG. 56.

FIG. 59 is a perspective view of a gasket for use in a pipe coupling such as the pipe coupling of FIG. 1 in accordance with another aspect of the current disclosure.

FIG. 60 is a sectional view of the gasket of FIG. 59 taken along line 60-60 in FIG. 59.

FIG. 61 is a sectional view of the gasket of FIG. 59 taken along line 61-61 in FIG. 59.

DETAILED DESCRIPTION

Figure 1:
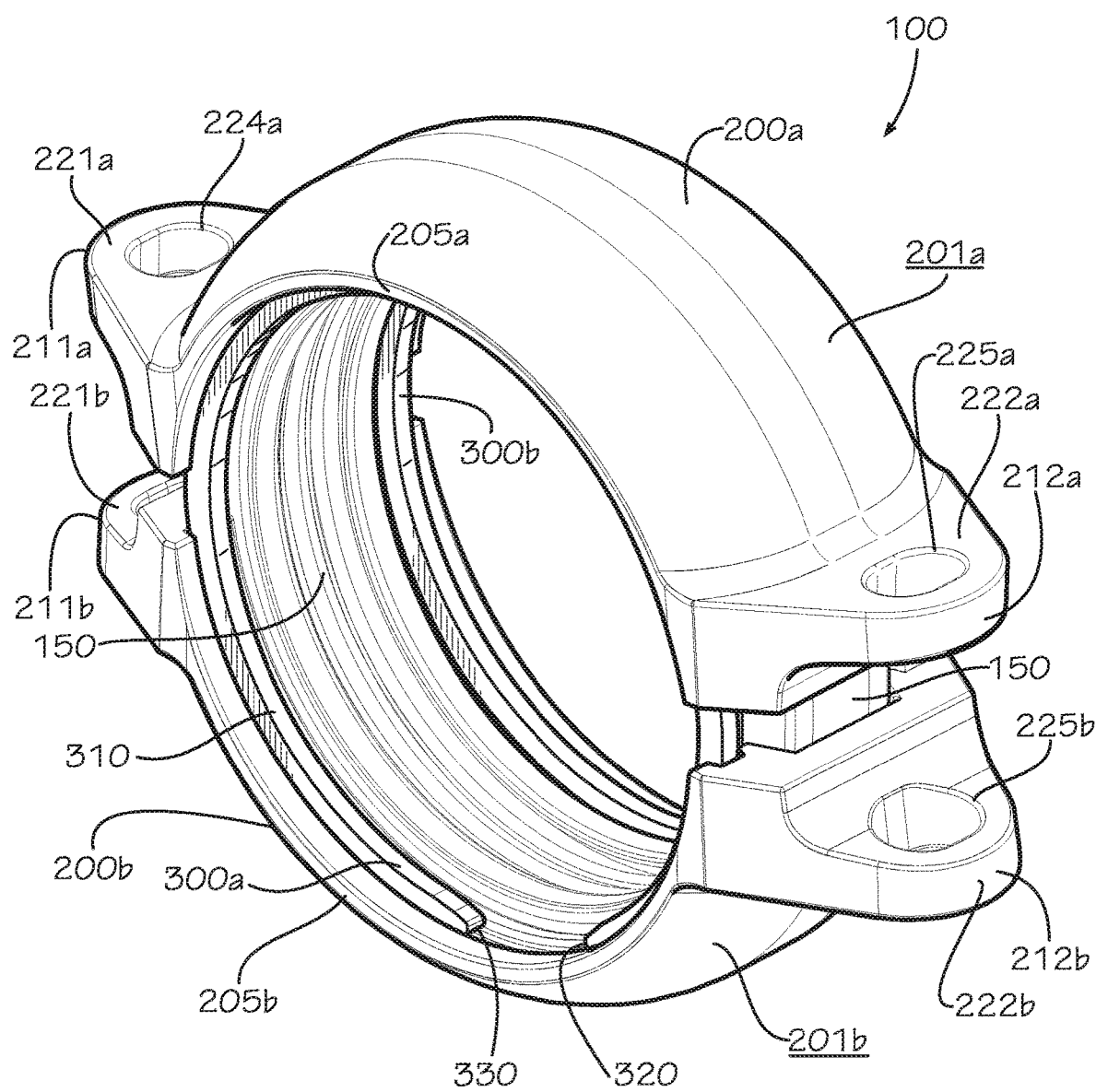
FIG. 1 is a perspective view of a pipe coupling in accordance with one aspect of the current disclosure.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a panel" can include two or more such yarn feed tubes unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a pipe coupling used to join two pipe elements such as two lengths of pipe employs a housing comprising two approximately semicircular coupling segments joined together with nuts and bolts at each end. In order to prevent leaking between the two pipe elements, a gasket is often secured around a joint created at the junction of the two pipe elements. The two coupling segments of the housing surround the gasket and press the gasket around the joint. It is contemplated that a pipe coupling such as that disclosed herein can have more than two coupling segments—for example and without limitation, three coupling segments, each occupying an arc length of approximately 120°; or four coupling segments, each occupying an arc length of approximately 90°. It is also contemplated that a pipe coupling such as that disclosed herein can have a single coupling segment that is able to slide over an end of a pipe element but which occupies an arc length of as much as 360° when tightened.

Pipe couplings—and pipe elements—are often cast. Certain features of cast parts may vary in size from one part to another or have surfaces that are rougher or have material properties that are different than if the parts—or certain features of those parts—were processed using a different method such as forging, machining, or stamping. In one aspect, securing the coupling segments to end-facing pipe elements using specifically one or more separate pipe connection rings that are disclosed herein can yield benefits to those who install, service, and otherwise rely on the convenience and integrity of the pipe connections.

With previous pipe coupling designs, workers must sometimes follow a significant number of steps to install a pipe coupling. Workers must typically disassemble the entire apparatus and remove the gasket from the housing. Approximately half of the gasket is then forced over one end of one pipe element. An end of the other pipe element is forced into the remaining portion of the gasket, thereby joining the two pipe elements together. To secure the pipe elements, the two halves of the housing are placed around the gasket and then nuts and bolts or other fastening devices are used to complete the installation. Typically, the inner diameter of the gasket is slightly smaller than the outer diameter of the pipe elements. Therefore, the worker must stretch the gasket around the pipe ends.

In one aspect, disclosed are a pipe coupling and associated methods, systems, devices, and various apparatus. The pipe coupling includes a coupling segment having an inner surface defining a gasket channel and a ring groove, the ring groove being proximate to an axial end of the coupling segment and defining a groove bottom surface extending from a first end of the coupling segment to a second end of the coupling segment. A gasket is disposed within the gasket channel, and a pipe connection ring is disposed within the ring groove, the pipe connection ring defining a body with two ring ends, the pipe connection ring contacting the groove bottom surface between the first end of the coupling segment and the second end of the coupling segment. The pipe connection ring may be a split ring defining an opening between the two ring ends, which may be square, tapered, angled, or stepped.

Figure 2:
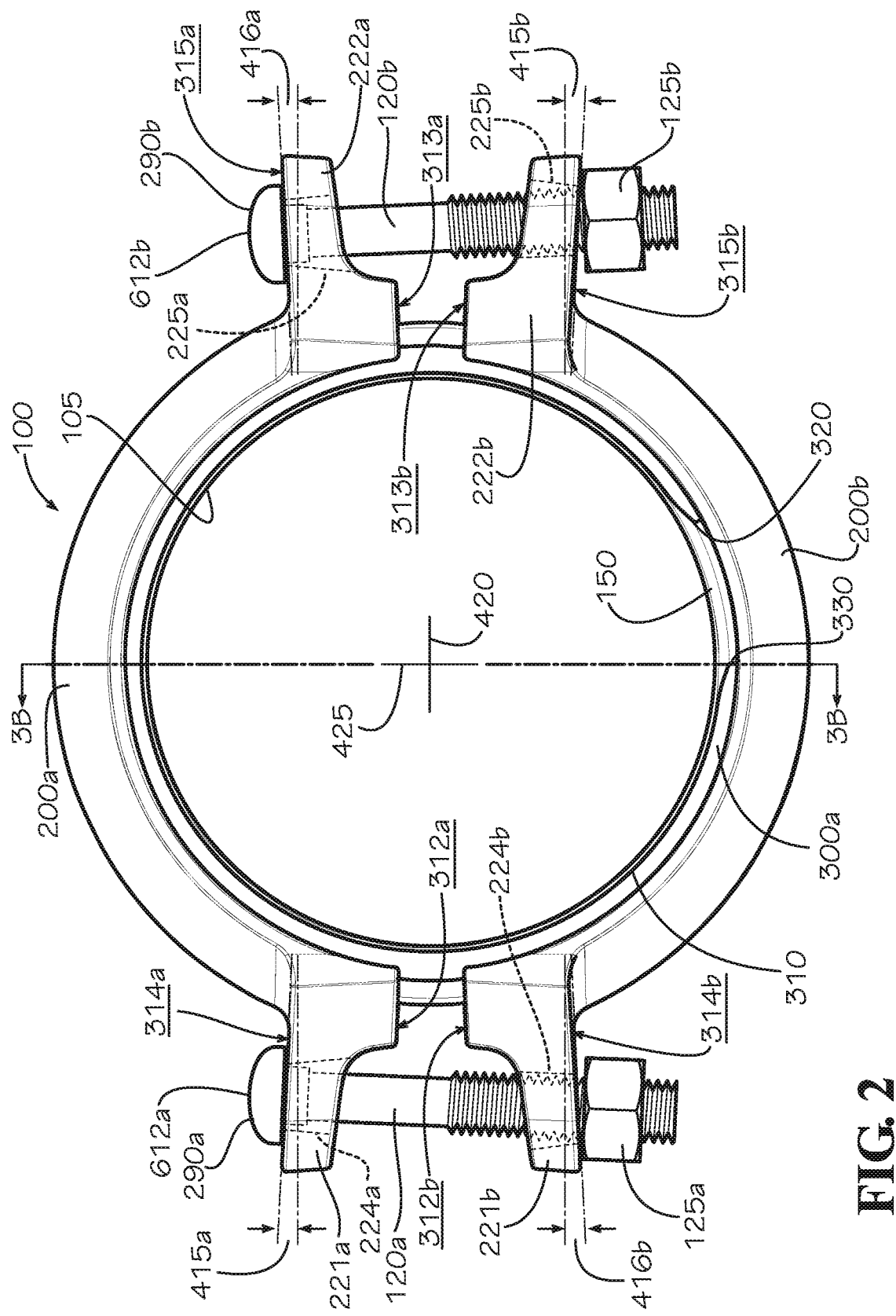
FIG. 2 is a front view of the pipe coupling of FIG. 1 in an assembled and untightened position.
Figure 3A:
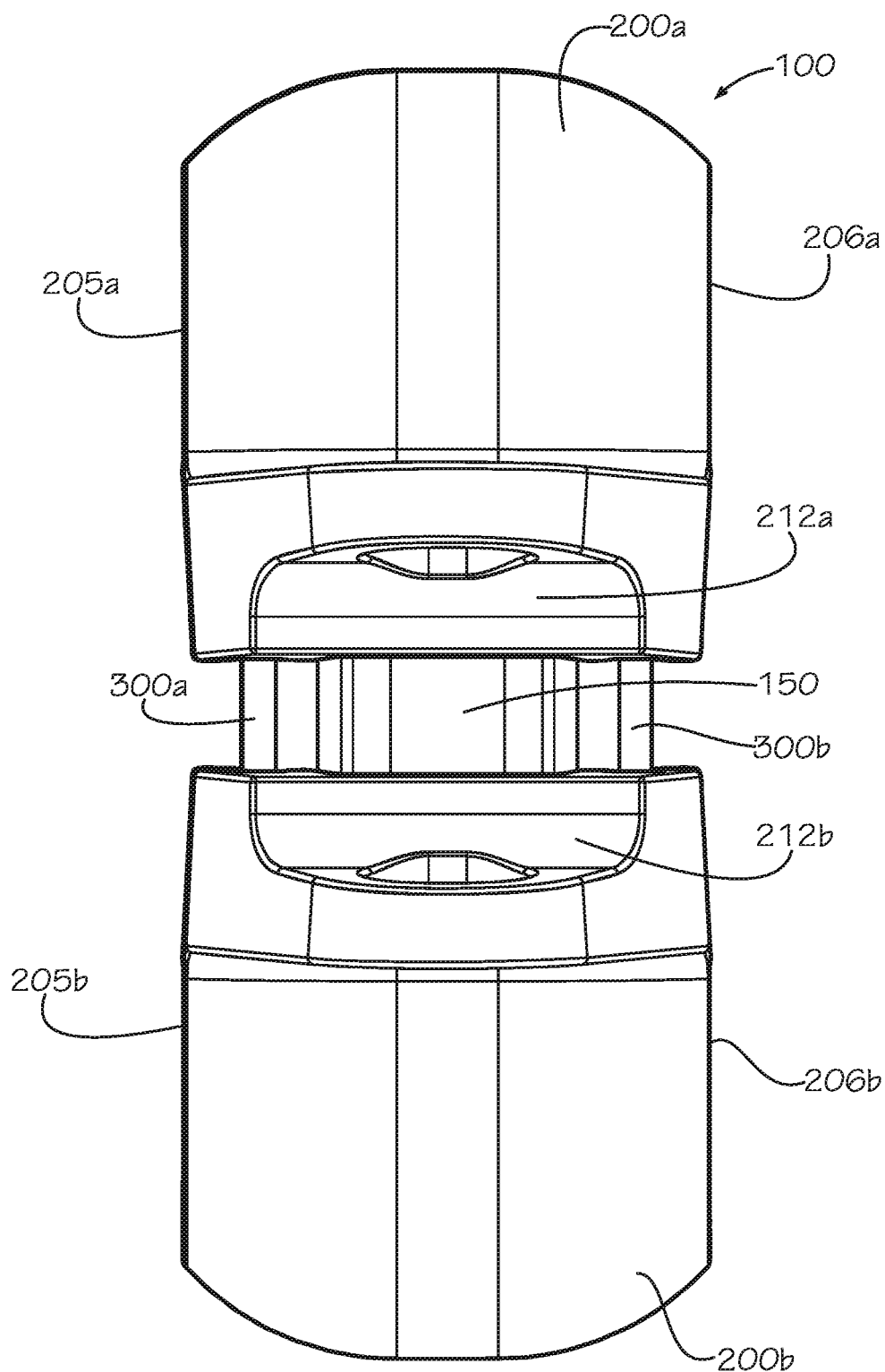
FIG. 3A is a side view of the pipe coupling of FIG. 1 in an assembled and untightened position with a fastener of the pipe coupling removed.
Figure 3B:
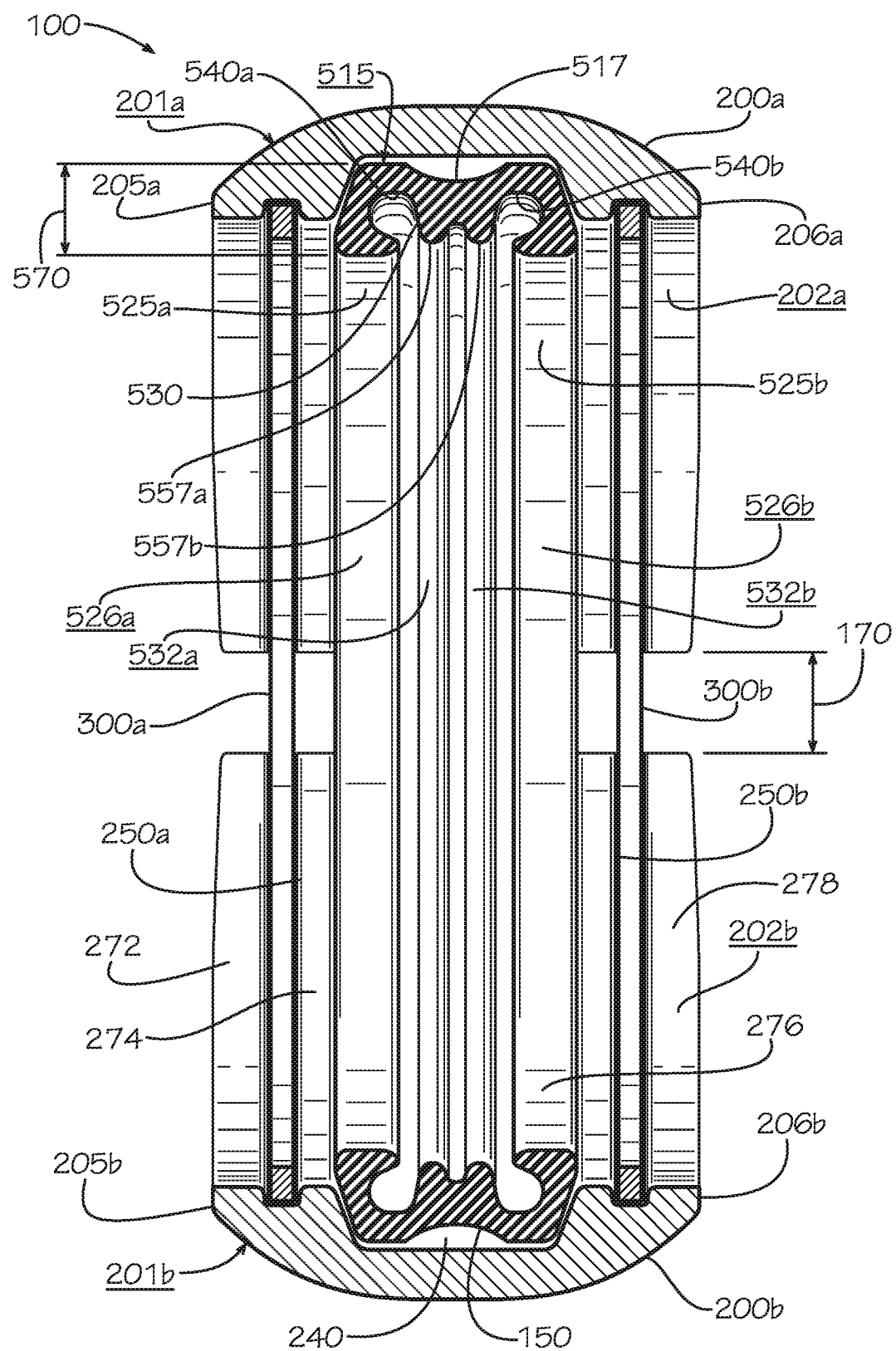
FIG. 3B is a sectional view of the pipe coupling of FIG. 1 taken along line 3B-3B of FIG. 2.
Figure 4:
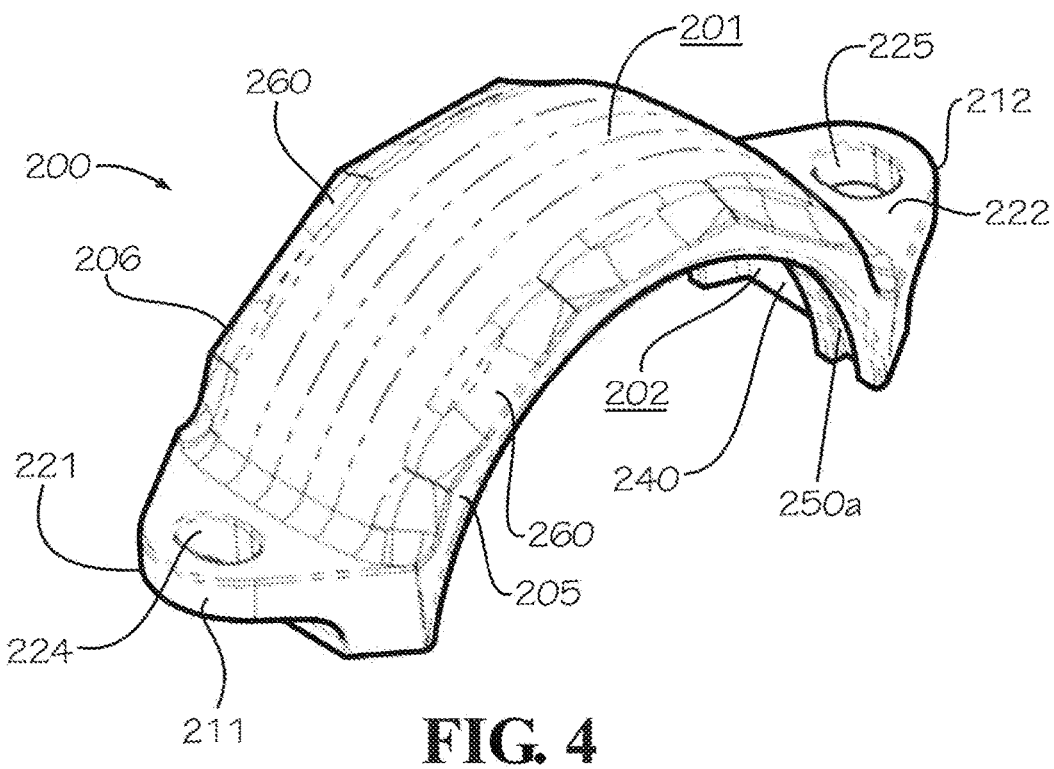
FIG. 4 is a perspective view of a coupling segment of the pipe coupling of FIG. 1 in accordance with another aspect of the current disclosure.

One aspect of a pipe coupling 100 is disclosed and described in FIGS. 1-3B. As shown, the pipe coupling 100 includes two coupling segments 200a,b. The fastening devices 290a,b—which can also be described as tightening elements—comprise, for example and without limitation, nut and bolt fasteners (shown in FIG. 2). Two bolts 120a,b are disposed to interact with nuts 125a,b in threaded engagement; however, other types of tightening elements may be used. Each of the coupling segments 200a,b of the pipe coupling 100 comprises a first end 211a,b, a second end 212a,b, an outer surface 201a,b, and an inner surface 202a,b (shown in FIG. 3B). As shown in FIG. 3B, each of the outer surfaces 201a,b is contoured to define a gently arched shape that is higher (or more radially outward) towards an axial midpoint of each coupling segment 200 and lower (or more radially inward) towards each of a pair of axial ends of each coupling segment 200. A pair of fastener pads 221a,222a protrude from coupling segment 200a proximate to the first end 211a and 212a, respectively. A pair of fastener pads 221b,222b protrude from coupling segment 200b proximate to the first end 211b and 212b, respectively. Fastener holes 224a,b,225a,b are defined in fastener pads 221a,b,222a,b, respectively. As shown, the fastener holes 224a,b,225a,b are centered within the fastener pads 221a,b,222a,b, although the fastener holes 224a,b,225a,b may be offset from the center of the fastener pads 221a,b,222a,b. Although the fastener pads 221a,b,222a,b and fastener holes 224a,b, 225a,b are described in the current configuration, various locations and configurations of fastener pads 221a,b,222a,b and fastener holes 224a,b,225a,b may be used. As shown in FIGS. 3A and 3B, the upper and lower coupling segments 200a,b respectively include first axial ends 205a,b and second axial ends 206a,b. The pipe coupling 100 includes a gasket 150. As shown, the gasket 150 is annular and configured to surround and to seal a joint formed by a pair of pipe elements such as pipe elements 110,120 (shown in FIGS. 20A-20E) that are joined end-to-end.

Figure 11A:
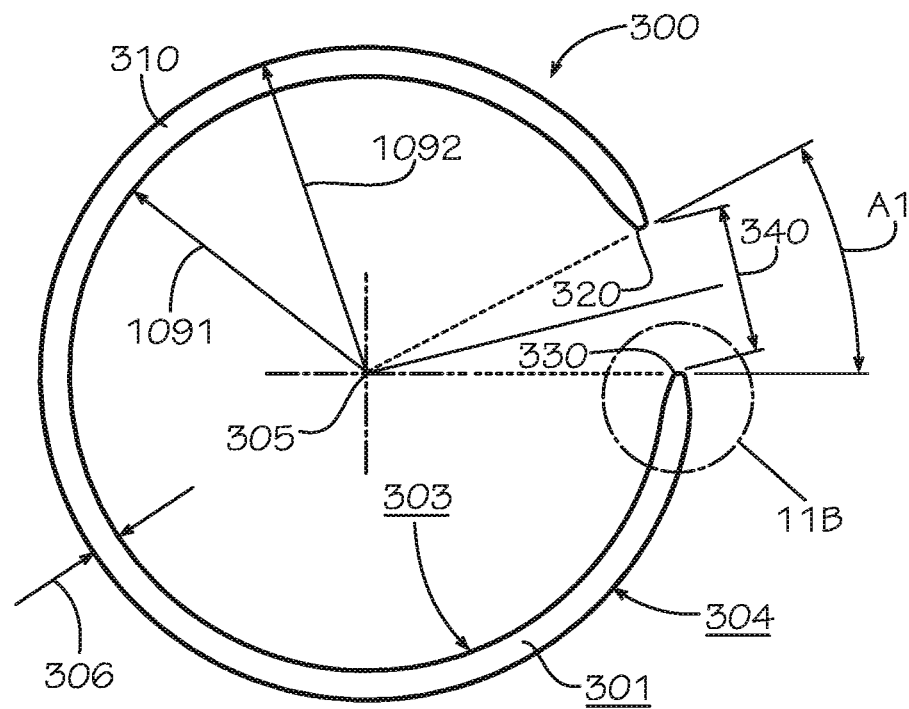
FIG. 11A is a front view of a pipe connection ring in the form of a split ring with tapered ends, constructed in accordance with another aspect of the current disclosure.
Figure 11B:
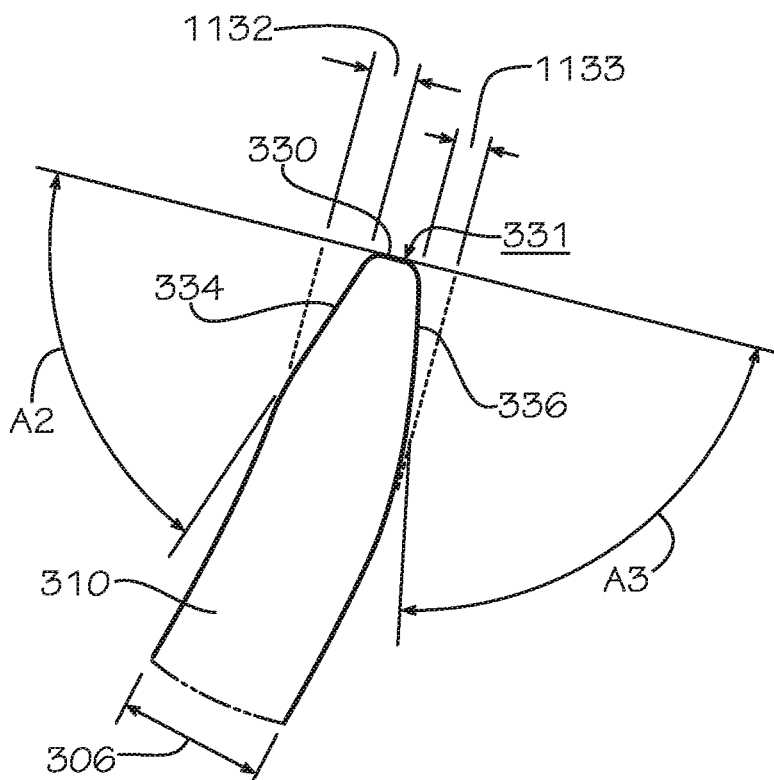
FIG. 11B is a detail view of the pipe connection ring of FIG. 11A taken from detail 11B of FIG. 11A.

Referring to FIGS. 1 and 3B, the respective inner surfaces 202a,b of the upper and lower coupling segments 200a,b define a gasket groove 240. The gasket groove 240 is generally C-shaped and is bounded by first and second ridges defining the transition portions 274 and 276 (shown in FIG. 3B). Although gasket groove 240 is shown in FIG. 3B as generally C-shaped, the particular shape of the gasket groove may differ from that shown as long as it receives the gasket 150. The inner surfaces 202a,b further define a first ring groove 250a axially spaced from the gasket groove 240. Similarly, the inner surfaces 202a,b further define a second ring groove 250b axially spaced from the gasket groove 240. A first pipe connection ring 300a is received within the first ring groove 250a, and a second pipe connection ring 300b is received within the second ring groove 250b. As shown in FIGS. 1 and 2, the first connection ring 300a is shaped as an annular member having a body 310 and two plain-end ring ends 320,330. The second pipe connection ring 300b can be shaped identically to the first connection ring 300a. The pipe connection rings 300a,b can also be constructed as split rings with tapered ends, as illustrated in FIGS. 11A and 11B. Pipe connection rings with other configurations may also be used, as will be described herein.

As shown in FIG. 2, the annular shape of the gasket 150 defines a coupling void 105 within the gasket 150 that is configured to receive a pipe element. In practice, when pipe elements are introduced within the gasket 150, they are placed inside the coupling void 105. Also shown in FIG. 2, a central axis of each of the bolts 120a,b may be angled with respect to a vertical axis 425 of the pipe coupling 100 such that heads 612a,b of the bolts 120a,b sit flush against the top surfaces 314a,315a. The top surfaces 314a,315a of the coupling segment 200a may likewise be angled at respective angles 415a,416a and corresponding top surfaces 314b,315b of the coupling segment 200b be angled at respective angles 415a,416a with respect to a horizontal axis 420 when the pipe coupling 100 is in an assembled and untightened state. By adjusting the geometry of the coupling segments 200a,b, however, the central axis of each of the bolts 120a,b may be made parallel to the vertical axis 425 such that heads 612a,b of the bolts 120a,b sit at an angle with the top surfaces 314a,315a. The coupling segment 200a may include bottom surfaces 312a,313a proximate to the respective ends 211a, 212a, and the coupling segment 200b may include bottom surfaces 312b,313b proximate to respective ends 211b,212b, the bottom surfaces 312a,313a facing the bottom surfaces 312b,313b when the pipe coupling 100 is in an assembled state.

Tightening of the fastening devices 290a,b seats the gasket 150 against pipe elements such as the pipe elements 110,120. When tightened about the pipe elements, the pipe coupling 100 restrains the pipe elements from pullout—in other words, the pipe coupling not only seals the joint but prevents separation of the first pipe element 110 from the second pipe element 120—because a pipe connection ring 300a,b is seated inside at least one connection groove of at least one pipe element. The gasket 150 is compressed in sealed engagement with the pipe elements. In some embodiments, the gasket 150 may comprise a single sealing member that extends between the two pipe elements. Such deformation allows the heads 612a,b of the bolts 120a,b to seat flush against the top surfaces 314a,315a of coupling segment 200a while nuts 125a,b seat flush against the top surfaces 314b,315b of coupling segment 200b.

In the current embodiment, the pipe coupling 100 is assembled in the untightened position of FIG. 2 before installation onto the pipe elements. The pipe coupling 100 may be also be assembled only partially before installation onto the pipe elements.

In one aspect, as shown in FIG. 3B in an assembled but untightened state, the coupling segment 200a and the coupling segment 200b of the pipe coupling 100 define a noticeable gap 170 therebetween. The pipe connection rings 300a,b are respectively positioned in or disposed within the first ring groove 250a and the second ring groove 250b. The first ring groove 250a is proximate to a first axial end 205a,b of the coupling segments 200a,b and the second ring groove 250b is proximate to a second axial end 206a,b (shown in FIG. 2) of the coupling segments 200a,b.

The gasket 150 is positioned in or disposed within a gasket groove 240 defined in the inner surfaces 202a,b of the coupling segments 200a,b. Each of the inner surfaces 202a,b also defines a transition portion 272, a transition portion 274, a transition portion 276, and a transition portion 278—each of which can also be described as a ridge. The transition portion 272 provides a transition between the first axial end 205a,b and the first ring groove 250a; the transition portion 274 provides a transition between the first ring groove 250a and the gasket groove 240; the transition portion 276 provides a transition between the gasket groove 240 and the second ring groove 250b; and the transition portion 278 provides a transition between the second ring groove 250b and the second axial end 206a,b. Various detailed characteristics and functions of the pipe connection rings 300a,b will be described in connection with the description of FIGS. 10 through 17.

As shown in FIG. 3B, the gasket 150 comprises, for example and without limitation, a pair of sealing ridges 525a,b, a central rib 530 defining sealing members 557a,b, a deformation groove 517, a pair of gasket channels 540a,b—alternately described as pockets, the gasket channel 540a proximate to the sealing ridge 525a and the gasket channel 540b proximate to the sealing ridge 525b. In one aspect, the gasket 150 is received within the gasket groove 240 and each of the pipe connection rings 300a,b, shown in simplified form for the sake of clarity, is respectively received within the ring grooves 250a,b. In one aspect, in cross-section, the gasket 150 defines an overall height 570 measured in a radial direction from a radially outer surface 515 to a pair of sealing surfaces 526a,b of the sealing ridges 525a,b.

Figure 18:
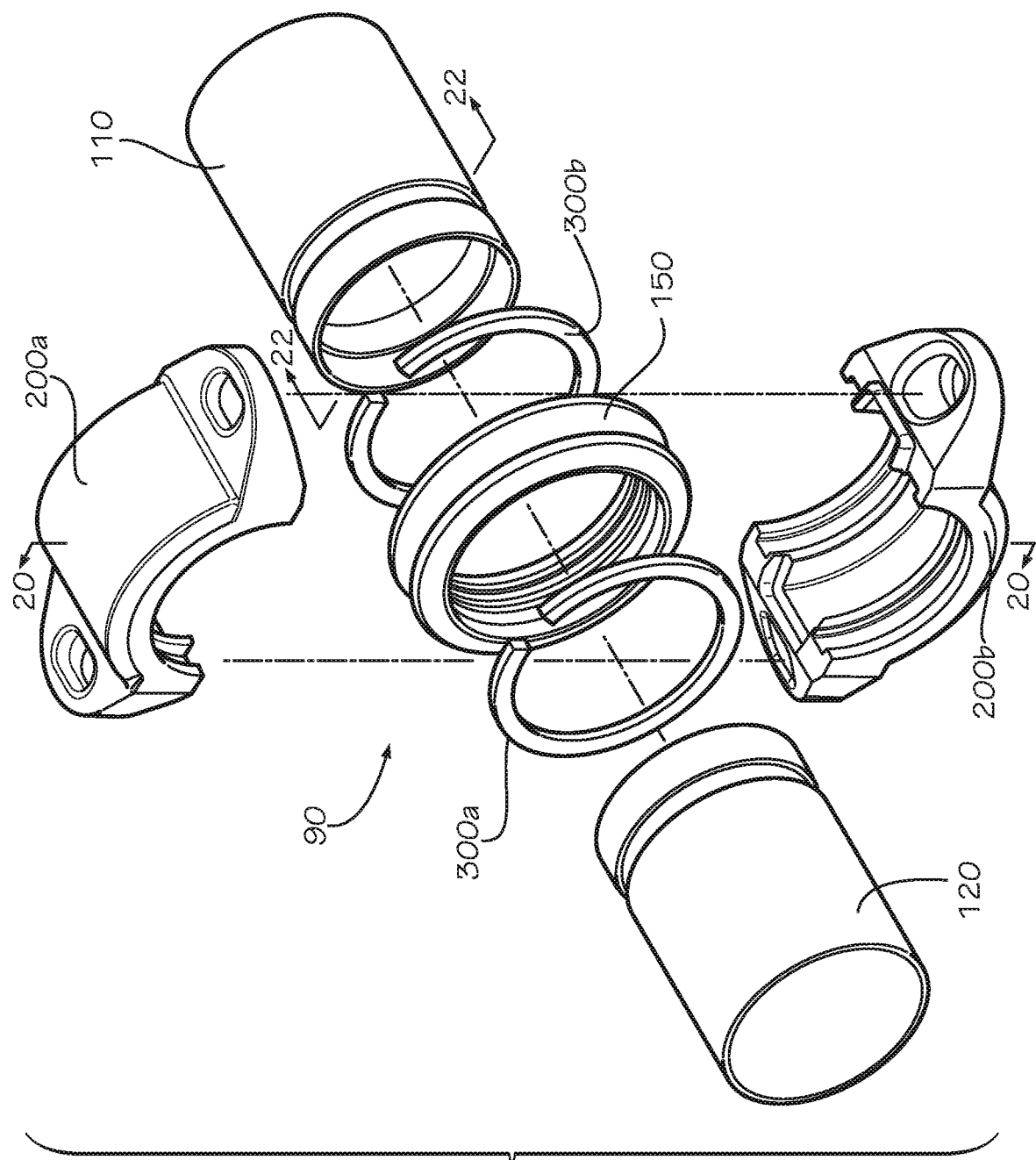
FIG. 18 is a perspective view of a pipe system using a pipe coupling with the pipe connection ring of FIG. 10 in accordance with one aspect of the current disclosure.

In one aspect, the gasket 150 is ring-shaped (as shown in FIG. 18) with various axially outer drafted edges and axially inward drafted edges defined on the sealing ridges 525a,b. The pair of sealing surfaces 526a,b of the sealing ridges 525a,b, respectively, are intended to contact pipe elements placed inside of the gasket 150 to provide a fluid seal for the pipe elements. The sealing surfaces 526a,b face radially inwardly and extend substantially axially at rest, thereby being coannular with each other. Accordingly, in one aspect, the shape of each of the sealing surfaces 526a,b approximates a cylinder that is about coaxial with the pipe elements intended to be used with the pipe coupling 100. Thus, the sealing surfaces 526a,b appear as lines that are parallel with an axial direction of the gasket 150 and an axial direction of the pipe elements 110,120 in cross-sectional view, as shown in FIGS. 20A-20E. Any angle with respect to the pipe elements 110,120 is minimal. The axial ends of each sealing surface 526a,b may be rounded or chamfered or otherwise shaped to ease the insertion of pipe elements 110,120.

The gasket 150 may be made of rubber, plastic, cork, wood, metal, ceramic, polymer, elastomer, rosin, foam, any combination of the foregoing materials, or any material suitable for sealing two pipe elements joined in end-to-end relationship. A "pipe element" can include, for example and without limitation, pipes, valves, meters, fittings, or any other piping structure suitable to be sealed.

The gasket 150 defines the gasket channels 540a,b. The gasket channels 540a,b are pockets into which fluid media may flow when the gasket 150 is in use. The gasket channels 540a,b are tubular channels in the current embodiment but may be various shapes in various embodiments. When placed in sealing contact with an exterior surface of a pipe element, the gasket channels 540a,b allow some fluid pressure to aid in sealing the sealing ridges 525a,b against the pipe elements 110,120 by exerting pressure against an axially outer surface of the sealing ridges 525a,b, although such use is not necessary for successful sealing of the gasket 150. The central rib 530 decreases in thickness from a radially outermost portion to its termination radially inward.

In addition, when the gasket 150 is in use, the sealing members 557a,b act to prevent substantial fluid media flow into the gasket channels 540a,b. When placed in sealing contact with exterior surfaces of pipe elements, a pair of sealing surfaces 532a,b of the sealing members 557a,b prevent substantial fluid media flow into gasket channels 540a,b, retaining fluid media flow in a groove between the sealing members 557a,b. The gasket may comprise a plurality of central ribs, each with at least one sealing member and at least one sealing surface, which perform the same function as described above to prevent substantial media flow into the gasket channels. One problem that the central rib 530 can alleviate is the buildup of fluids in the gasket channels 540a,b. For example, in applications where fluid media is water in cold temperature environments, preventing water buildup in the gasket channels 540a,b can lead to damage to the gasket 150 if the water freezes and, thereby, expands.

As shown in FIGS. 4-9, the coupling segments 200 respectively define the outer surface 201 and the inner surfaces 202 as differing in various aspects to the outer surfaces 201a,b and inner surfaces 202a,b of the coupling segments 200a,b of FIGS. 1-3B. In particular, the gently arched shape of the outer surfaces 201a,b is broken towards each of the axial ends 205,206 of each coupling segment 200 by a plurality of edge treatments 260 corresponding to a plurality of groove bottom segments 270 shown in FIGS. 7-8. In one aspect, the edge treatments 260 are planar surfaces that help maintain a more constant thickness of the coupling segment in portions of the coupling segment defining the ring grooves 250a,b. In one aspect, this ensures that the pipe coupling 100 does not become too thin in any one area. In another aspect, this reduces the amount of material used to form the coupling segment 200 to only the amount required the minimum thickness. In another aspect, a more constant thickness improves the manufacturability of the coupling segments 200 by facilitating more even cooling of a coupling segment after it has been cast or molded.

Figure 5:
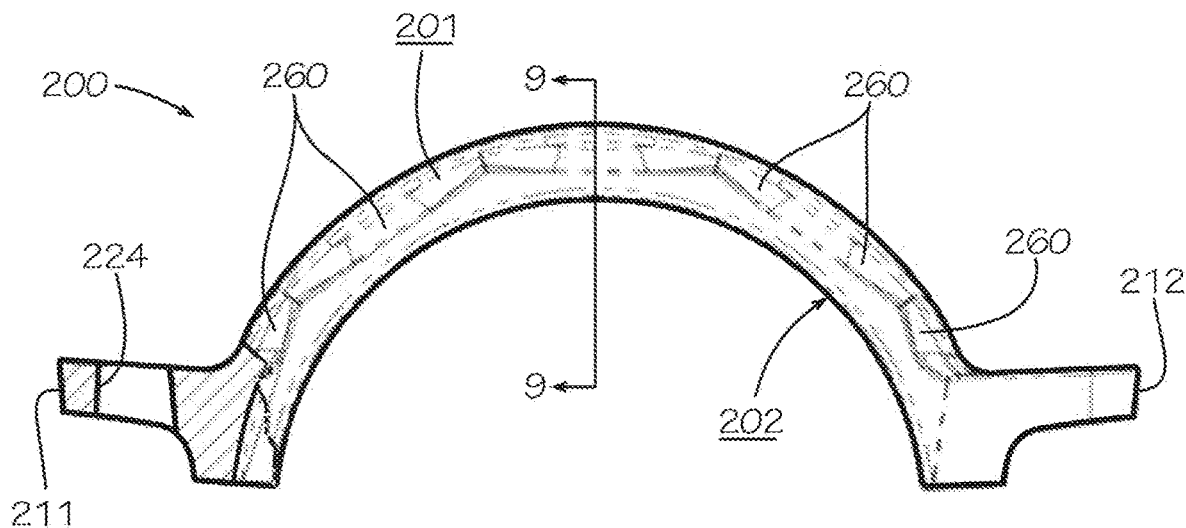
FIG. 5 is a front view of the coupling segment of FIG. 4.
Figure 6:
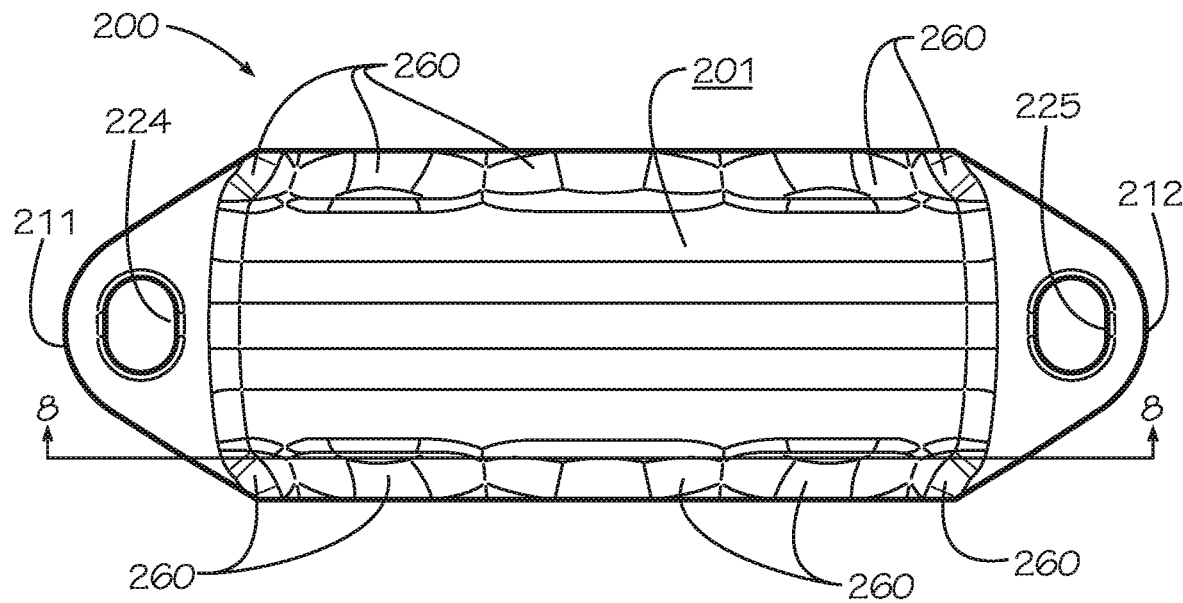
FIG. 6 is a top view of the coupling segment of FIG. 4.
Figure 7:
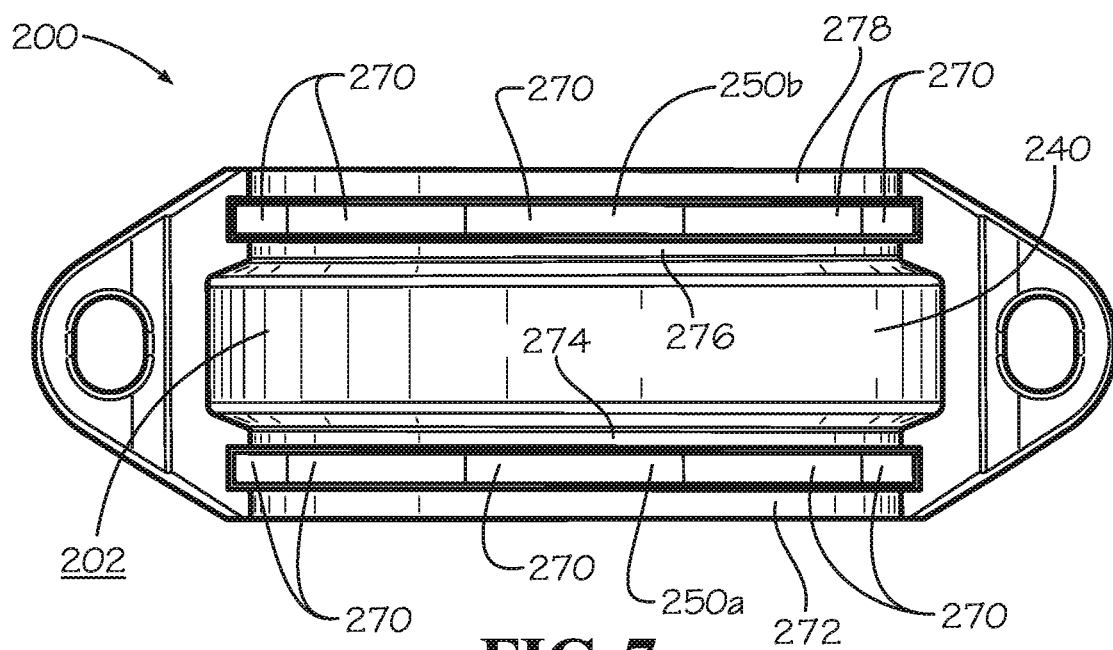
FIG. 7 is a bottom view of the coupling segment of FIG. 4.
Figure 8:
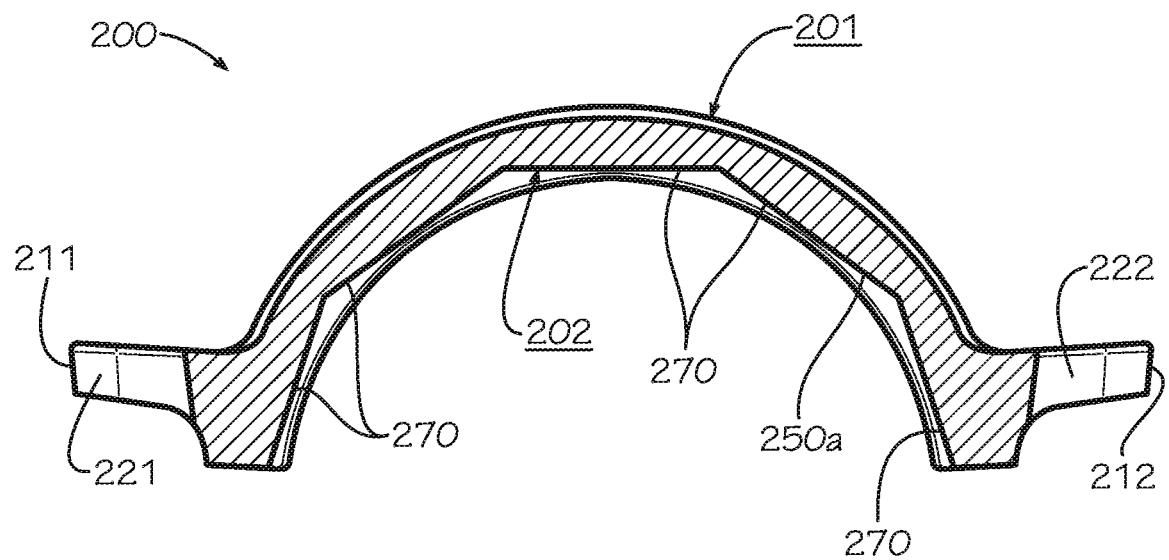
FIG. 8 is a sectional view of the coupling segment of FIG. 4 taken along line 8-8 of FIG. 6.
Figure 9:
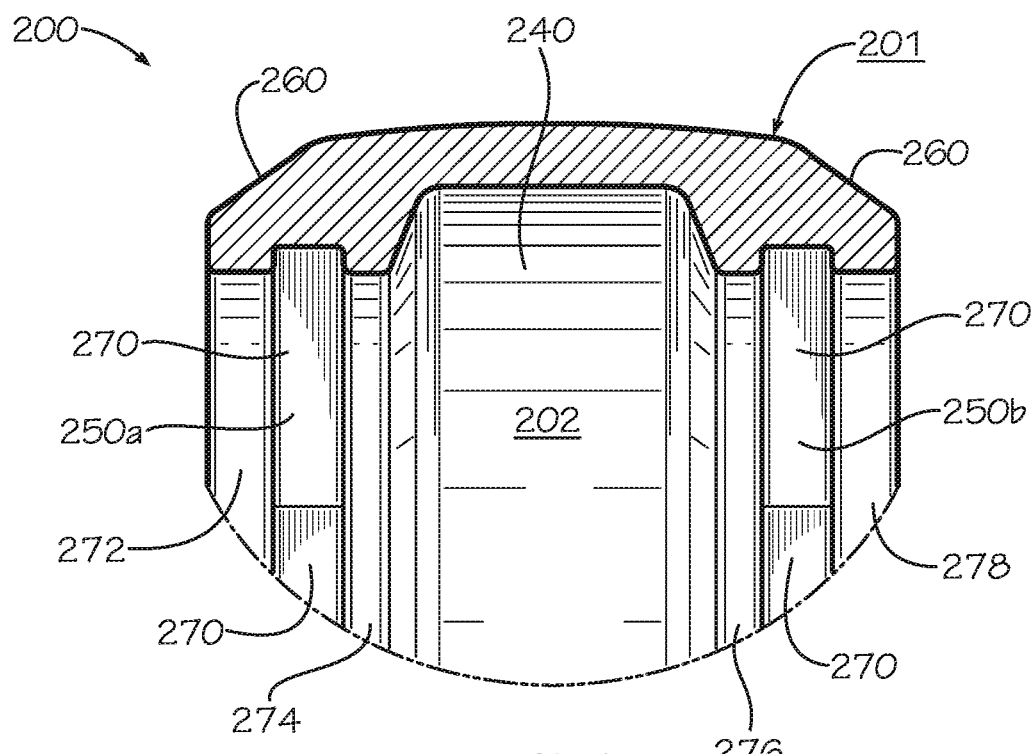
FIG. 9 is a sectional view of the coupling segment of FIG. 4 taken along line 9-9 of FIG. 5.

In various aspects and as shown in FIGS. 4-9, the coupling segment 200 respectively defines the fastener openings 224,225 in fastener pads 221,222 proximate to the first end 211 and the second end 212. In one aspect, the fastener openings 224,225 may be capsule-shaped and extend in an axial direction defined by the pipe coupling 100, though the fastener openings may have various other shapes in other aspects, including a circular or rectangular shape, and can extend in a direction orthogonal to the axial direction or in other directions as desired for particular installations. In one aspect, to facilitate the manufacture of the coupling segment 200, an inner surface of the fastener openings 224,225 are drafted as shown in FIG. 5 and other surfaces shown in FIGS. 4-9 of the coupling segment 200 are drafted as shown. In one aspect, each of the fastener pads 221,222 tapers toward the first end 211 and the second end 212 as shown in FIGS. 6 and 7. In one aspect, the gasket groove 240 is centered axially in the coupling segment 200. In one aspect, each of the ring grooves 250a,b is positioned axially outward from the gasket groove 240 as shown in FIGS. 7 and 9. In one aspect, the groove bottom segments 270—which can also be described as flat portions of a groove bottom surface defined in the inner surface 202 of the coupling segment 200—of the ring grooves 250a,b are each flat in cross-section as shown in FIG. 8. In one aspect, the groove bottom segments 270 of the ring grooves 250a,b are flat in cross-section and parallel to an axial direction of the coupling segment in cross-section as shown in FIG. 9. In one aspect, the groove bottom segments 270 form a substantially half-polygonal shape in a radially oriented plane. In one aspect where a pair of coupling segments 200 is assembled in a pipe coupling 100, the groove bottom segments 270 of both coupling segments 200 form a ten-sided polygonal profile. In another aspect, the total number of groove bottom segments 270 can be greater than or less than ten. In one aspect, when the coupling segments 200a,b are formed with the groove bottom segments 270, an outer surface 304

(shown in FIG. 10) of the substantially circular pipe connection rings 300a,b may contact only a portion of the ring grooves 250a,b. In one aspect, the groove bottom segments 270 enable portions of an outer surface 304 of the pipe connection ring 300 to slide more easily during tightening of the pipe coupling 100 while the pipe connection ring 300 compresses due to the shape and orientation of the groove bottom segments 270 and the reduced contact surface area between the outer surface 304 of the pipe connection ring 300 and the groove bottom segments 270. The ring grooves 250a,b may also have a radiused profile instead of the polygonal profile shown.

Figure 10:
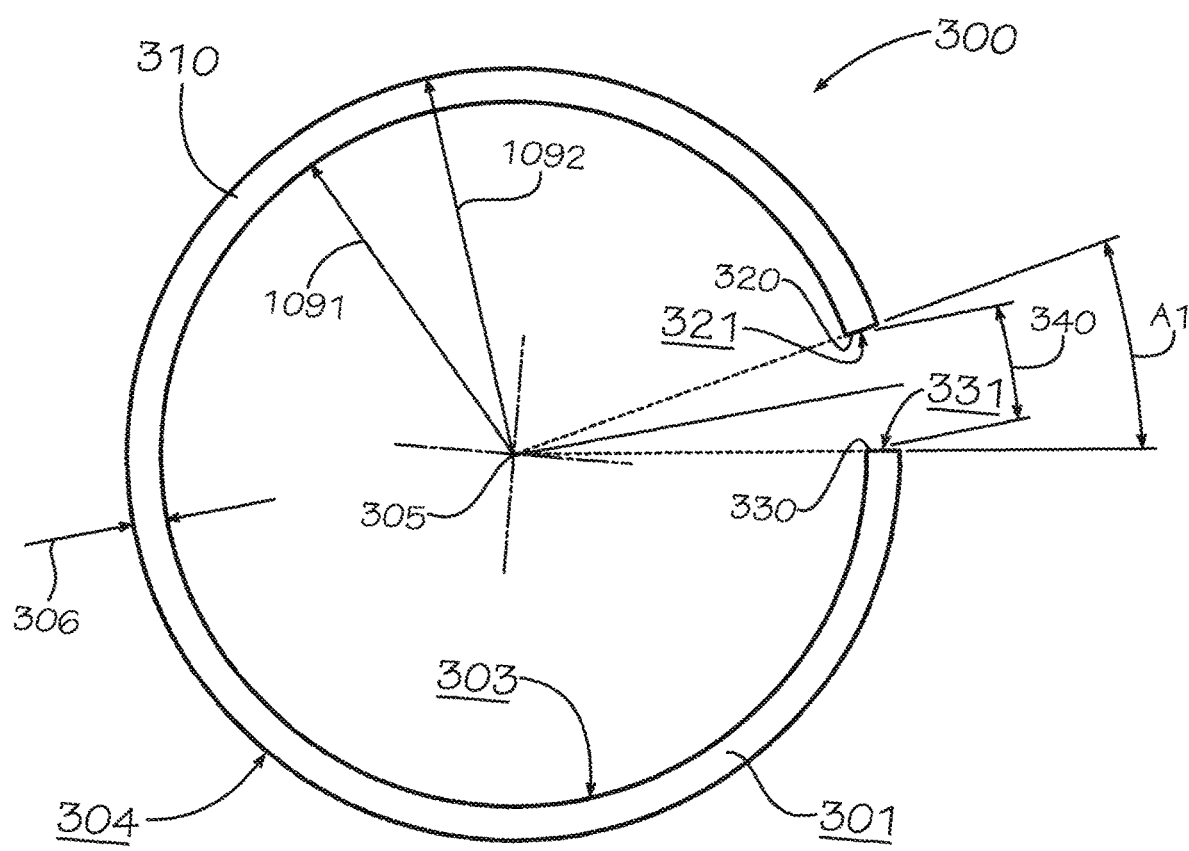
FIG. 10 is a front view of a pipe connection ring in the form of a split ring with square ends, constructed in accordance with another aspect of the current disclosure.

As shown in FIG. 10, the pipe connection ring 300—which can be described as a split ring—defines a body 310 with the two ring ends 320,330 and the opening 340 between the two ring ends 320,330. The two ring ends 320,330 of the pipe connection ring 300 of FIG. 10 are square and respectively define end surfaces 321,331, though the pipe connection ring 300 can have different end configurations, such as the other end configurations to be described herein. When uncompressed as shown, the opening 340 of the pipe connection ring 300 defines an angular opening A1, which can be measured in degrees. The magnitude of the opening 340 determines whether the pipe connection ring 300 is to be used for a flexible-type pipe coupling or a rigid-type pipe coupling. The opening 340 is larger for rigid-type pipe couplings than it is for flexible-type pipe couplings. For a pipe system disclosed in accordance with an aspect of the current disclosure, only the pipe connection ring needs to be changed in order to convert the pipe coupling from a flexible-type to a rigid-type, or vice versa.

In addition, the pipe connection ring 300 defines a first axial end surface 301, a second axial end surface (not shown) distal from the first axial end surface 301, an inner surface 303, an outer surface 304, an overall inner radius 1091, and an overall outer radius 1092, the overall inner radius 1091 and the overall outer radius 1092 measured from a central axis 305 of the pipe connection ring 300. The body 310 of the pipe connection ring 300 defines a radial ring thickness 306 (i.e., a thickness of the pipe connection ring 300 in a radial direction) and an axial ring thickness 308 (i.e., a thickness of the pipe connection ring 300 in an axial direction) shown in FIG. 14B that is constant between the pipe connection ring 300 as shown and the pipe connection ring 300 as compressed in a radial direction (i.e., when the pipe coupling 100 is in an assembled and tightened state). The proportions between the radial ring thickness 306 and the axial ring thickness 308 need not be constant in every embodiment of the pipe connection ring 300 nor between the uncompressed and compressed states of the pipe connection ring 300.

The pipe connection ring 300 shown in FIG. 10 and other exemplary pipe connection rings 300 such as those shown in FIGS. 11A-17 can be formed from a flat blank of raw material such as, for example and without limitation, carbon steel and stainless steel including spring steel grades of each. The pipe connection ring 300 shown can be formed using one or more material removal processes such as, for example and without limitation, machining, stamping, punching, laser-cutting, abrasive-water-jet-cutting, and chemical milling or etching, optionally in combination with forming processes such as, for example and without limitation, casting, forging, stamping, bending, and three-dimensional printing.

FIGS. 11A and 11B depict a pipe connection ring 300 constructed according to another aspect of the current disclosure. In addition to the aforementioned common features of the pipe connection ring 300, at least one ring end 320,330 of the pipe connection ring 300 shown in FIGS. 11A and 11B is tapered. As shown in FIG. 11B, the ring end 330 includes an inside edge 334 and an outside edge 336. The inside edge 334 is oriented at a first taper angle A2 with respect to a radial direction of the pipe connection ring 300, and the outside edge 336 is oriented at a second taper angle A3 with respect to the same radial direction. In one aspect, the first taper angle A2 is about 70° and the second taper angle A3 is about 80°, though the magnitude of either the first taper angle A2 or the second taper angle A3 can be any angle less than about 90 degrees. As shown, the first taper angle A2 and the second taper angle A3 are sized such that a taper width 1132 defined by the inside edge 334 is equal to a taper width 1133 defined by the outside edge 336. The taper width 1132 and the taper width 1133 can be adjusted and made to vary to ease insertion or radial compression of the pipe connection ring 300. Because of the taper, a width in a radial direction of each of the ring ends 320,330 and each of the corresponding end surfaces 321,331 is less than the radial ring thickness 306 of the untapered portion of the body 310.

FIGS. 12-14D illustrate the pipe connection ring 300 constructed according to another aspect of the current disclosure. Referring to FIGS. 12-14A, the pipe connection ring 300 includes a body 310 defining the two ring ends 320,330 having respective end surfaces 321,331 (end surface 331 shown in FIG. 14A) that are each angled with respect to the central axis 305 (shown in FIG. 13) of the pipe connection ring 300 and separated from one another by the opening 340 and the angular opening A1 when the pipe connection ring 300 is in an uncompressed state. In one aspect, the angular opening A1 is, for example and without limitation, about 27°. The end surfaces 321,331 extend at a cut angle A4 to an axial direction of the pipe connection ring 300. The cut angle A4 may be of the same magnitude for each end surface 321,331 and may measure about 45°. The cut angle A4 of the end surface 331 may vary from a cut angle of the end surface 321, however, and either end surface 321,331 can vary from about 45°. Also shown in FIG. 14A, the pipe connection ring 300 defines the first axial end surface 301, the second axial end surface 302 distal from the first end surface 301, the inner surface 303, and the outer surface 304.

Figure 12:
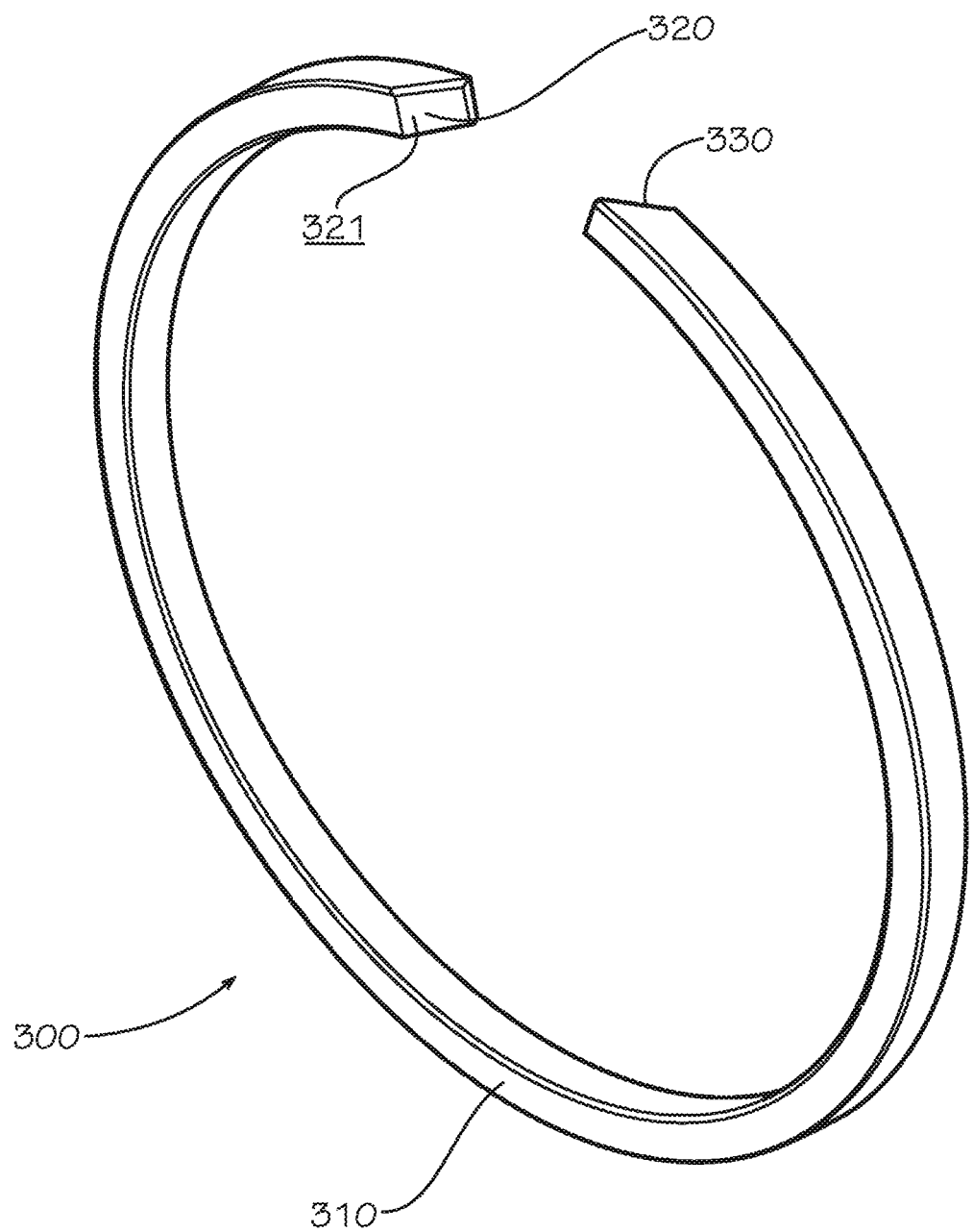
FIG. 12 is a perspective view of a pipe connection ring in the form of a split ring with angled ends, constructed in accordance with another aspect of the current disclosure.
Figure 13:
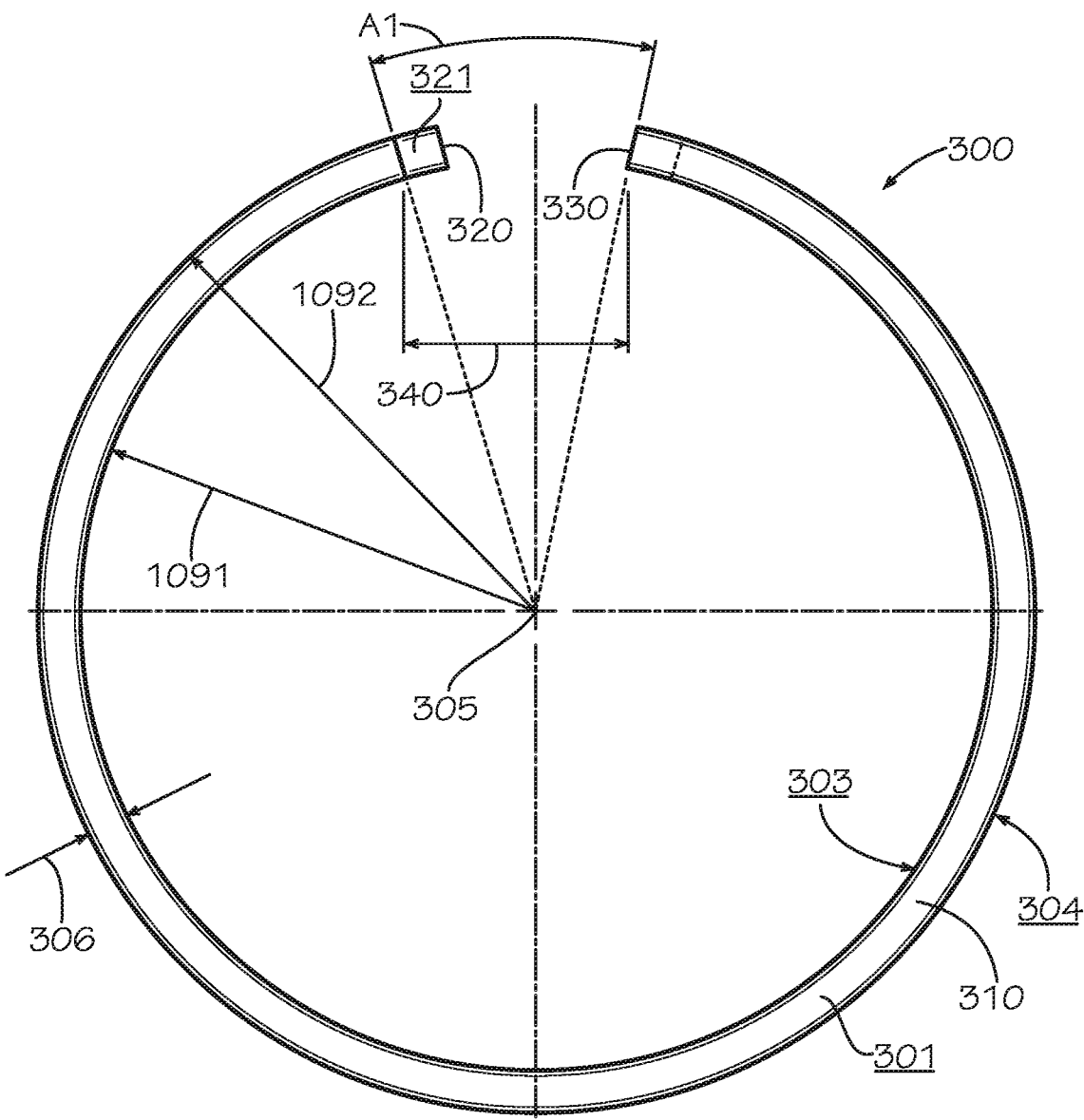
FIG. 13 is a front view of the pipe connection ring of FIG. 12.
Figure 14A:
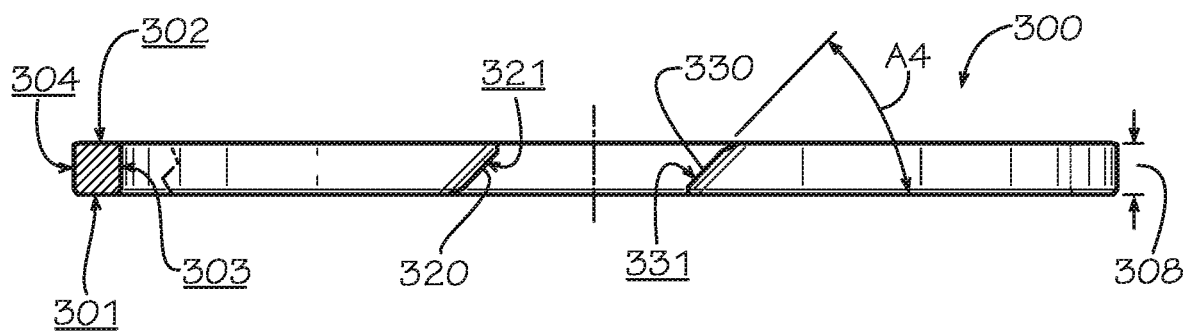
FIG. 14A is a top view of the pipe connection ring of FIG. 12.
Figure 14B:
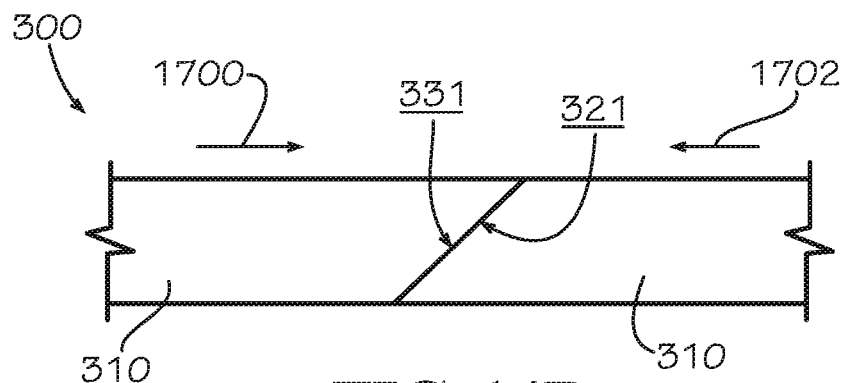
FIG. 14B is a top view of the angled ends of the pipe connection ring of FIG. 12, the ends shown contacting one another upon radial compression of the pipe connection ring.
Figure 14C:
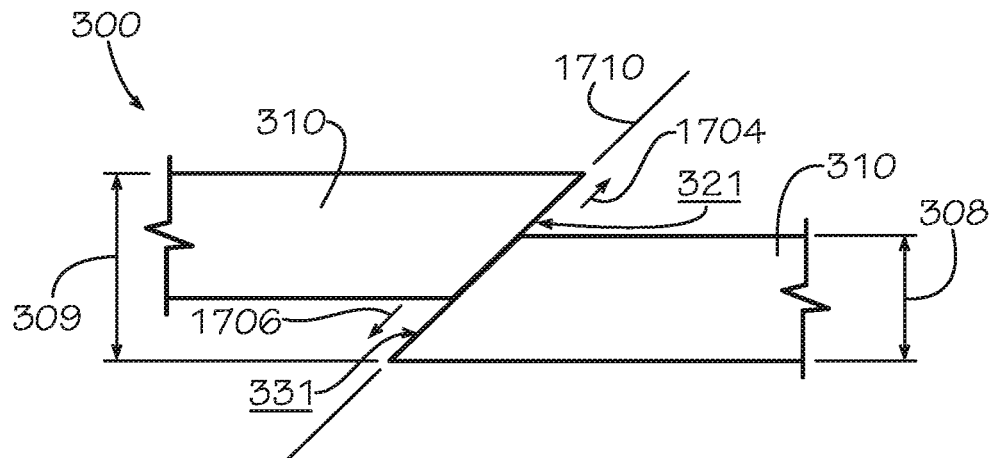
FIG. 14C is a top view of the angled ends of the pipe connection ring of FIG. 12, the ends shown sliding against one another upon greater radial compression of the pipe connection ring than that depicted in FIG. 14B.
Figure 14D:
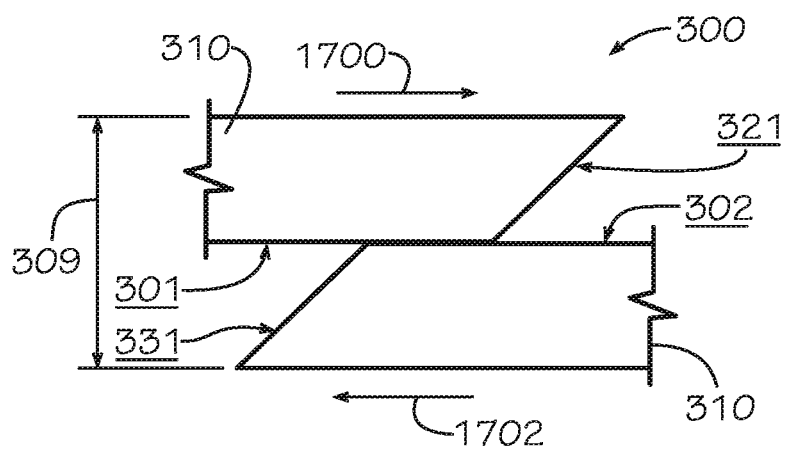
FIG. 14D is a top view of the angled ends of the pipe connection ring of FIG. 12, the ends shown having slid past one another upon application of still greater radial compression of the pipe connection ring than that depicted in FIG. 14C.

FIGS. 14B-14D show the behavior of the pipe connection ring 300 of FIG. 12 as it undergoes progressively increasing radial compression inside the pipe coupling 100 and exerted by continued tightening of the pipe coupling 100. In FIG. 14B, at a given compression magnitude, the end surfaces 321,331 move toward one another in the movement directions 1700,1702, respectively, until the end surfaces 321,331 are brought into contact with one another. In FIG. 14C, when a greater amount of radial compression is applied to the pipe connection ring 300 than that depicted in FIG. 14B, the end surfaces 321,331 begin to slide past one another in the movement directions 1704,1706 along a common slip plane 1710. As the end surfaces 321,331 slide past one another, a ring end axial thickness 309 begins to measure greater than the axial ring thickness 308. Finally, in FIG. 14D, upon application of a particular greater amount of radial compression to the pipe connection ring 300 than that depicted in FIG. 14C, the end surfaces 321,331 disengage from one another and move circumferentially past one another, as indicated by the movement directions 1700,1702. In one aspect, the radial compression of the pipe connection ring 300 is limited by the geometry of the ring groove 250a,b. A width of the ring groove 250a,b in an axial direction in the pipe coupling 100 that is narrower than necessary to accommodate the ring end axial thickness 309— particularly the ring end axial thickness 309 that increases as the ring ends 320,330 of the pipe connection ring 300 begin to slide past one another—may limit radial compression to the point at which the ring ends 320,330 of the pipe connection ring 300 contact the sides of the ring groove 250a,b.

Figure 15:
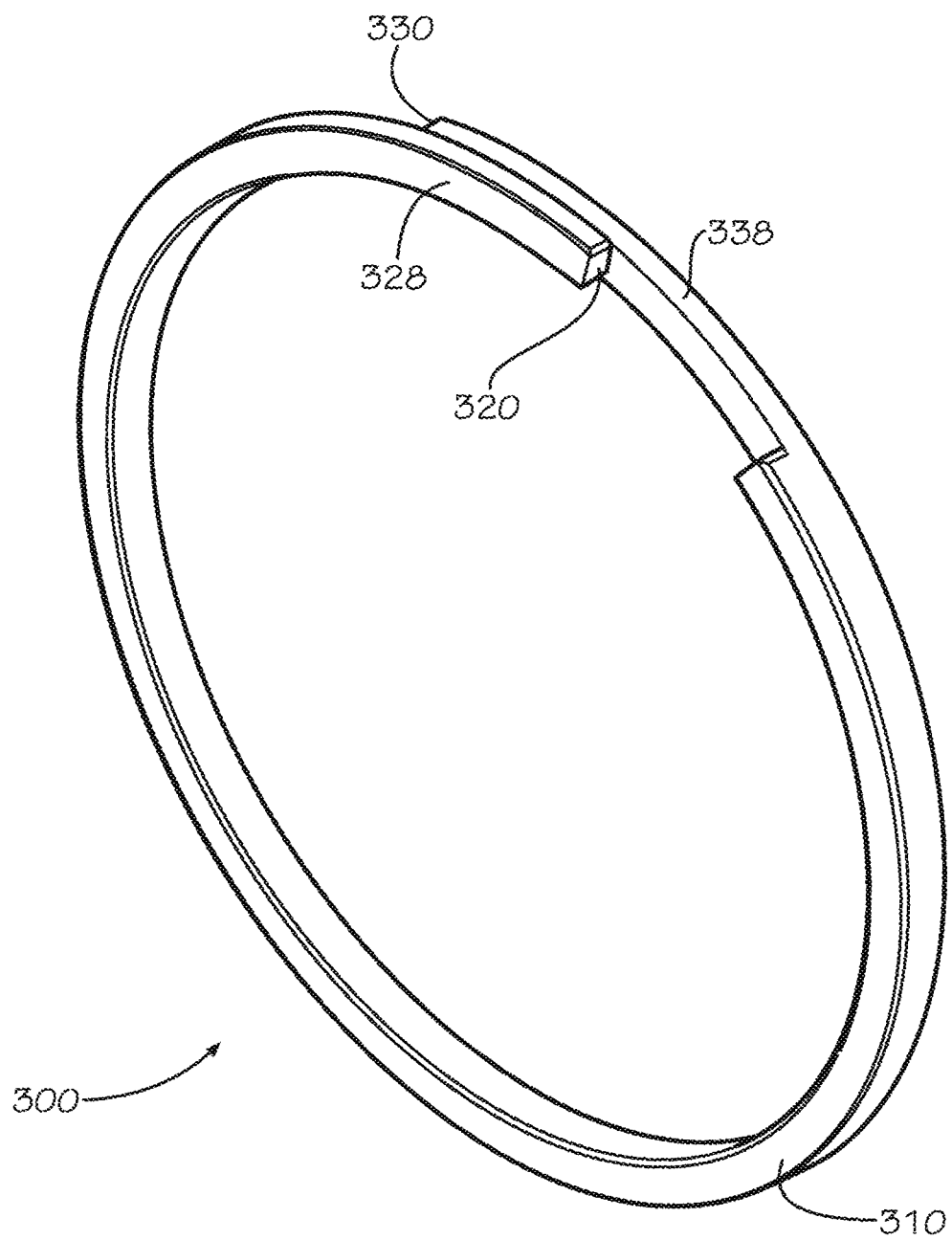
FIG. 15 is a perspective view of a pipe connection ring constructed in accordance with another aspect of the current disclosure.
Figure 16:
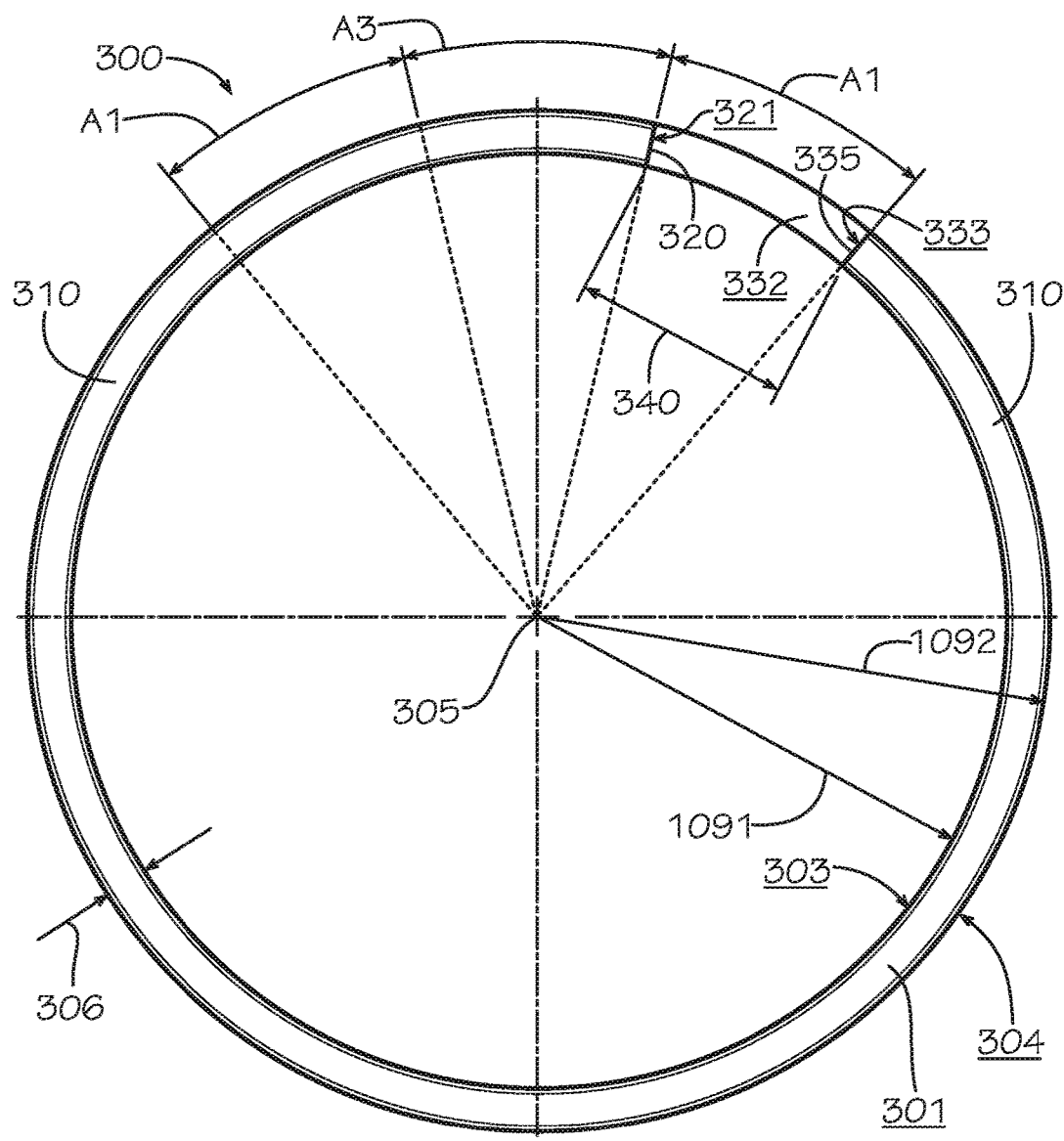
FIG. 16 is a front view of the pipe connection ring of FIG. 15.
Figure 17:
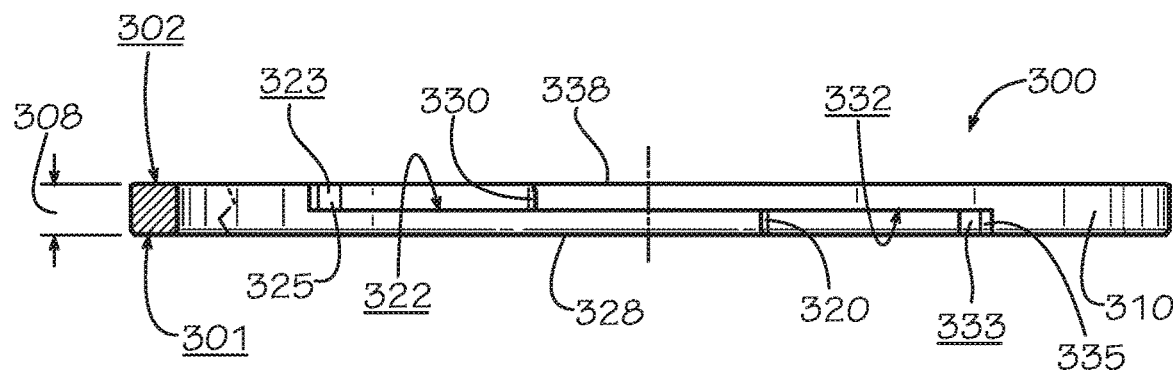
FIG. 17 is a top view of the pipe connection ring of FIG. 15.

FIG. 15-17 illustrate the pipe connection ring 300 constructed according to another aspect of the current disclosure. The body 310 of the pipe connection ring 300 defines the outer surface 304, the inner surface 303, the first axial end surface 301 extending from the outer surface 304 to the inner surface 303, and the second axial end surface 302 opposite the first axial end surface 301 and extending from the outer surface 304 to the inner surface 303. As shown, a portion of the body 310 proximate to the first ring end 320 of the two ring ends 320,330 is positioned axially adjacent to a portion of the body 310 proximate to the second ring end 330. A portion of the body 310 proximate to the first ring end 320 defines a slip surface 322 and includes the ring end 320 defining the end surface 321, and a portion of the body 310 proximate to the second ring end 330 defines a slip surface 332 and includes the ring end 330 defining the end surface 331. Shoulder 325,335 respectively defining shoulder surfaces 323,333 may be present at the base of the respective stepped portions 328,338 and distal to the respective ring ends 320,330, or each of the stepped portions 328,338 may transition into a non-stepped portion of the body 310 of the pipe connection ring 300 without a shoulder or shoulder surface being formed.

The pipe connection ring 300 shown in FIGS. 15-17— which, again, can be described as a split ring even though the ring ends 320,330 are in contact with one another because the ring ends 320,330 are still not connected—defines the opening 340 between the ring end 320 and the shoulder 335 and between the ring end 330 and the shoulders 325. As shown, the ring ends 320,330 face the respective shoulders 325,335 and contact the respective shoulders 325,335 when the pipe connection ring 300 experiences sufficient radial compression. When uncompressed as shown, the opening 340 of the pipe connection ring 300 defines the angular opening A1 and an overlapping angle, both of which can be measured in degrees. In one aspect, the stepped portion 328 proximate to the first ring end 320 and the stepped portion 338 proximate to the second ring end 320 can be said to nest inside one another. As shown, the axial ring thickness 308 measured at the overlapping portions 328,338 is less than or equal to the axial ring thickness 308 measured at a portion of the body distal the overlapping portions 328,338.

Figure 19:
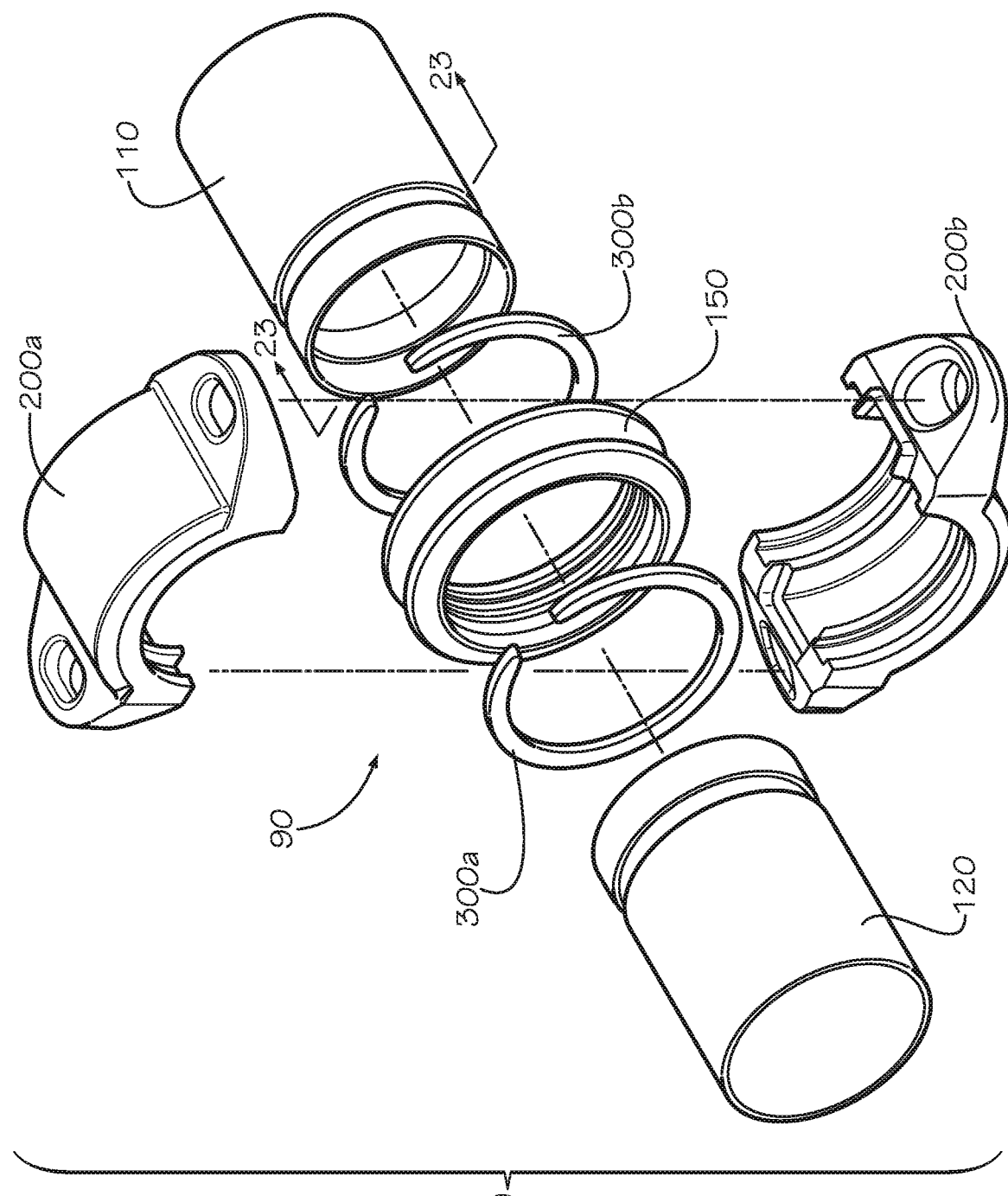
FIG. 19 is a perspective view of a pipe system using a pipe coupling with the pipe connection ring of FIG. 11A in accordance with one aspect of the current disclosure.

FIGS. 18 and 19 depict two variations of the pipe system 90, illustrating how different types of rings may be used with systems otherwise identically constructed.

Referring to FIG. 18, the pipe system 90 again includes the first pipe element 110, the second pipe element 120, and the pipe coupling 100 connecting an end of the first pipe element 110 to an end of the second pipe element 120. The pipe coupling 100 includes coupling segments 200a,b, each coupling segment 200a,b having an inner surface defining ring grooves in the manner disclosed hereinabove, and housing the gasket 150. The pipe system 90 employs square-ended pipe connection rings 300 of the type disclosed with regard to FIG. 10.

Referring to FIG. 19, the pipe system 90 again includes the first pipe element 110, the second pipe element 120, and the pipe coupling 100 connecting an end of the second pipe element 120 to an end of the first pipe element 110. The pipe coupling 100 includes the coupling segments 200a,b, each coupling segment having an inner surface defining a ring groove in the manner disclosed hereinabove, and housing a gasket 150. In one aspect, the foregoing components may be constructed identically as the corresponding components in the pipe system 90 shown in FIG. 18. The differentiating components of pipe system 90 of FIG. 19 are the tapered-ended pipe connection rings 300 of the type disclosed with regard to FIGS. 11A and 11B.

Figure 20B:
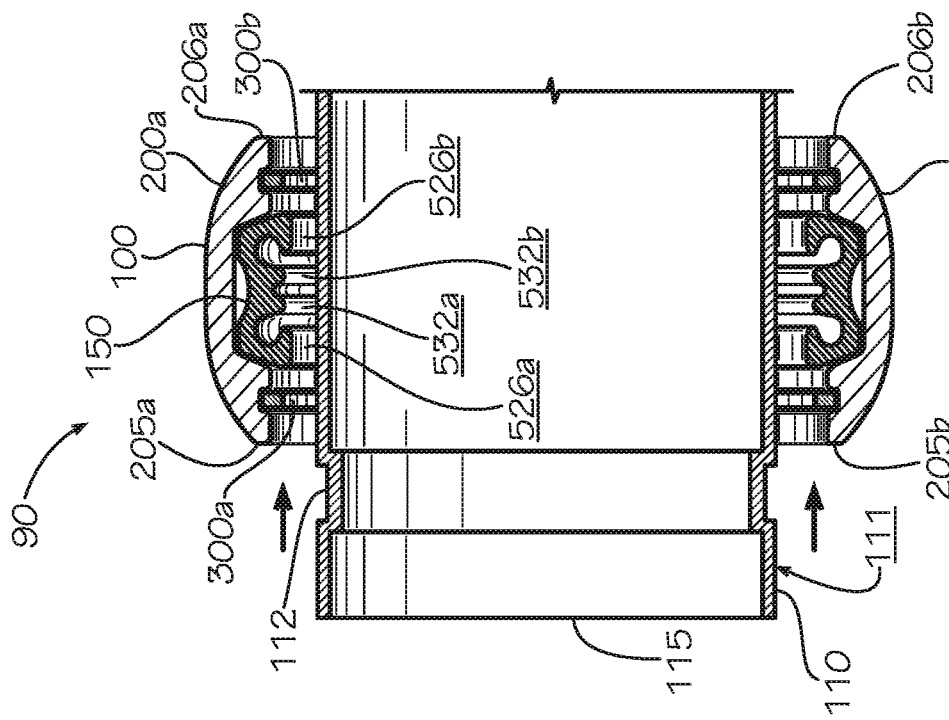
FIG. 20B is a sectional view of the pipe system of FIG. 20A with the pipe coupling slid over an end of the first pipe element.
Figure 20A:
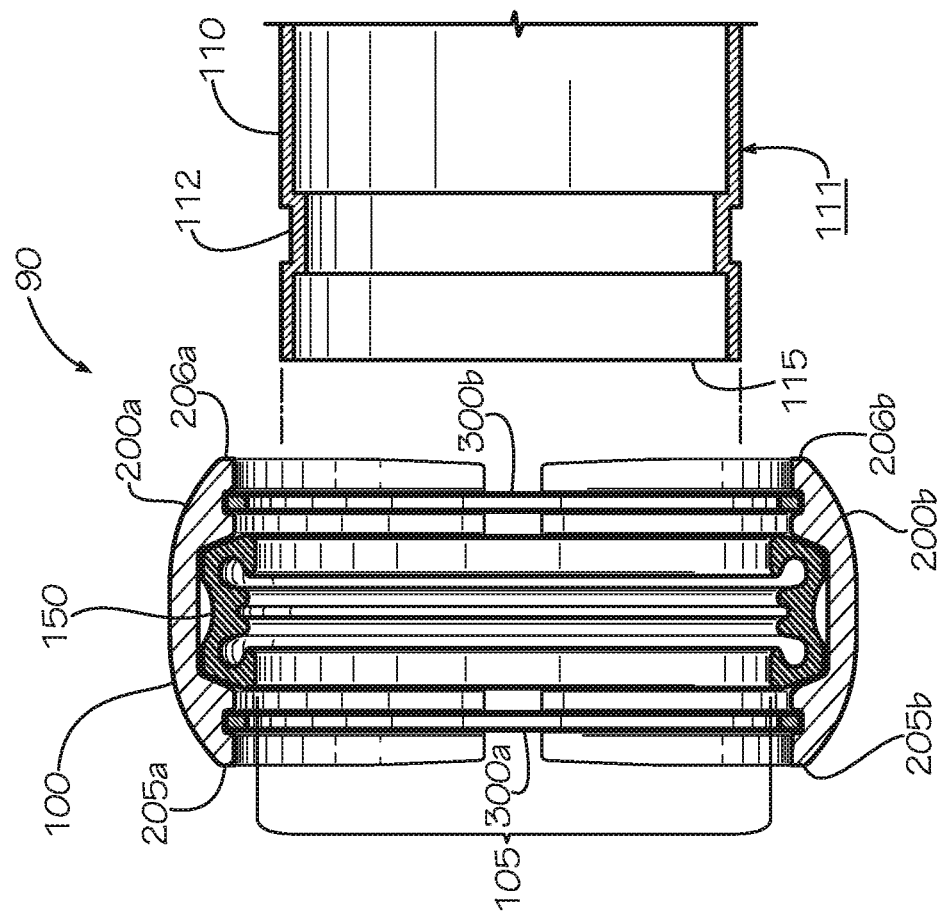
FIG. 20A is a sectional view of the pipe system of FIG. 18 taken along line 20-20 of FIG. 18 with the pipe coupling is shown aligned with a first pipe element in accordance with another aspect of the current disclosure.
Figure 20D:
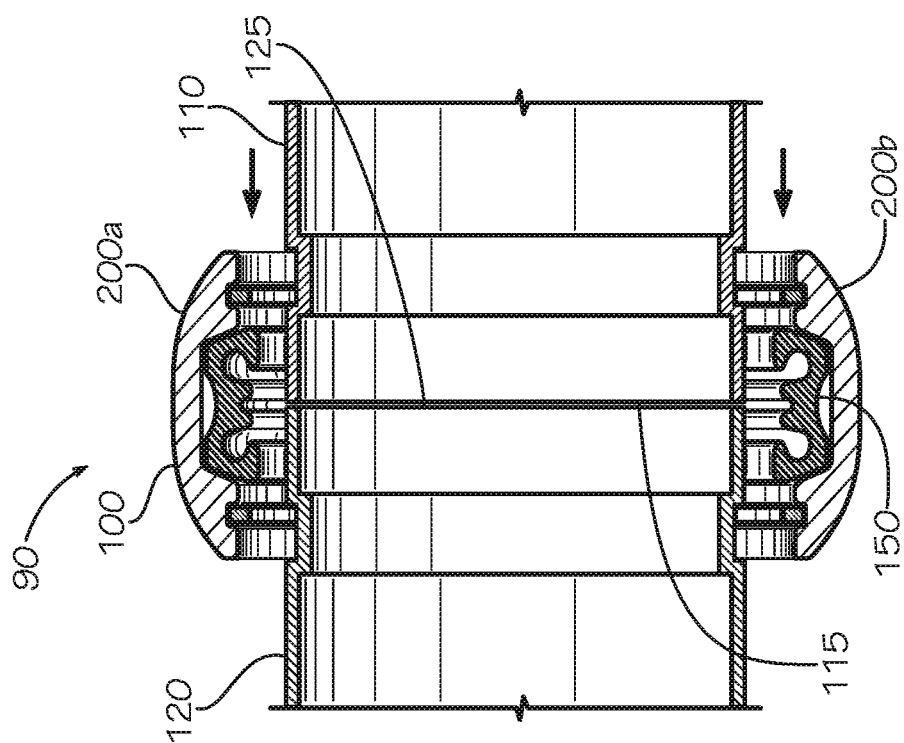
FIG. 20D is a sectional view of the pipe system of FIG. 20A with the pipe coupling slid over and aligned with both of the first pipe element and the second pipe element.
Figure 20C:
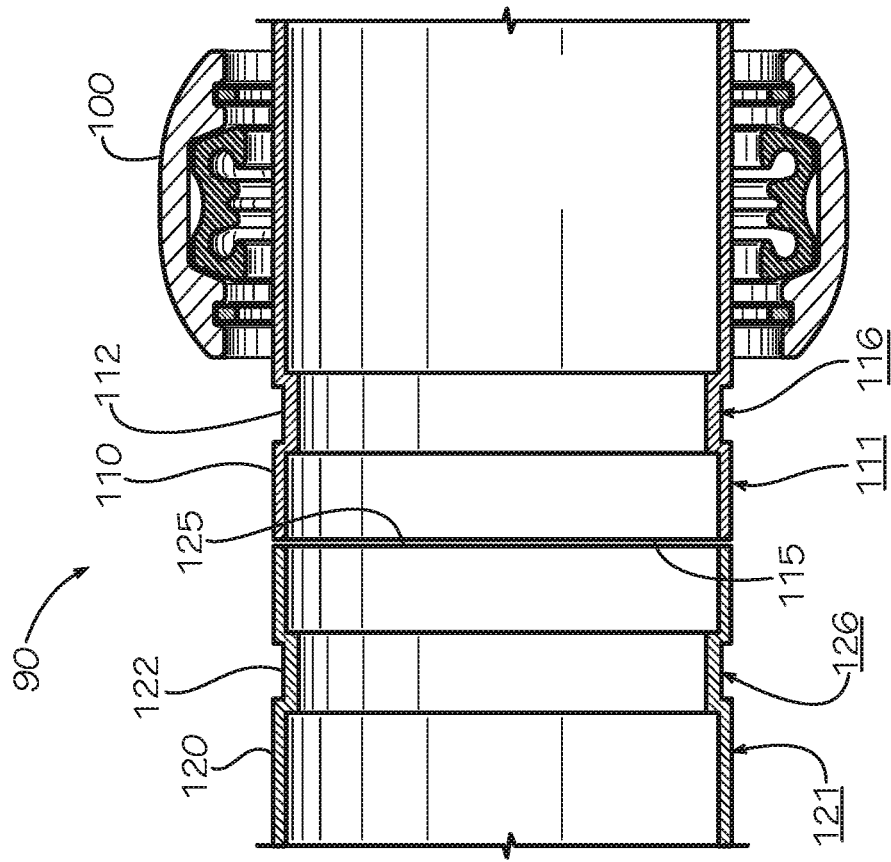
FIG. 20C is a sectional view of the pipe system of FIG. 20A with a second pipe element aligned with the first pipe element.

It may be advantageous for the entire pipe coupling 100 to be able to slide past an end 115 of the pipe element 110 during installation of the pipe coupling 100 as shown in FIGS. 20A-20E. As shown in FIG. 20C, for example, being able to slide the entire pipe coupling 100 past the end 115 of the pipe element 110 during installation may facilitate the accurate alignment of the first pipe element 110 with the second pipe element 120 because the pipe coupling 100 need not obscure the joint while still being installed on the first pipe element 110. Being able to slide the entire pipe coupling 100 past the end 115 of the pipe element 110 during installation also permits one to assemble the pipe coupling 100 before installing it on the pipe elements 110,120. Moreover, the pipe elements 110,120 and the pipe coupling 100 can be heavy or difficult to position or align, and it is often easier to assemble the pipe coupling 100 as a separate step before installing the pipe coupling 100 on the pipe elements 110,120. To facilitate sliding of the entire pipe coupling 100 over the end 115 of the pipe element 110, the pipe connection rings 300a,b and the inner surface 202a,b of the coupling segments 200a,b may have an inner diameter that is greater than an outer diameter of the pipe elements 110,120 when the pipe coupling is in an assembled but untightened state (i.e., in an uncompressed condition). The gasket 150 may also have an inner diameter that is greater than an outer diameter of the pipe elements 110,120 when the pipe coupling is in an assembled but untightened state, or the gasket 150 may have one or more portions that extend radially inward past an outer surface of the pipe elements 110,120.

FIGS. 20A-20E illustrate the installation of the pipe coupling 100 on the pair of pipe elements 110,120. The pipe coupling 100 is introduced to a pair of pipe elements 110,120 in the preassembled but untightened position of FIGS. 1-3B. Each pipe element 110,120 may define a connection groove 112,122 proximate to an end of each pipe element 110,120 for alignment with pipe connection rings 300a,b and to prevent separation of the first pipe element 110 from the second pipe element 120. In the currently described method, the pipe coupling 100 is axially aligned with the end 115 of the first pipe element 110 as shown in FIG. 20A. The pipe coupling 100 is installed by placing the end 115 of the first pipe element 110 in a coupling void 105 defined by the pipe coupling 100 and sliding the pipe coupling 100 over the end 115 of the first pipe element 110 as shown in FIG. 20B. As shown in FIG. 20B, an inner diameter of the gasket is greater than an outer diameter of the first pipe element 110 and the second pipe element 120, resulting in the sealing surfaces 526a,b and the sealing surfaces 532a,b of the gasket 150 being a small distance away from an outer surface 111 of the first pipe element 110. The sealing surfaces 526a,b and 532a,b may contact the outer surface 111 in other aspects. In one aspect, the entire pipe coupling 100 is slid beyond the connection groove 112 of the first pipe element 110 so that the pipe connection rings 300a,b and each of the axial ends 205a,b and 206a,b have passed the connection groove 112 or at least the end 115 of the pipe element 110. In another aspect, it may not be necessary to slide the entire pipe coupling 100 beyond the connection groove 112 or the end 115. As shown in FIG. 20C, the second pipe element 120 having an end 125 is introduced in end-facing relationship to the end 115 of the first pipe element 110.

As shown in FIG. 20D, when the second pipe element 120 is aligned with the first pipe element 110, the pipe coupling 100 is moved such that the gasket 150 is positioned around the ends 115,125 of the pipe elements 110,120 and the pipe connection rings 300a,b are aligned with the connection grooves 112,122.

Figure 20E:
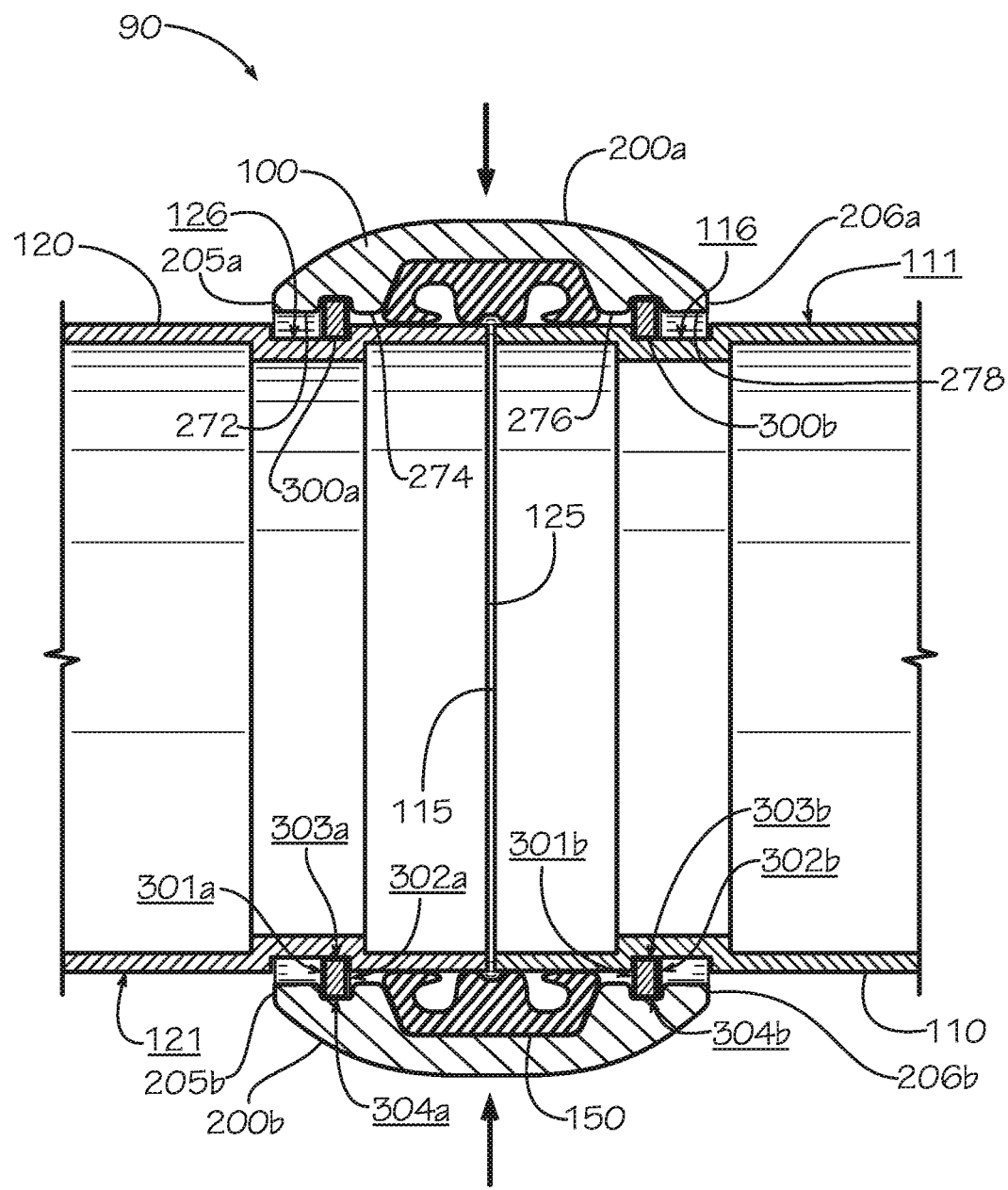
FIG. 20E is a sectional view of the pipe system of FIG. 20A with the pipe coupling tightened around and connecting the first pipe element and the second pipe element.

As shown in FIG. 20E, when the coupling segments 200a,b are clamped down or tightened around the pipe elements 110,120 by tightening the nuts on the bolts or by any other tightening method, the gasket 150 deforms into sealing engagement against the outer surfaces 111,121 of the pipe elements 110,120 and the pipe connection rings 300a,b sit respectively within the connection grooves 112,122. A radially innermost portion of the respective inner surface 303a,b of each of the pipe connection rings 300a,b may contact a radially innermost portion of a connection groove surface 116,126 that defines a groove bottom of the connection grooves 112,122.

When the pipe coupling 100 is a flexible-type pipe coupling, a space or gap 1200 (shown in FIG. 22B) may remain between the pipe connection ring 300 and the radially innermost portion of the connection groove surface 116,126 of the connection groove 112,122 of the pipe element 110,120. The gap 1200 may exist only at specific points or around the full circumference of the pipe connection ring 300. The pipe connection ring 300 can be configured to compress only to a certain point at which an inner diameter of the pipe connection ring 300 is greater than the outer diameter of the radially innermost portion of the connection groove surface 116,126. The gap 1200 allows or the spaces allow a limited amount of freedom for the pipe elements 110,120 to move within the pipe coupling 100, which can be beneficial for some installations including those in earthquake-prone geographic areas. If the pipe connection ring 300 is allowed to compress further, then even complete tightening of the pipe coupling 100 will not cause the pipe connection ring to fully compress. In that event, the coupling segments 200a,b will deform uniformly and leave no space between the pipe connection ring and the radially innermost portion of the connection groove surface 116,126. This results in a rigid-type pipe coupling, in which the pipe elements 110,120 have no clearance with which to move within the pipe coupling 100, which may prove advantageous for some installations including those in which the fluid inside the pipe elements 110,120 is at high pressure. An example of a rigid-type configuration is illustrated in FIGS. 20A-20E.

An axial end surface such as the first axial end surface 301a,b or the second axial end surface 302a,b of the pipe connection rings 300a,b may contact an axially outermost portion of the connection groove surface 116,126 (i.e., axially outermost meaning closest to the ends 115,125) that defines a sidewall of the connection grooves 112,122. The connection rings 300a,b may not contact the sidewalls of the connection grooves 112,122 in other aspects until an internal or external force, such as fluid pressure within a pipe system 90, acts to separate the pipe elements 110,120, and the connection rings 300a,b thereby engage the sidewalls and groove bottoms to prevent this separation. In some aspects, a gap can remain between the transition portions 272,274, 276,278 of the inner surface 202a,b of each coupling segment 200a,b and a radially outermost portion of the outer surfaces 111,121 of the pipe elements 110,120 upon clamping down the coupling segments 200a,b, or the transition portions 272,274,276,278 of the inner surface 202a,b of each coupling segment 200a,b can come into partial or complete contact with the outer surfaces 111,121 of the pipe elements 110,120 in other aspects.

When the pipe coupling 100 is aligned on the joint of the pipe elements 110,120 as shown in FIG. 20E, the fastening devices 290a,b are used to draw the coupling segments 200a,b together. In one aspect, this takes the form of fastening devices 290a,b compressing the fastener pads 221,222 toward each other. In one aspect, the pipe coupling 100 is rigid and includes no deflection of the coupling segments 200a,b. In another aspect, the coupling segment is deformable between a non-assembled state and an assembled and tightened state, each coupling segment 200a,b of the pipe coupling 100 deflecting at least slightly when the pipe coupling 100 is tightened. In various aspects, when the coupling segments 200a,b travel toward each other and deform under the tightening of the fastening devices 290, the gasket 150 is deformed in accord therewith. In one aspect, a rigid or semi-rigid gasket 150 may be included. The process for accommodating such a material may be altered from that described herein; for example and without limitation, however, the gasket 150 can comprise the deformation groove 517 to allow a place for material to flow upon deformation of the gasket 150.

Several features of the gasket 150 ease installation as described. Friction can cause installation of rubber gaskets to bind against outer surfaces 111,121 of pipe elements 110,120. With reference to the method shown FIGS. 20A-20E, axially outer drafted edges and axially inner drafted edges of the gasket 150 are both drafted to ease the pipe elements 110,120 into the coupling void 105. Axially outer drafted edges and axially inner drafted edges also help to prevent rollover of the sealing ridges 525a,b of the gasket 150 while sliding the pipe coupling 100 on and off, as the drafted profiles are less likely to bind against the outer surfaces 111,121 of the pipe elements 110,120. Additionally, sealing surfaces 526a,b are substantially parallel to the outer surfaces 111,121 of the pipe elements 110,120 even when the gasket 150 is not tightened against the pipe elements 110,120. Additionally, the axially outward position of the central rib 530 with respect to the sealing ridges 525a,b, prevents the central rib 530 from obstructing the installation of the pipe coupling 100 before deformation of the gasket 150. When the coupling segments 200a,b are clamped down, the gasket 150 deforms, and the central rib 530 contacts the outer surfaces 111,121 of the pipe elements 110,120. This configuration allows the gasket 150 to slide onto the pipe elements 110,120 without biasing the sliding in one direction and prevents binding of the sealing ridges 525a,b during installation. These features prevent the gasket 150 from rolling over when the pipe coupling 100 is installed on the pipe elements 110,120 and allows the gasket 150 to be properly placed over the joint between the pipe elements 110,120 for proper sealing, among other advantages. When the gasket 150 is properly aligned over the joint and engaged against the outer surfaces 111,121 of the pipe elements 110,120, each of the sealing members 557a,b may contact the outer surfaces 111,121.

Figure 21:
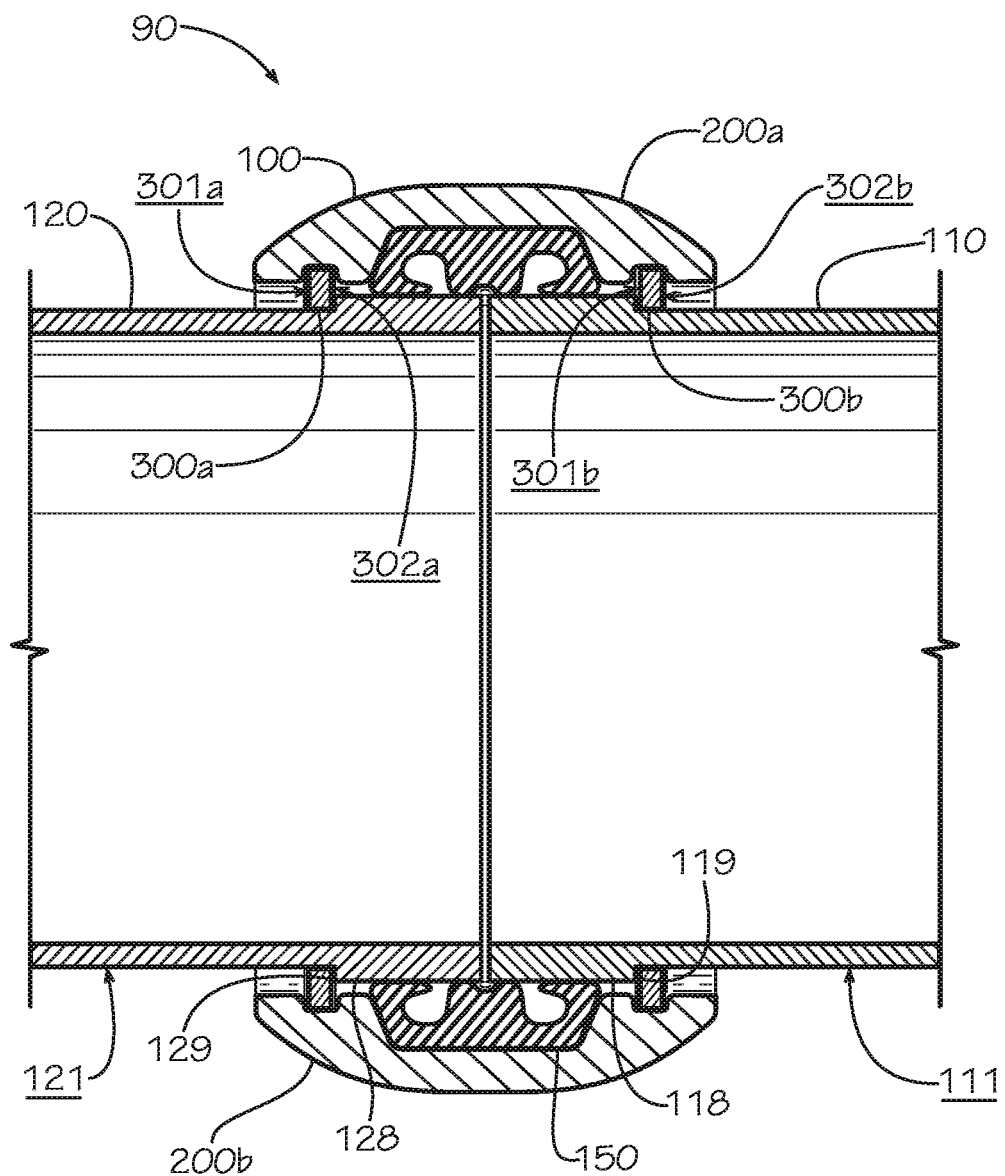
FIG. 21 is a sectional view of a pipe system with the pipe coupling tightened around and connecting the first pipe element and the second pipe element in accordance with another aspect of the current disclosure.

FIG. 21 shows the pipe coupling 100 assembled and tightened around and connecting the pipe elements 110,120. The pipe elements 110,120 respectively comprise shoulders 118,128 defining sidewalls 119,129 instead of having connection grooves 112,122. One of the axial end surfaces 301a,b or the axial end surfaces 302a,b of each of the pipe connection rings 300a,b may contact one of the sidewalls 119,129 of the shoulders 118,128 to engage the pipe elements 110,120 when an internal or external force, such as fluid pressure with the pipe system 90, acts to separate the pipe elements 110,120. This contact prevents separation of either pipe element 110,120 from the pipe coupling 100 or from each other once the pipe coupling 100 is tightened. The pipe coupling 100 disclosed herein could be used with plain-end pipe elements as well that do not incorporate a connection groove 112,122 or a shoulder 118,128.

In one aspect, the pipe elements 110,120 are approximately the same diameter, although non-uniform diameter pipe elements may be also be joined by adjusting the dimensions of the pipe coupling 100 appropriately. In one aspect, each of the pipe elements 110,120 has ends 115,125 that define a diameter equal to a diameter of the respective pipe elements 110,120. In another aspect, the ends 115,125 can be flared slightly. Grooves 112,122 can be formed using one or more of at least two methods: rolling and machining. If the grooves 112,122 are machined, the pipe elements 110,120 are less likely to have flares on the ends 115,125 and are more likely to resemble the geometry shown. If the grooves 112,122 are rolled, however, the pipe elements 110,120 are more likely to have ends 115,125 which are flared, though rolled pipe elements 110,120 may not have flares in other aspects. As such, the pipe coupling 100 can be made to accommodate the potential flaring of ends 115,125. When the ends 115,125 are flared, the pipe coupling 100 can be sized to fit over the largest possible flare of the ends 115,125 based on standard tolerancing for creating the grooves 112,122.

Figure 22A:
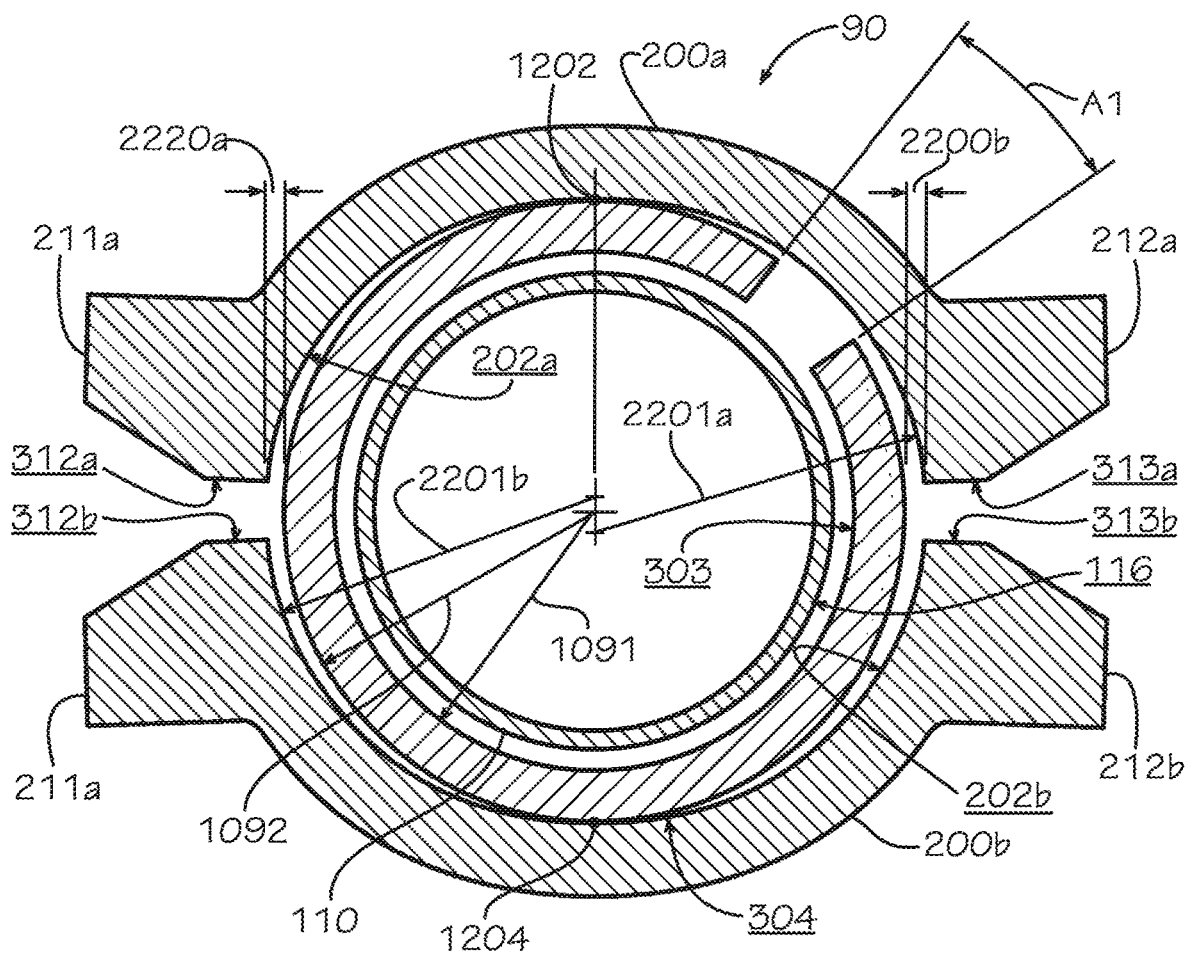
FIG. 22A is a sectional view of an untightened pipe coupling of the pipe system of FIG. 18 taken along line 22-22 of FIG. 18, in accordance with another aspect of the current disclosure in which the pipe coupling is of a flexible type.
Figure 22B:
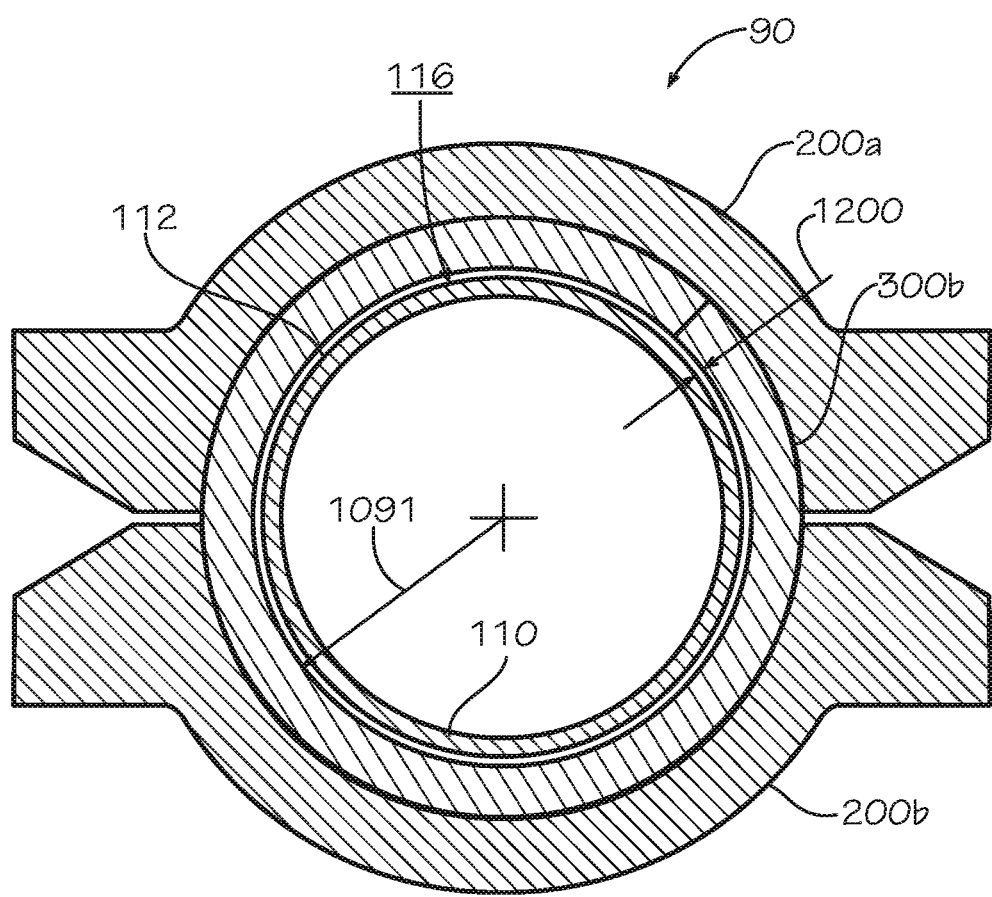
FIG. 22B is a sectional view of the pipe coupling of FIG. 22A in a tightened configuration.

Referring to FIGS. 22A and 22B, the pipe coupling 100 is shown as a flexible-type coupling with the fastening devices removed for clarity. As shown, the pipe connection ring 300$b$ is a split ring constructed identically as the pipe connection ring 300 shown in FIG. 10, with square ring ends 320,330 and the angular opening A1. In an uncompressed condition as shown in FIG. 22A, a gap 2200$a$ is defined between an outer surface 304 of the pipe connection ring 300$b$ and the groove bottom surface at the first end 211$a$ of the coupling segment 200$a$, and a gap 2200$b$ is defined between an outer surface 304 of the pipe connection ring 300$b$ and the groove bottom surface at the second end 212$a$ of the coupling segment 200$a$. Though the pipe connection ring can be configured to contact the groove bottom surface around the entire circumference of the pipe connection ring 300$b$, as shown the pipe connection ring 300$b$ contacts the coupling segments 200$a,b$ only at respective midpoints 1202,1204.

The angular opening A1 between the ring ends 320,330 (shown in FIG. 10) is small enough for the ring ends 320,330 of the pipe connection ring 300$b$ to contact one another before the inner surface 303 of the pipe connection ring 300$b$ contacts the connection groove surface 116 of the pipe element 110. In other words, radial compression of the pipe connection ring 300$b$ is limited to a predetermined magnitude that is less than a magnitude of the radial compression that would bring all of the components of the pipe coupling 100—including the coupling segments 200$a,b$, the pipe connection ring 300$b$, and the pipe element 110—in contact with one another. While the geometry of the coupling segments 200$a,b$ and the fastening devices 290$a,b$ could be adjusted to produce a similar result yielding a flexible-type pipe coupling, adjusting the angular opening A1 of the pipe connection ring is a simple and convenient approach.

In a compressed condition as shown in FIG. 22B, a gap 1200 remains between the pipe connection ring 300$b$ and the connection groove surface 116 of the connection groove 112 of the pipe element 110. Though shown for simplicity as extending around the entire circumference of the pipe connection ring 300$b$, the gap 1200 may only exists at specific points. With the ring ends 320,330 in contact with one another, the pipe connection ring 300$b$ cannot be compressed further, and continued application of compressive force deforms the coupling segments 200$a,b$ in the manner described with regard to FIG. 2. The gap 1200 allows a limited amount of freedom for the pipe element 110 to move within the pipe coupling 100, which can be beneficial in earthquake-prone geographic areas as previously noted. If, however, the magnitude of the ring opening is sufficiently large, then even full tightening compression will not cause the ends to meet, and in that event, the coupling segments 200$a,b$ will deform uniformly and leave no gap of the type shown by the gap 1200. This results in a rigid-type coupling, in which the pipe element 110 has no clearance with which to move within the pipe coupling 100, which can be beneficial for high-pressure environments. In addition to the configuration illustrated in FIGS. 20A-20E, an example of a rigid-type configuration is illustrated in FIG. 23, to be described in detail herein.

In one aspect, the pipe coupling 100 includes a tightened position and an untightened position, the pipe connection ring 300$a,b$ being in the uncompressed condition when the pipe coupling 100 is in the untightened position and the pipe connection ring 300$a,b$ being in a compressed condition when the pipe coupling is in the tightened position. An inner diameter of the pipe connection ring such as that equal to twice the overall inner radius 1091 of the pipe connection ring 300$a,b$ may be smaller in the compressed condition than twice the overall inner radius 1091 of the pipe connection ring 300$a,b$ in the uncompressed condition.

Figure 23:
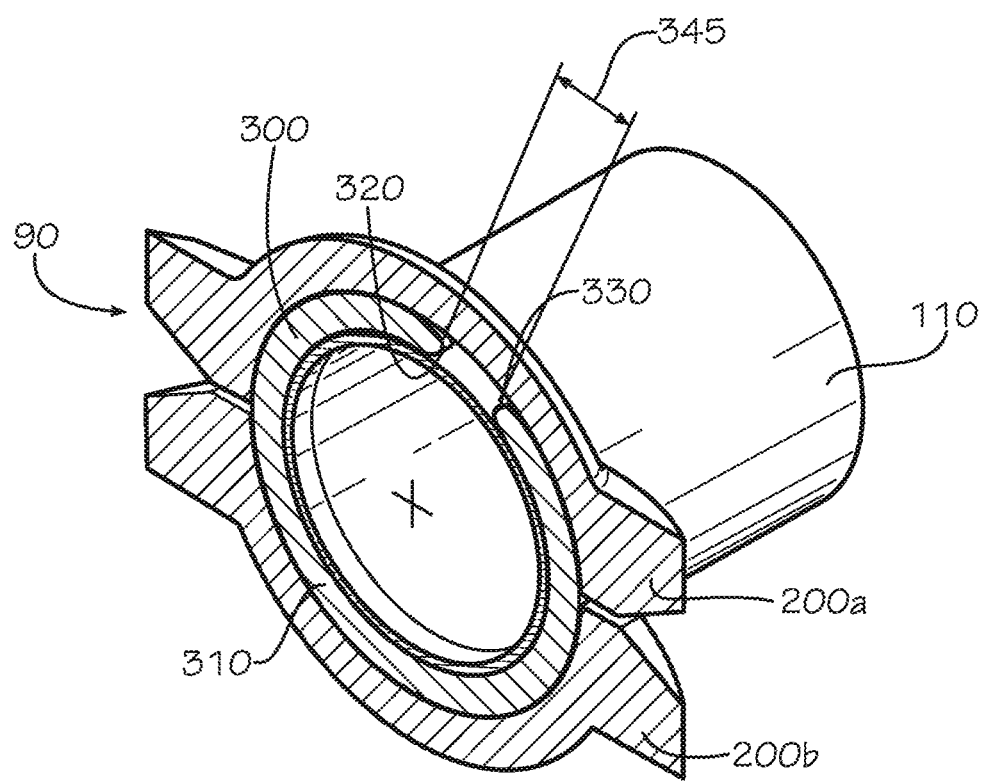
FIG. 23 is a sectional perspective view of the pipe coupling of FIG. 22 taken along line 23-23 of FIG. 22, in accordance with another aspect of the current disclosure in which the pipe coupling is of a rigid type.

FIG. 23 is a front sectional perspective view of the pipe coupling under full compression, showing no circumferential space between the pipe connection ring 300 and the coupling segments 200$a,b$. Also, an opening 345 remains between the two ring ends 320,330. The remaining gap represented by the opening 345 between the ring ends 320,330 under full compression is a common characteristic of a rigid-type coupling.

Figure 24:
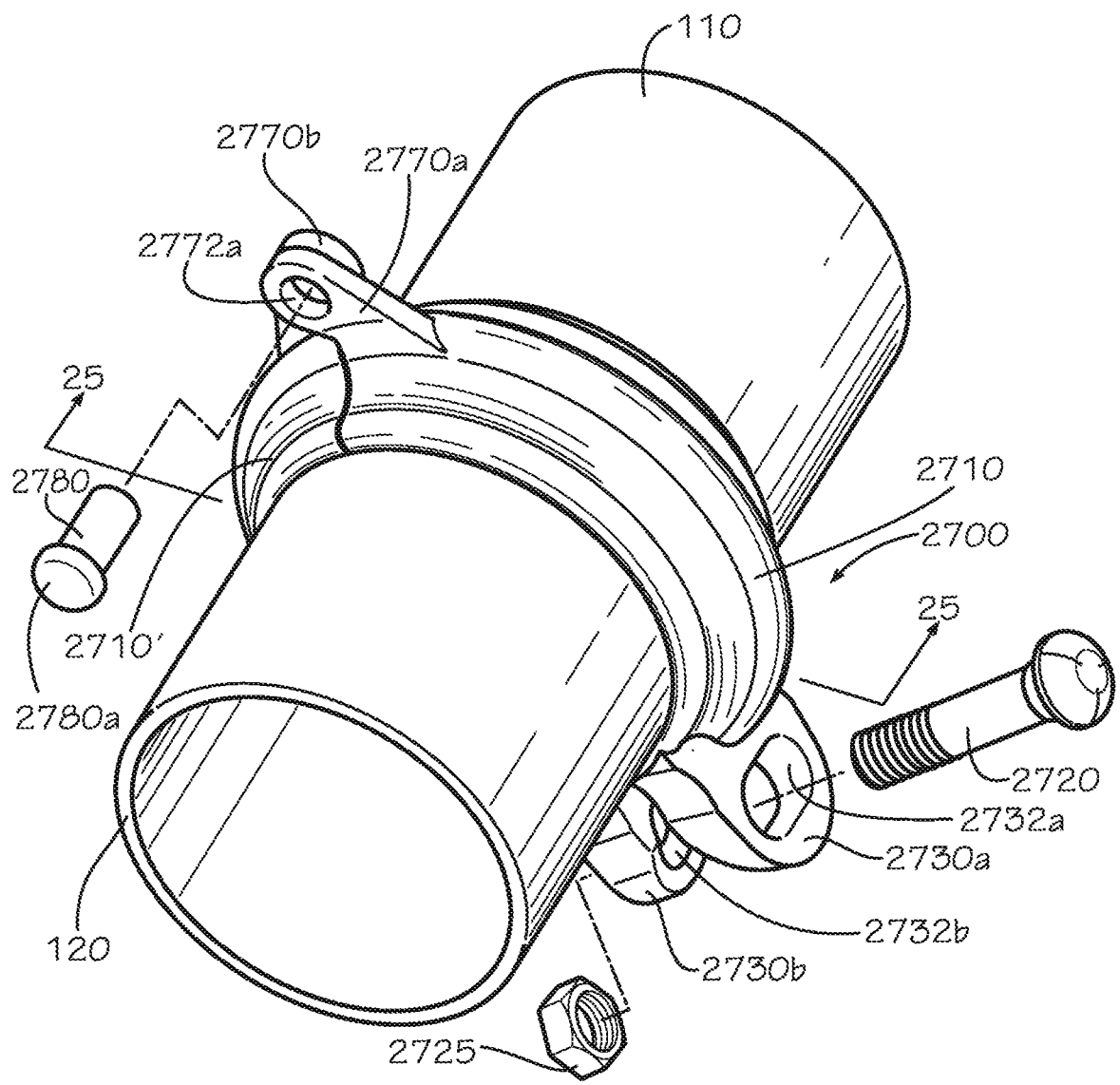
FIG. 24 is a perspective view of a pipe system constructed according to another aspect of the current disclosure, the view showing a pipe coupling in a closed position with a fastener, a nut, and a hinge pin shown in exploded relation to a pair of coupling segments of the pipe coupling.
Figure 25:
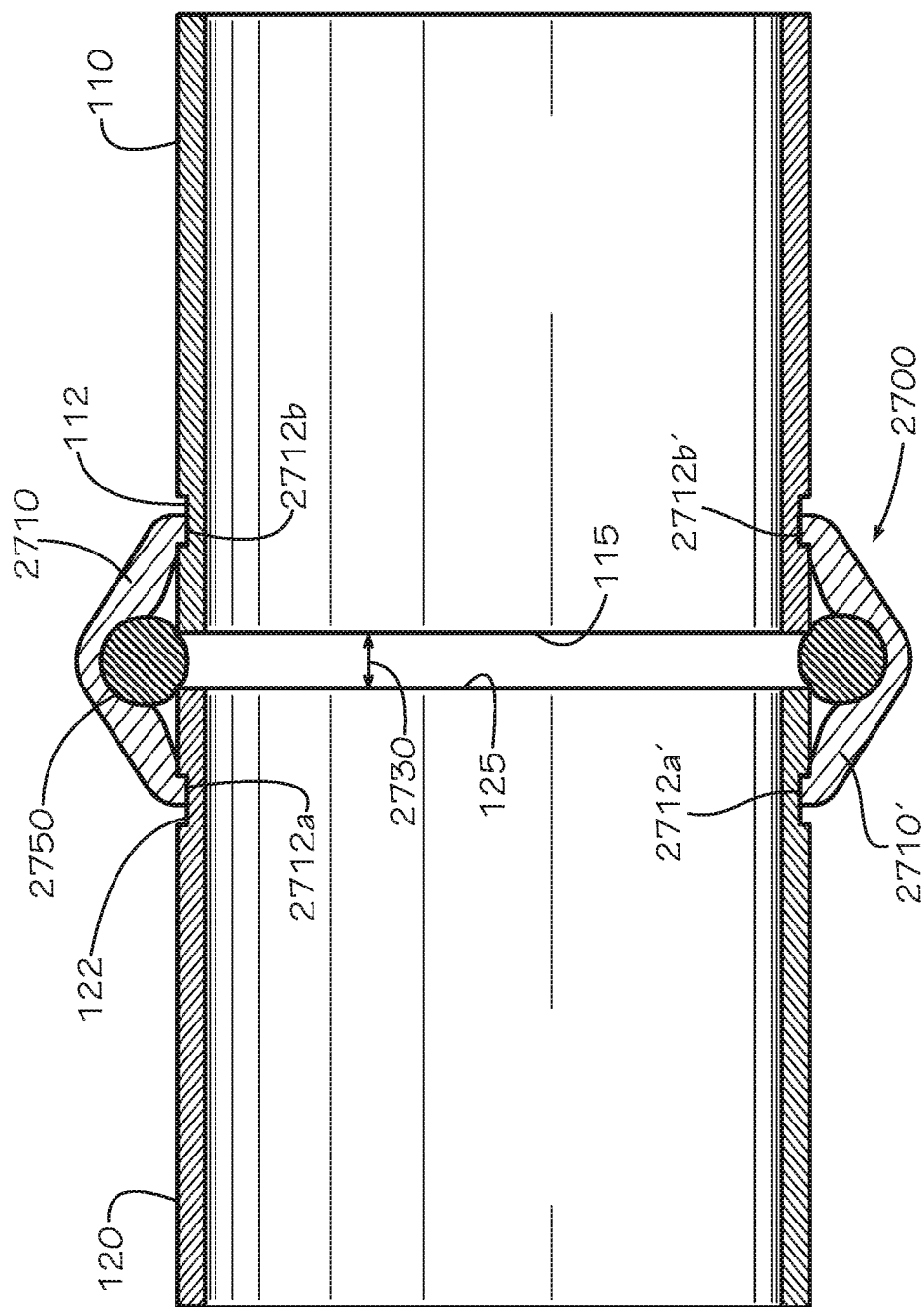
FIG. 25 is a sectional view of the pipe system of FIG. 24 taken along line 25-25 of FIG. 24.
Figure 26:
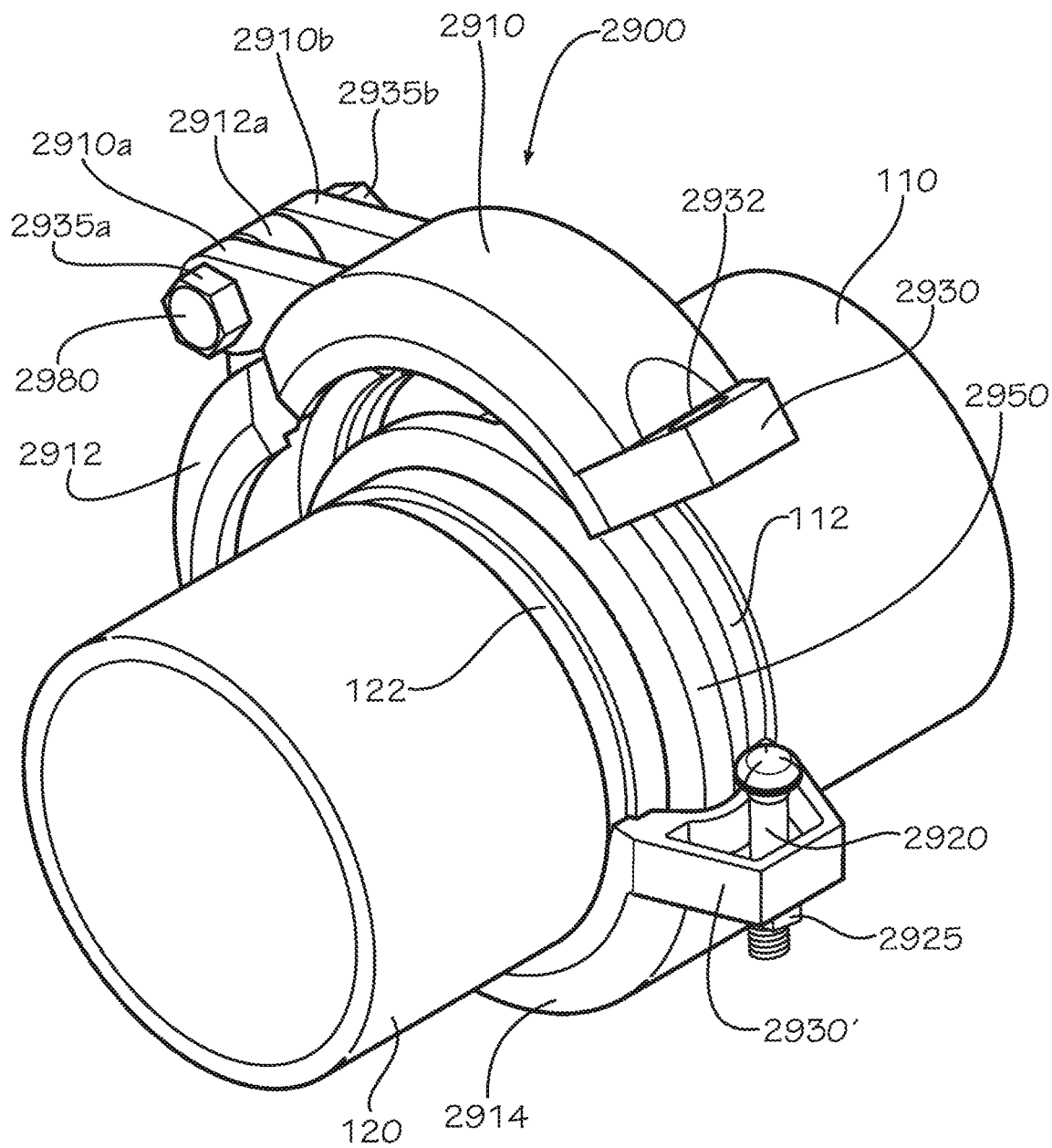
FIG. 26 is a perspective view of a pipe system constructed according to another aspect of the present disclosure, with a pipe coupling of the pipe system in an opened position.

A pipe coupling constructed according to another aspect of the current disclosure is depicted in FIGS. 24-25. In one aspect, a pipe coupling 2700 includes coupling segments 2710,2710', each generally arch-shaped in the same manner as the pipe coupling 100 shown in FIGS. 1-3B. The coupling segment 2710 has two ends, with a fastener pad 2730$a$ protruding proximate to one end, and an eyelet member 2770$a$ protruding from an opposite end of the coupling segment 2710. Similarly, the coupling segment 2710' has two ends, with a fastener pad 2730$b$ protruding proximate to one end, and an eyelet member 2770$b$ protruding from an opposite end of the coupling segment 2710'. Fastener holes 2732$a,b$ are defined in the fastener pads 2730$a,b$, respectively, and eyelet holes 2772$a,b$ (2772$b$ not shown) are defined in the eyelet members 2770$a,b$, respectively. A fastener 2720 extends through the fastener holes 2732$a,b$ and is secured in place with a nut 2725. A hinge pin 2780 with a head 2780$a$ extends through the eyelet holes 2772$a,b$ and can be secured in place with any suitable securement member (not shown), such as by attachment of another head on the hinge pin 2780 after it has been guided through the eyelet holes 2772$a,b$.

In this arrangement, with the fastener 2720 removed, the coupling segments 2710,2710' can be pivoted with respect to the hinge pin 2780 to bring the pipe coupling 2700 to an open position, facilitating the positioning of the pipe coupling 2700 at a desired location between the pipe elements 110,120. Specifically, as shown in FIGS. 25, a gasket 2750 is contained within the coupling segments 2710,2710' and is positioned to bridge a gap 2730 between the respective ends 115,120 of the pipe elements 110,120. With the gasket 2750 in position, the coupling segments 2710,2710' can be pivoted about hinge pin 2780 to a closed position of the pipe coupling 2700. The fastener 2720 can then be passed through the fastener holes 2732a,b and secured in place by nut 2725, which is then tightened to put the gasket 2750 under compression. As shown in FIG. 25, the coupling segments 2710,2710' respectively include rims 2712a,b and 2712a', b'. In the tightened position, rims 2712a,b and 2712a', b' contact the respective connection grooves 112,112 of the pipe elements 110,120 to lock the pipe coupling 2700 in place and to seal the gap 2730 with the gasket 2750. Although the gasket 2750 is shown in FIG. 25 as having a circular cross-section, other cross-sectional shapes exhibiting acceptable sealing properties can also be used with the pipe coupling 2700.

Figure 27:
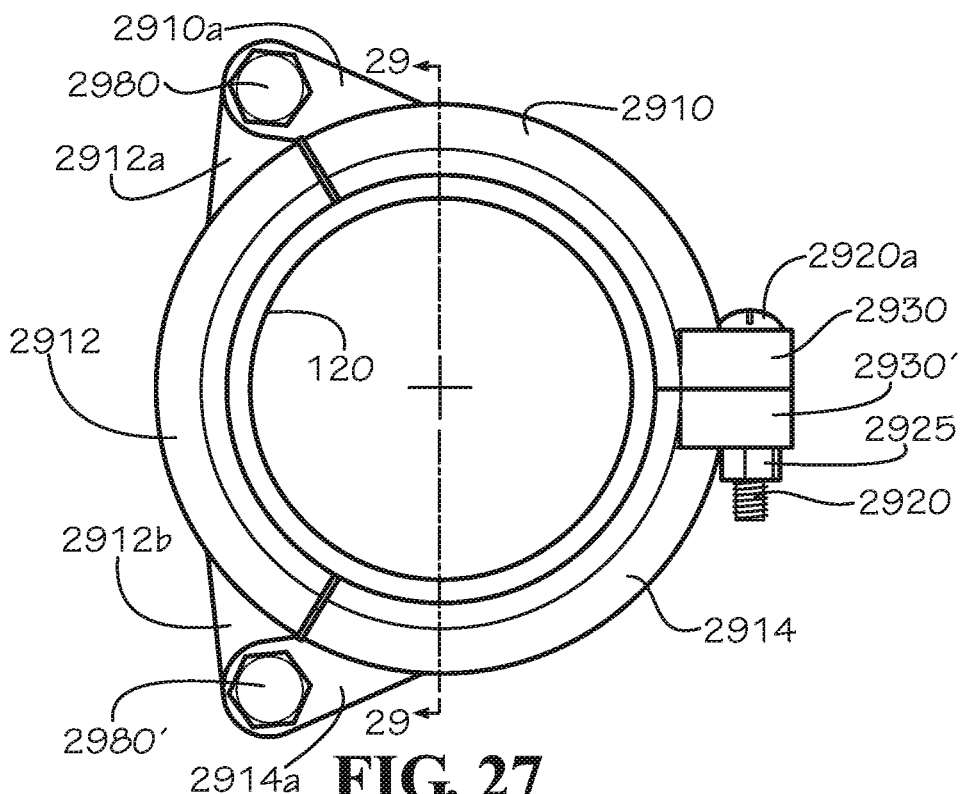
FIG. 27 is a front view of the pipe system of FIG. 26, with the pipe coupling fastened in a closed position.
Figure 28:
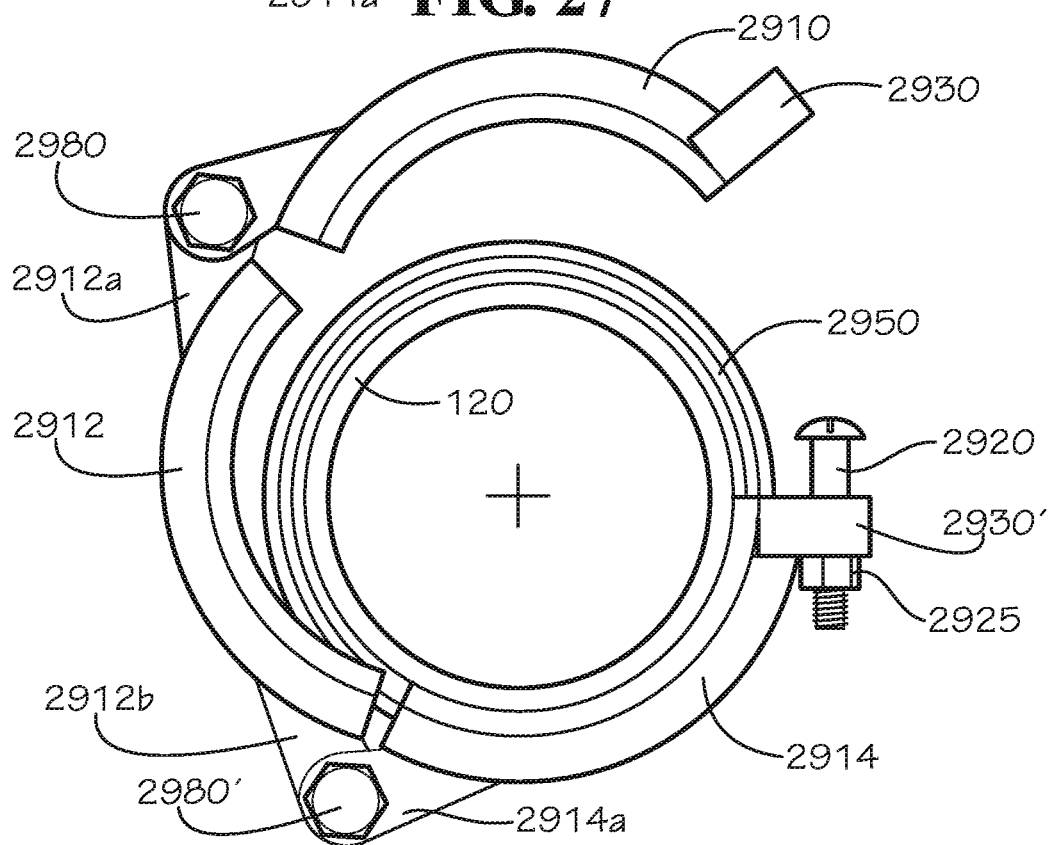
FIG. 28 is a front view of the pipe system of FIG. 26, with the pipe coupling in an opened position.

FIGS. 26-29 depict a pipe coupling constructed in accordance with another aspect of the current disclosure. In one aspect, a pipe coupling 2900 includes arch-shaped coupling segments 2910,2912,2914. The coupling segment 2910 has two ends, with a fastener pad 2930 protruding proximate to one end, and a pair of spaced eyelet members 2910a,b protruding from an opposite end. Similarly, the coupling segment 2914 has two ends, with a fastener pad 2930' protruding proximate to one end, and a pair of spaced eyelet members 2914a,b (2914a shown in FIGS. 27 and 2914b shown in FIG. 29) protruding from an opposite end. The coupling segment 2912 has two opposed ends, with one eyelet member 2912a protruding proximate to one end and positioned between the pair of eyelet members 2910a,b, and another eyelet member 2912b (shown in FIG. 29) protruding proximate to an opposite end and positioned between the pair of eyelet members 2914a,b. Fastener holes 2932,2932' (2932' not shown) are defined in the fastener pads 2930, 2930', respectively, and a fastener 2720 extends through the fastener holes 2732a,b and is secured in place with a nut 2725. The eyelet members 2910a,2912a,2910b define a set of axially-aligned eyelet holes (not shown) that receives a hinge pin 2980. Similarly, the eyelet members 2914a,2912a, 2914b define another set of axially-aligned eyelet holes (not shown) that receives a hinge pin 2980'. Hinge pins 2980, 2980' can be secured in place within their respective eyelet members by connecting mechanisms such as a bolt 2935a and a nut 2935b (both shown in FIG. 26) and by connecting mechanisms such as a bolt 2936a and a nut 2936b (shown in FIG. 29).

This dual hinge pin arrangement allows the coupling segment 2910 to pivotally move with respect to the coupling segment 2912 about the hinge pin 2980, and it allows the coupling segment 2912 to pivotally move with respect to the coupling segment 2914 about the hinge pin 2980'. In this manner, the pipe coupling 2900 can be moved between a closed position shown in FIG. 27 to an open position shown in FIG. 28. In the open position, the pipe coupling 2900 can be positioned to surround a gasket 2950 that covers a gap 2990 between the ends 115,125 of the pipe elements 110,120 (shown in FIG. 29). Once at that position, the pipe coupling 2900 is moved to a closed position, then the fastener 2920 is inserted through the fastener holes 2932,2932' in the fastener pads 2930,2930', respectively. The nut 2925 is then tightened about the fastener 2920 to put the pipe coupling 2900 under compression to reach the tightened position shown in FIG. 29.

Figure 29:
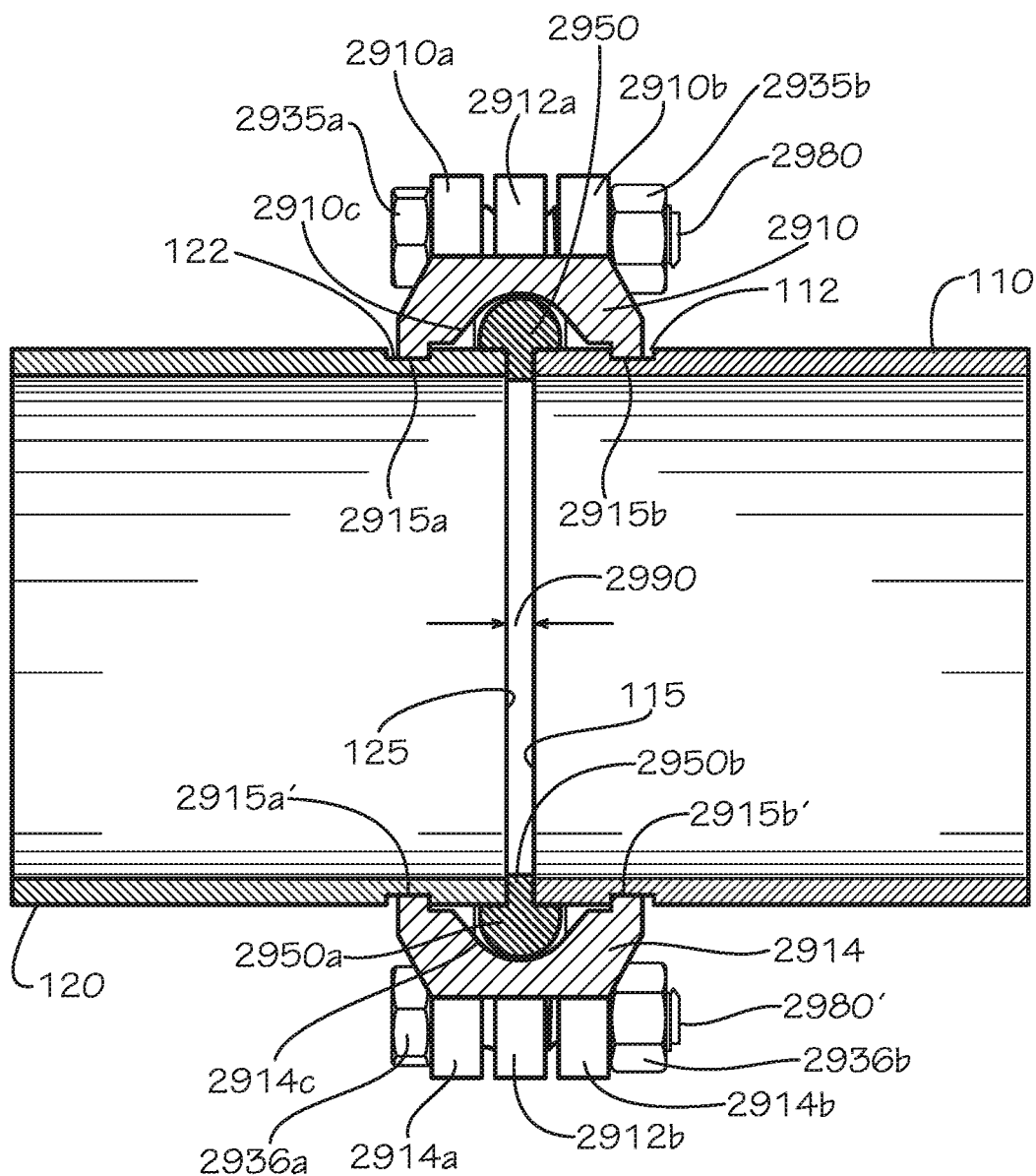
FIG. 29 is a sectional view of the pipe system of FIG. 26 taken along line 29-29 of FIG. 27, the view showing the pipe coupling in a tightened position.

As shown in FIG. 29, the coupling segment 2910 defines a gasket cavity 2910c and includes rims 2915a,b, and the coupling segment 2914 defines a gasket cavity 2914c and includes rims 2915a', b'. In the tightened position shown, the rims 2915a,a' contact the connection groove 122 in the pipe element 120, and the rims 2915b,b' contact the connection groove 112 in the pipe element 110. Additionally, the gasket cavities 2910c,2914c compress the gasket 2950 to hold it against the pipe elements 110,120 over the gap 2990. Gasket 2950 is shown having a cross-sectional shape that includes a mushroom-shaped portion 2950a from which an annular tongue 2950b extends radially inwardly. However, other cross-sectional shapes exhibiting acceptable sealing properties can also be used with the pipe coupling 2900.

FIGS. 30-33 depict a pipe coupling constructed in accordance with another aspect of the current disclosure. In one aspect, a pipe coupling 3300 includes arch-shaped coupling segments 3310,3315. The coupling segment 3310 has an exterior surface 3312 and two ends, with a fastener pad 3330 protruding proximate to one end, and a pair of bearing blocks 3310a,b protruding from the exterior surface 3312 proximate to an opposite end. Similarly, the coupling segment 3315 has an exterior surface 3312' and two ends, with a fastener pad 3330' protruding proximate to one end, and a pair of bearing blocks 3315a,b (bearing block 3315b shown in FIG. 33) protruding from the exterior surface 3312' proximate to an opposite end. Fastener holes 3332,3332' (both shown in FIG. 32) are defined in fastener pads 3330,3330', respectively, and pin apertures (not shown) are defined in the bearing blocks 3310a,b and 3315a,b. A fastener 3320 extends through the fastener holes 3332,3332' and is secured in place with a nut 3325.

Figure 30:
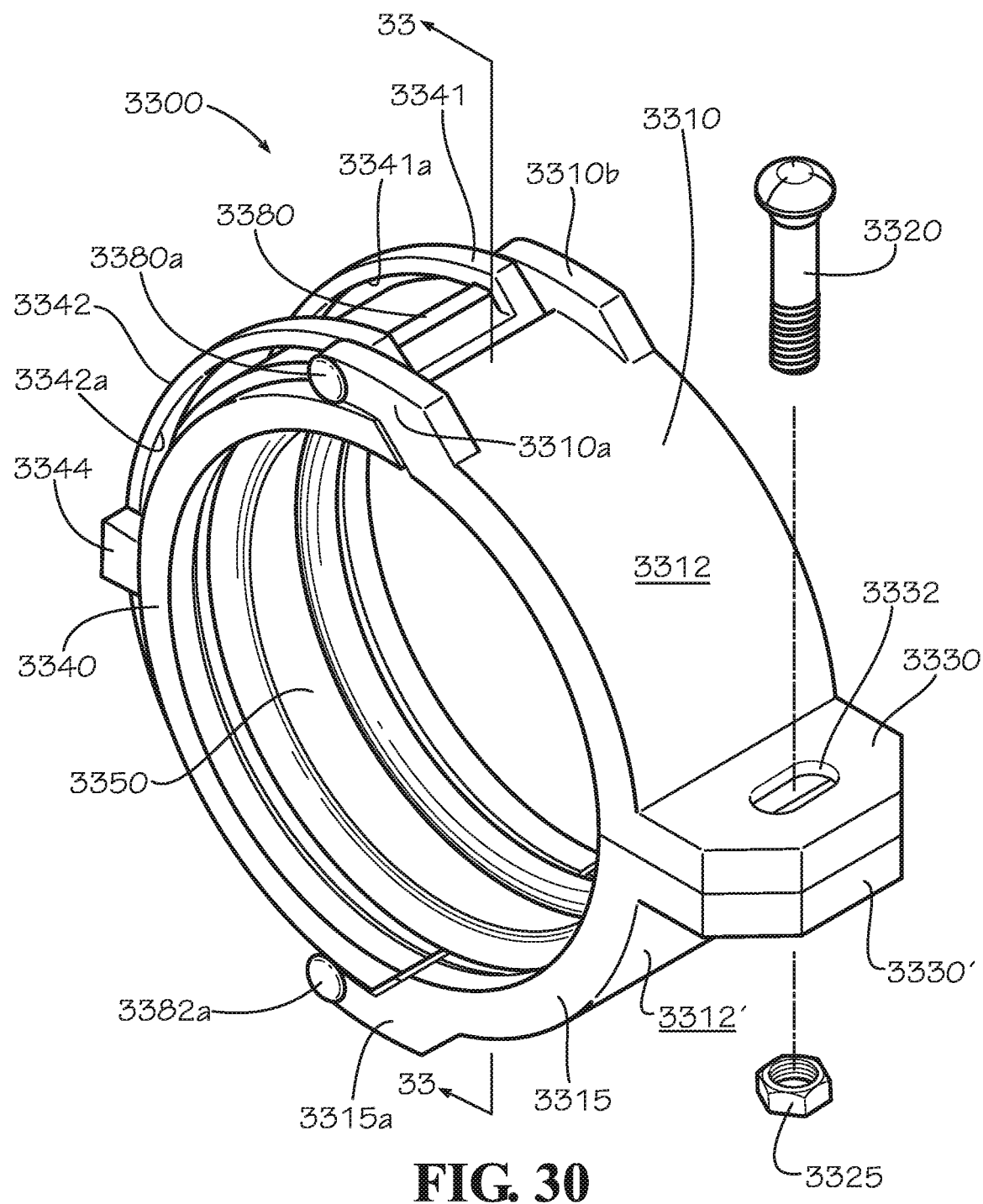
FIG. 30 is a perspective view of a pipe coupling constructed according to another aspect of the present disclosure, the pipe coupling shown in a closed position with a fastener and a nut shown in exploded relation to a pair of coupling segments of the pipe coupling.
Figure 31:
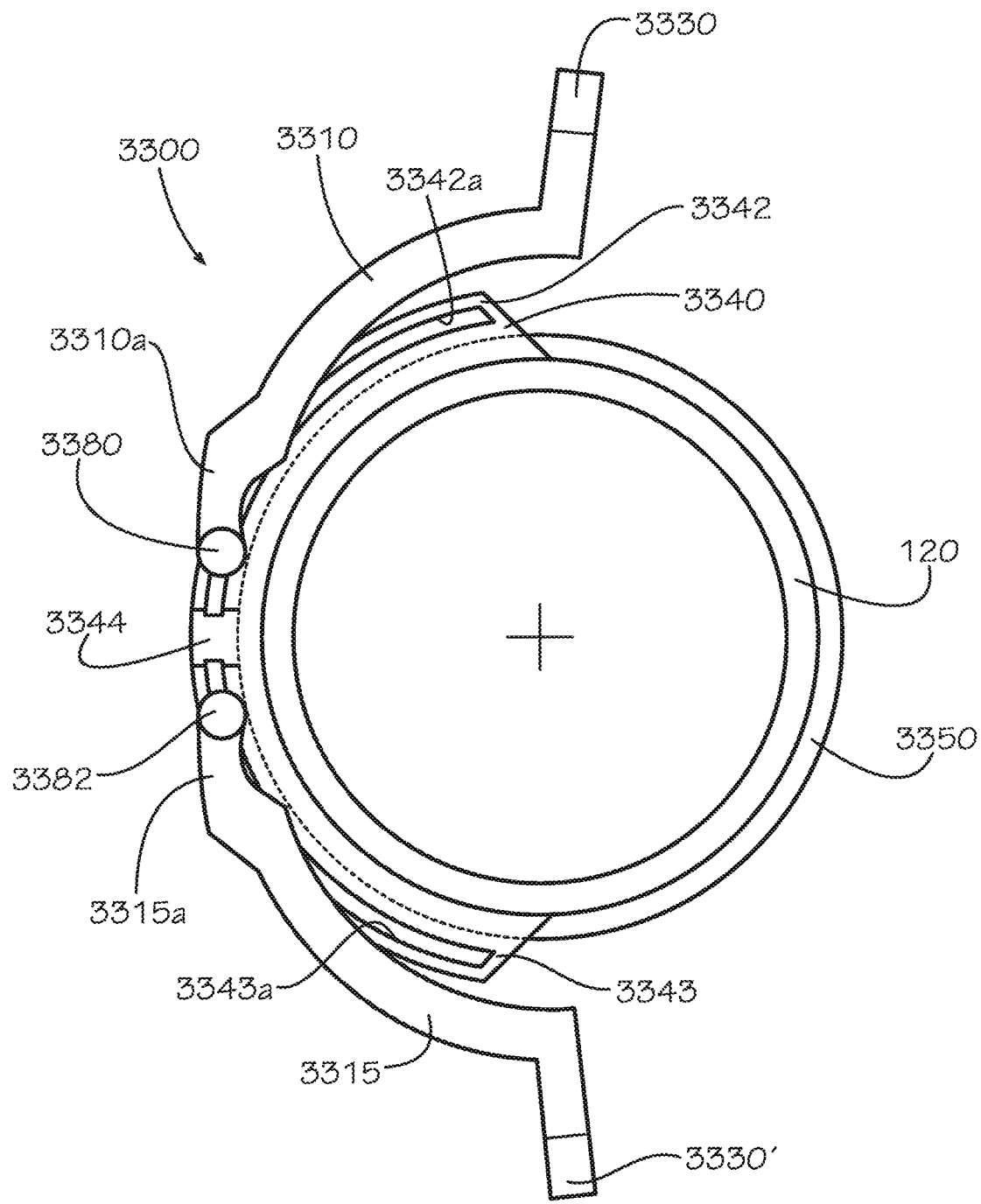
FIG. 31 is a front view of the pipe coupling of FIG. 30 shown in an open position.
Figure 33:
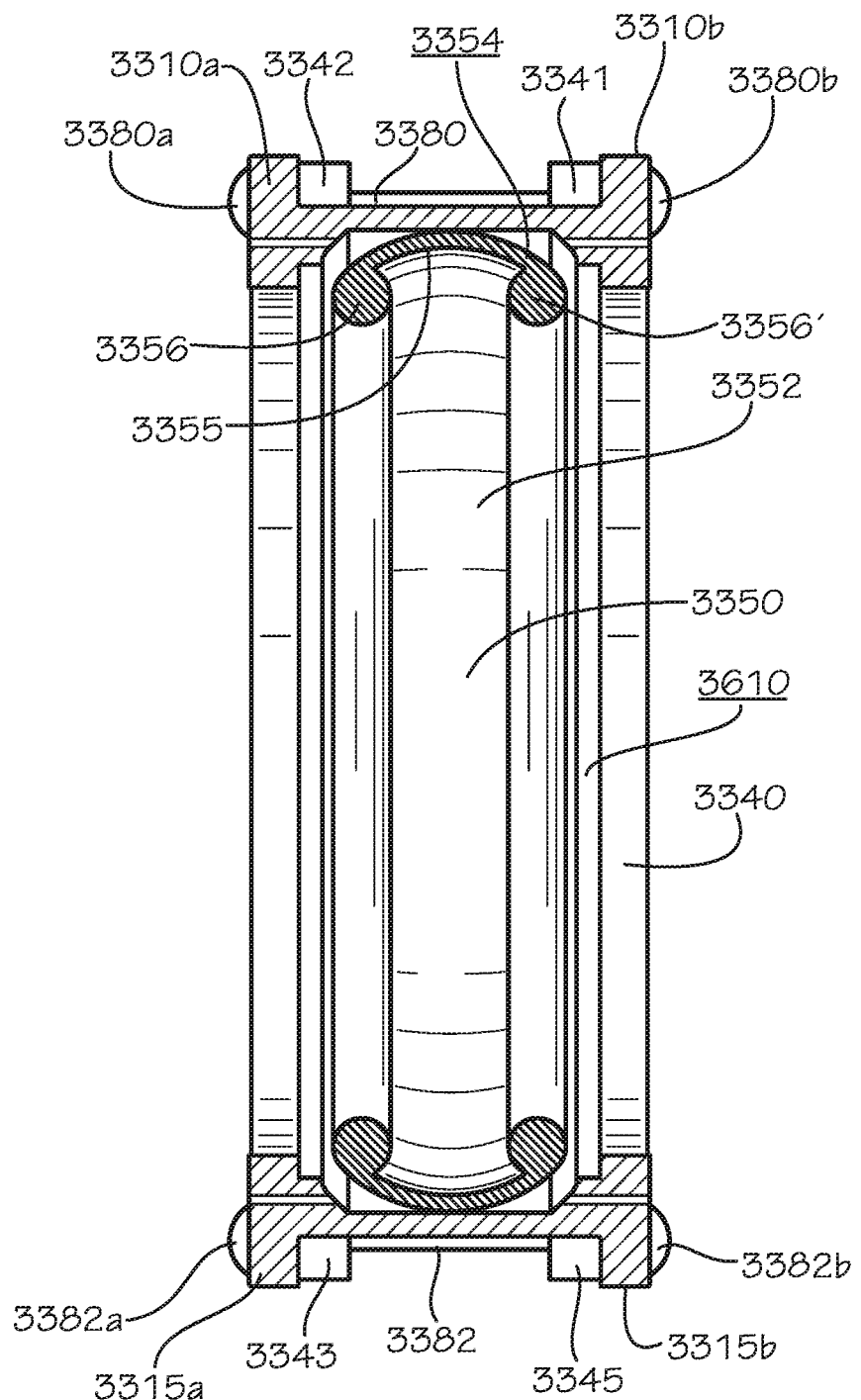
FIG. 33 is a sectional view of a rail member used in the pipe coupling of FIG. 30 together with a gasket engaged by the rail member.
Figure 34:
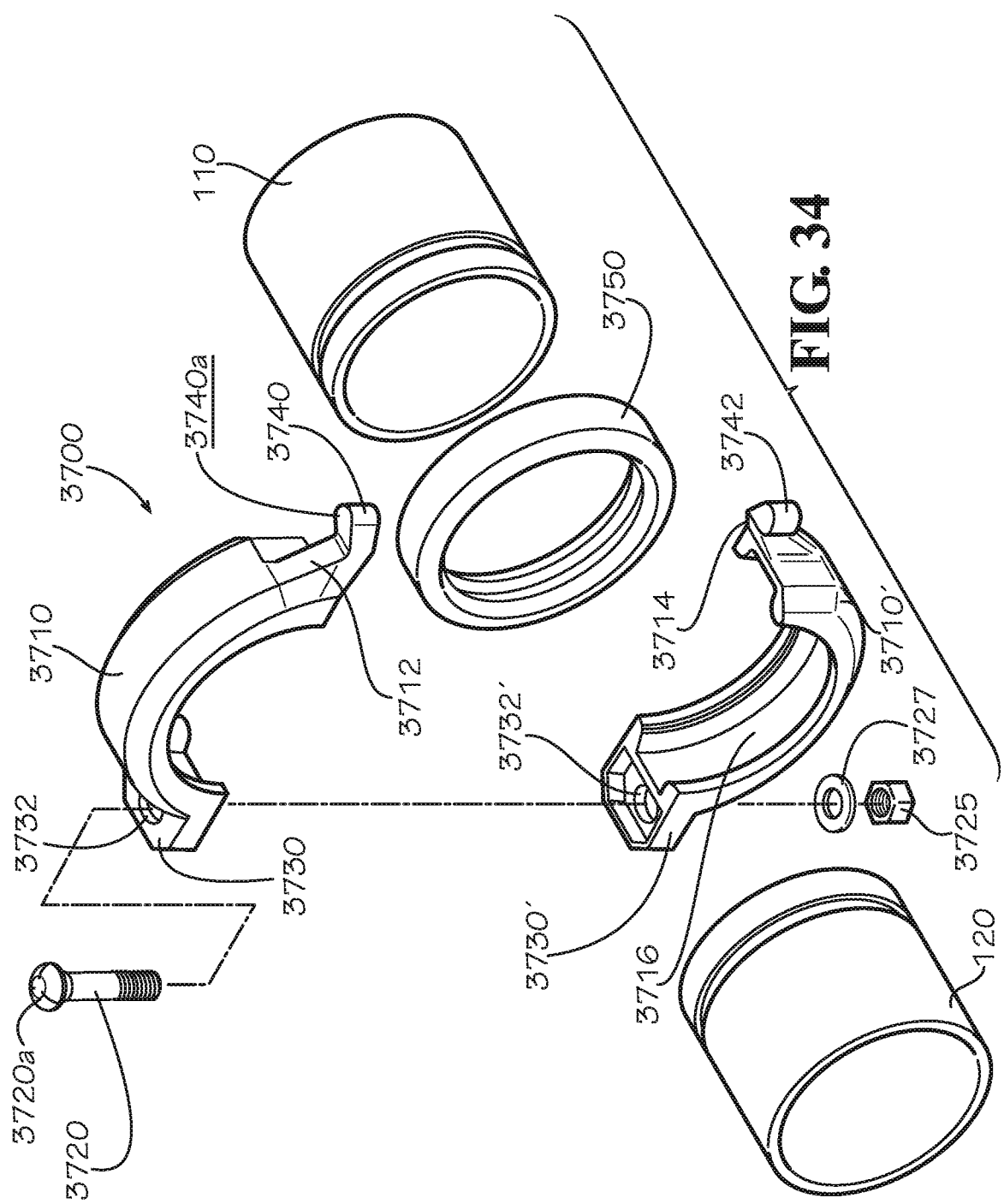
FIG. 34 is a perspective view of a pipe system constructed in accordance with another aspect of the current disclosure.

The pipe coupling 3300 also includes an arcuate rail member 3340 having a support block 3344 extending radially outward from the exterior surface of rail member 3340, the support block 3344 supporting a pair of upper rails 3341,3342 and a pair of lower rails 3343,3345 (the lower rail 3343 shown in FIG. 31 and the lower rail 3345 shown in FIG. 33). The pair of upper rails 3341,3343 respectively defines arcuate slots 3341a,3342a, and the pair of lower rails 3343,3345 respectively defines arcuate slots 3343a,3345a (slot 3345a not shown). A guide pin 3380 extends through the arcuate slots 3341a,3342a and is supported at its ends by the bearing blocks 3310a,b. The ends of the guide pin 3380 are provided with heads 3380a,b (shown in FIG. 33) to retain the guide pin 3380 within the bearing blocks 3310a,b. Similarly, a guide pin 3382 (also shown in FIG. 33) extends through the arcuate slots 3343a,3345a and is supported at its ends by the bearing blocks 3315a,b. The ends of the guide pin 3382 are provided with heads 3382a,b to retain the guide pin 3382 within the bearing blocks 3315a,b. FIG. 30 shows the pipe coupling 3300 in a shipping configuration, with the coupling segments 3310,3315 and the arcuate rail member encircling an annular gasket 3350, secured together by the fastener 3320 and the nut 3325.

Figure 32:
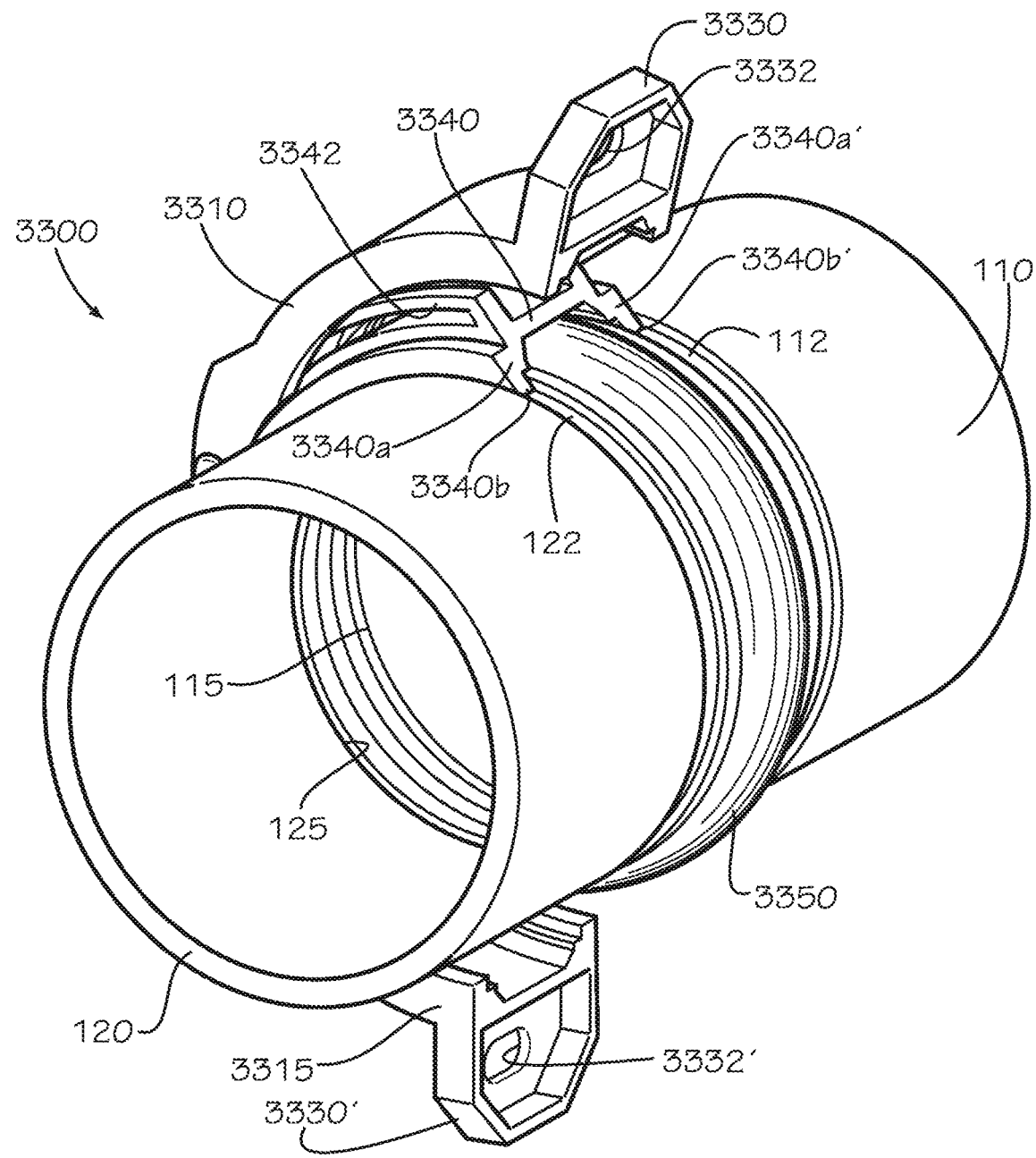
FIG. 32 is a perspective view of a pipe system including the pipe coupling of FIG. 30.

As shown in FIG. 32, the arcuate rail member 3340 has a general H-shaped cross-section, with lower legs 3340a,a' terminating in ends 3340b,b', respectively. When the fastener 3320 and the nut 3325 are removed, the pipe coupling 3300 can be moved to open positions such as those shown in FIGS. 31 and 32. The pipe coupling 3300 is opened by sliding the coupling segment 3310 circumferentially along the upper rails 3341,3342 toward the support block 3344, and by sliding the coupling segment 3315 circumferentially along the lower rails 3343,3345 toward the support block 3344. In other words, the fastener pads 3330,3330' are moved away from one another. FIG. 32 shows the annular gasket 3350 as positioned between the respective ends 115,125 of the pipe elements 110,120. Then, the lower legs 3340a,a' of the rail member 3340 are positioned to straddle the gasket 3350, such that ends 3340b,b' contact the connection grooves 112,122, respectively, of the pipe elements 110,120. To secure the pipe coupling 3300 to the pipe elements 110,120, the coupling segments 3310,3315 are both slid circumferentially along their respective rails away from the support block 3344, such that the fastener pads 3330,3330' are moved toward one another. The fastener 3320 is inserted through the fastener holes 3332,3332', and the nut 3325 is tightened to lock the pipe coupling 3300 in place about the ends 115,125 of the pipe elements 110,120.

FIG. 33 provides a cross-sectional view of the annular gasket 3350 and the rail member 3340, which defines an inner surface 3610. The gasket 3350 is ring-shaped and includes an annular body 3352 having a radially outer surface 3354 that interacts with the inner surface 3610 of the rail member 3340. The annular body 3352 includes an arcuate section 3355 having opposed ends that terminate in circular ribs 3356,3356'.

Figure 35:
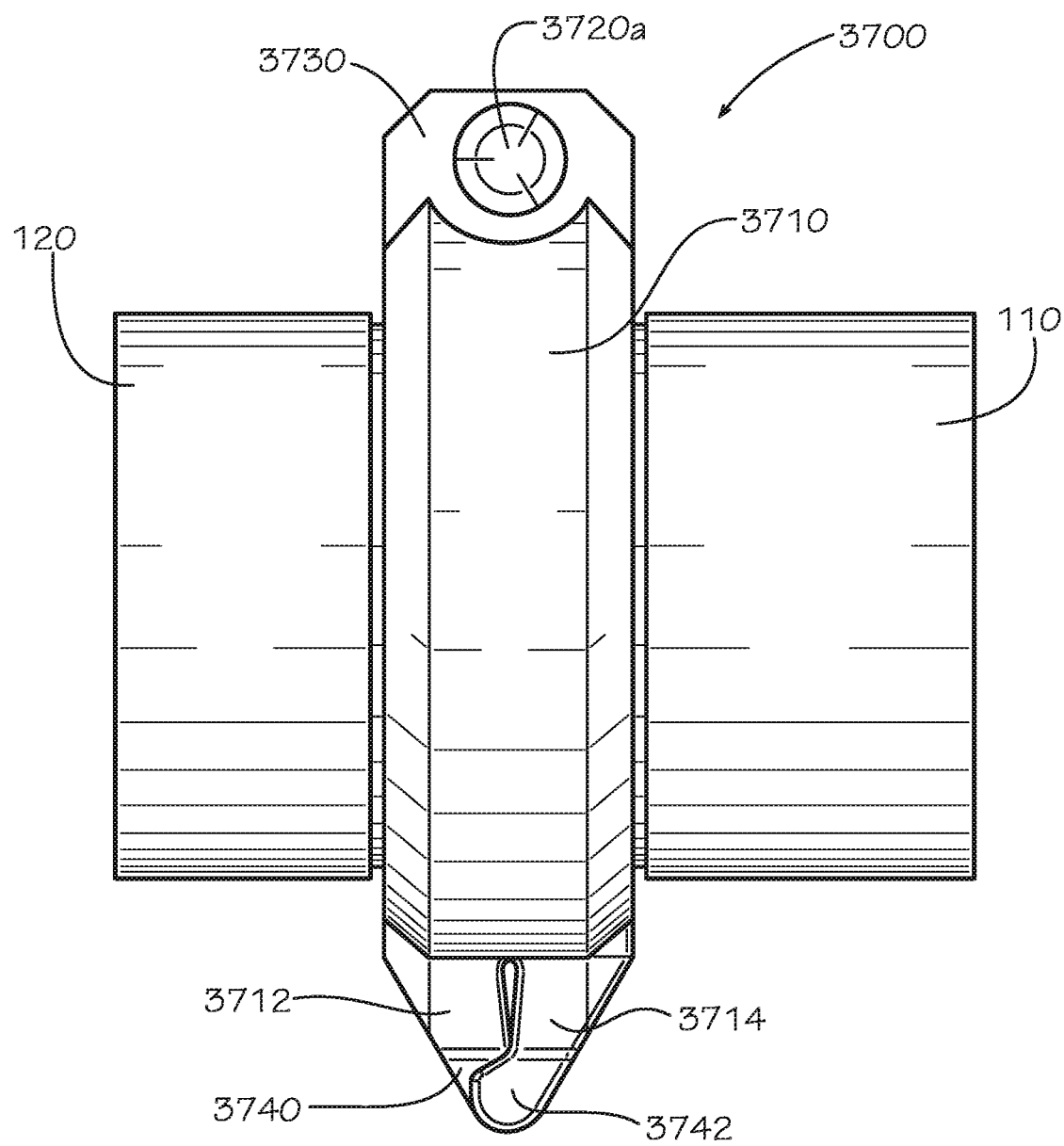
FIG. 35 is a top view of the pipe system of FIG. 34, with a pipe coupling of the pipe system installed on a pair of pipe elements of the pipe system.
Figure 36:
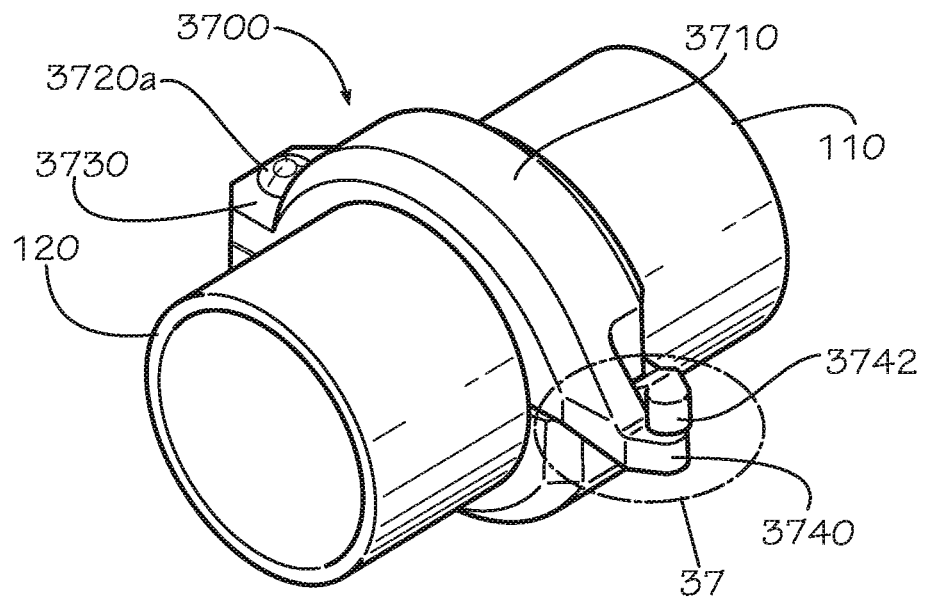
FIG. 36 is a perspective view of the pipe system of FIG. 34, with the pipe coupling installed on the pipe elements.
Figure 37:
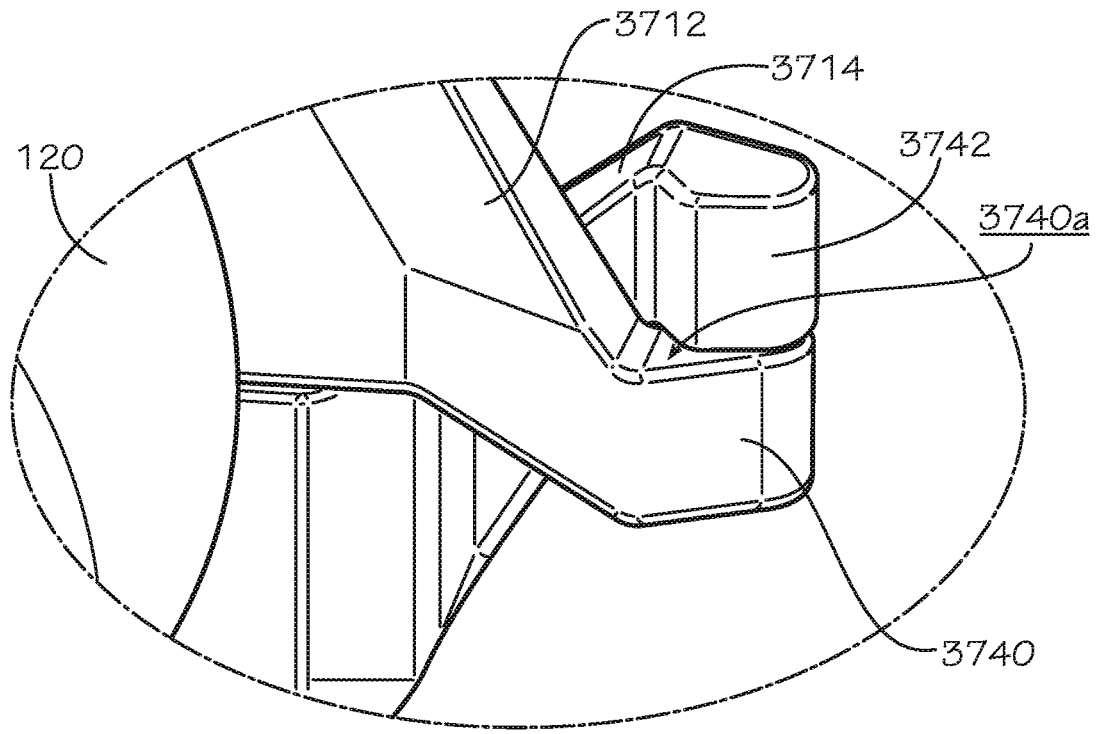
FIG. 37 is a detail view of the pipe system of FIG. 34 taken from detail 37 of FIG. 36.

FIGS. 34-37 depict a pipe coupling constructed in accordance with another aspect of the current disclosure. In one aspect, a pipe coupling 3700 includes arch-shaped coupling segments 3710,3710', each generally arch-shaped in the same manner as the pipe coupling shown in FIGS. 1-3B. The coupling segment 3710 has two ends, with a fastener pad 3730 protruding proximate to one end, and a leg 3712 extending downwardly from an opposite end. The leg 3712 is bent horizontally proximate to its end to form a bearing member 3740 having a bearing surface 3740a. The coupling segment 3710' has two ends, with a fastener pad 3730' protruding proximate to one end, and a leg 3714 extending upwardly from an opposite end. The leg 3714 is bent horizontally proximate its end to form a bearing member 3742 having a bearing surface (not shown). Fastener holes 3732,3732' are defined in the fastener pads 3730,3730', respectively. A fastener 3720, having a head 3720a, extends through the fastener holes 3732,3732' and is secured in place with a nut 3725. A washer 3727 may also be placed on the fastener 3720 between the fastener pad 3730' and the nut 3725. The coupling segments 3710,3710' have interior surfaces defining a gasket channel 3716 in which is seated an annular gasket 3750. The annular gasket 3750 seals the joint between the ends of the pipe elements 110,120 when the elements are aligned end-to-end within the pipe coupling 3700 (as shown in FIGS. 35 and 36). When the pipe coupling 3700 is fully tightened, as shown in FIGS. 35-37, the bearing members 3740,3742 interlock as a result of spring tension, countering the force of the tightened fastener 3720, exerted through the legs 3712,3714. The bearing surface of the bearing member 3742 presses against the bearing surface 3740a of the bearing member 3740 to provide securement of the pipe coupling 3700 at the end opposite the fastener pads 3730,3730', a resulting frictional force between the bearing surface of the bearing member 3742 and the bearing surface 3740a of the bearing member 3740 helping to secure the pipe coupling 3700 in the tightened position shown.

Figure 38:
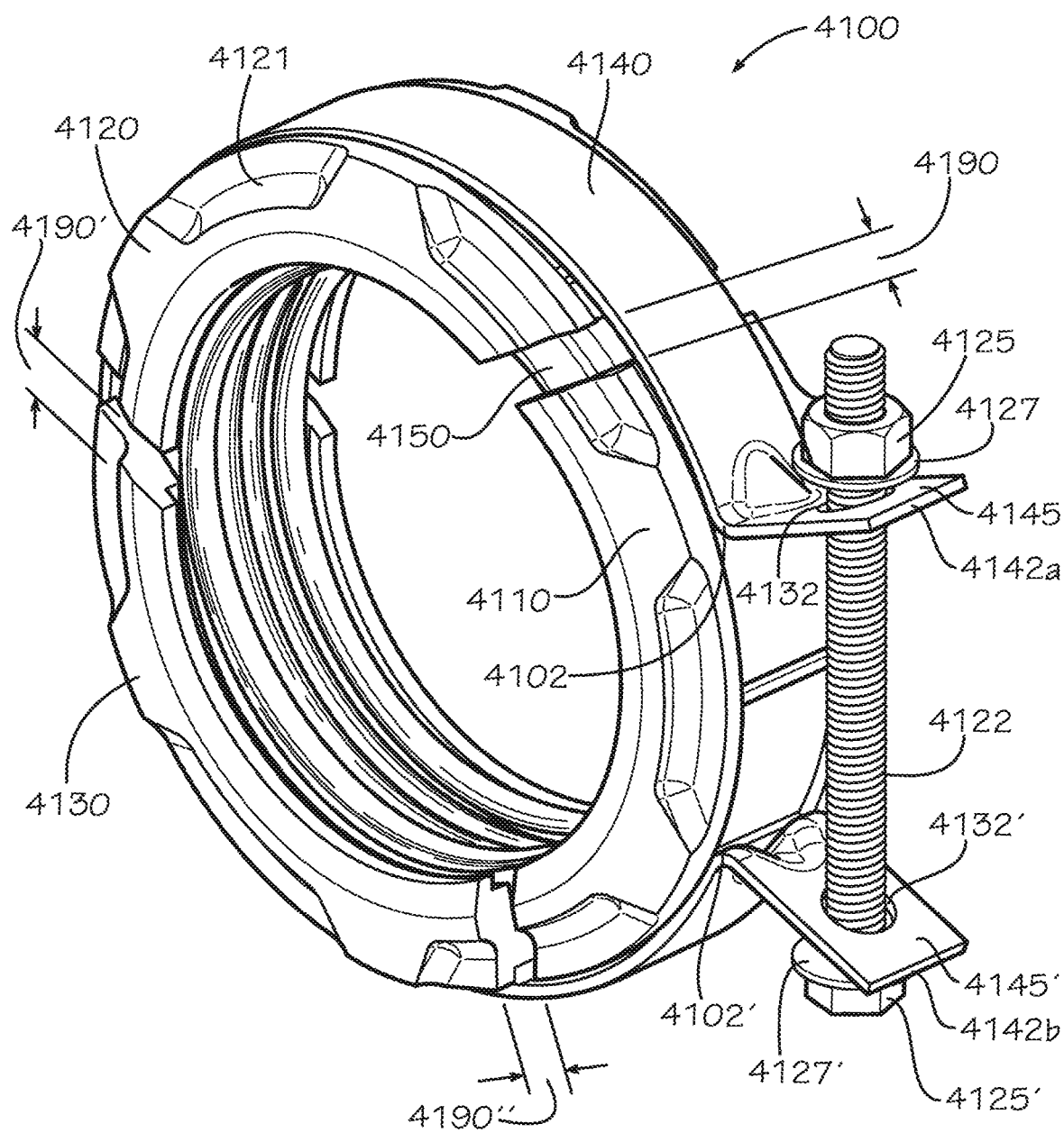
FIG. 38 is a perspective view of a pipe coupling constructed according to another aspect of the current disclosure, showing a pipe coupling in an untightened position.

FIG. 38 depicts a pipe coupling constructed in accordance with another aspect of the current disclosure. In one aspect, an adjustable pipe coupling 4100 includes three arcuate coupling segments 4110,4120,4130, circumferentially spaced from one another as indicated by gaps 4190,4190', 4190" defined by the coupling segments 4110,4120,4130. The coupling segment 4120 may include a plurality of recessed portions 4121, and the coupling segments 4110, 4130 may include a plurality of similar recessed portions. The coupling segments 4110,4120,4130 each has an interior surface that defines a gasket groove receiving an annular gasket 4150. The pipe coupling 4100 also includes a belt 4140 constructed of a strip of rigid material such as metal, though the choice of material of the belt 4140 can also be non-metallic. The belt 4140 defines apertures 4132,4132' proximate to ends 4142a,b, respectively, of the belt 4140, respectively, and is wrapped around the outer periphery of the coupling segments 4110,4120,4130. Bends 4102,4102' orient the ends 4142a,b in an outwardly flaring position, defining fastener pads 4145,4145'. Apertures 4132,4132' are axially aligned to admit a threaded fastener 4122. Washers 4127,4127' are placed about the upper and lower ends, respectively, of the fastener 4122. A nut 4125 is threaded onto the upper end of the fastener 4122 and when tightened, exerts downward pressure, through the washer 4127, on the fastener pad 4130. Similarly, a head 4125' of the fastener 4122, when the fastener 4122 is tightened, exerts upward pressure, through the washer 4127', on the fastener pad 4130'. In this manner, the belt 4140 exerts circumferential compression upon the coupling segments 4110,4120,4130, which in turn, exert such compression upon the annular gasket 4150 to effect sealing of a joint of pipe elements 110,120 (pipe element 110 shown in FIG. 39, pipe element 120 not shown) oriented end-to-end within the pipe coupling 4100.

Figure 39:
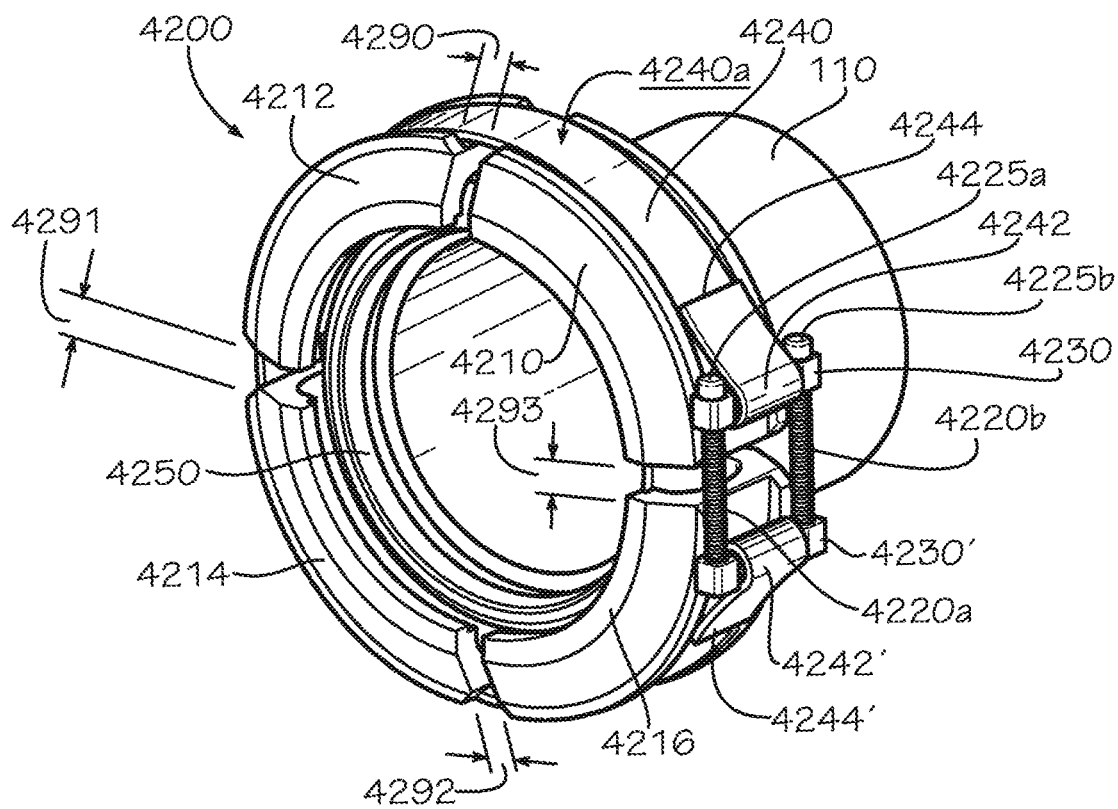
FIG. 39 is a perspective view of a pipe system constructed according to another aspect of the current disclosure, the view showing a pipe coupling of the pipe system in an untightened position.
Figure 40:
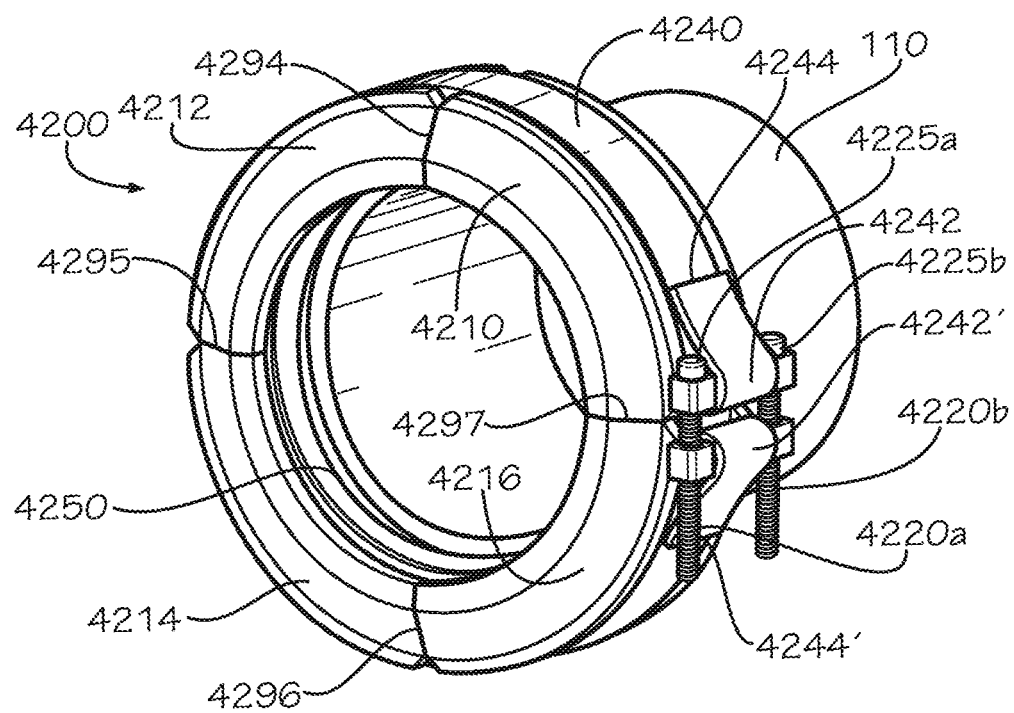
FIG. 40 is a perspective view of the pipe system of FIG. 39 showing the pipe coupling in a tightened position.
Figure 41:
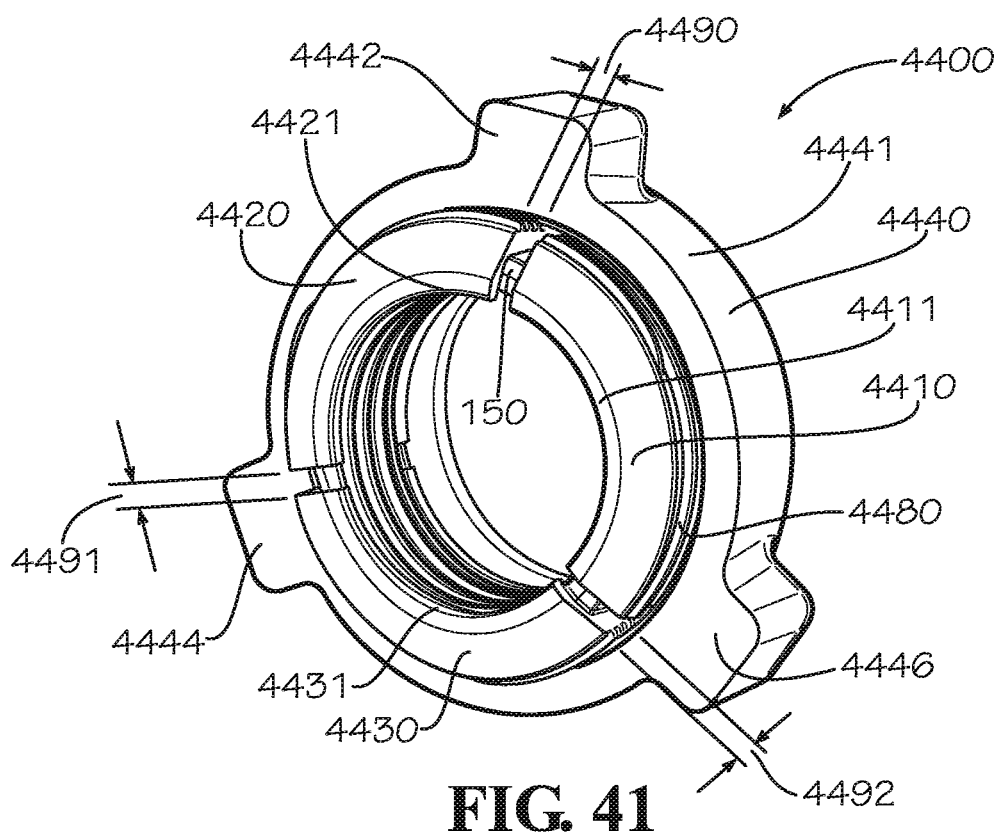
FIG. 41 is a front perspective view of a pipe coupling constructed according to another aspect of the current disclosure.
Figure 42:
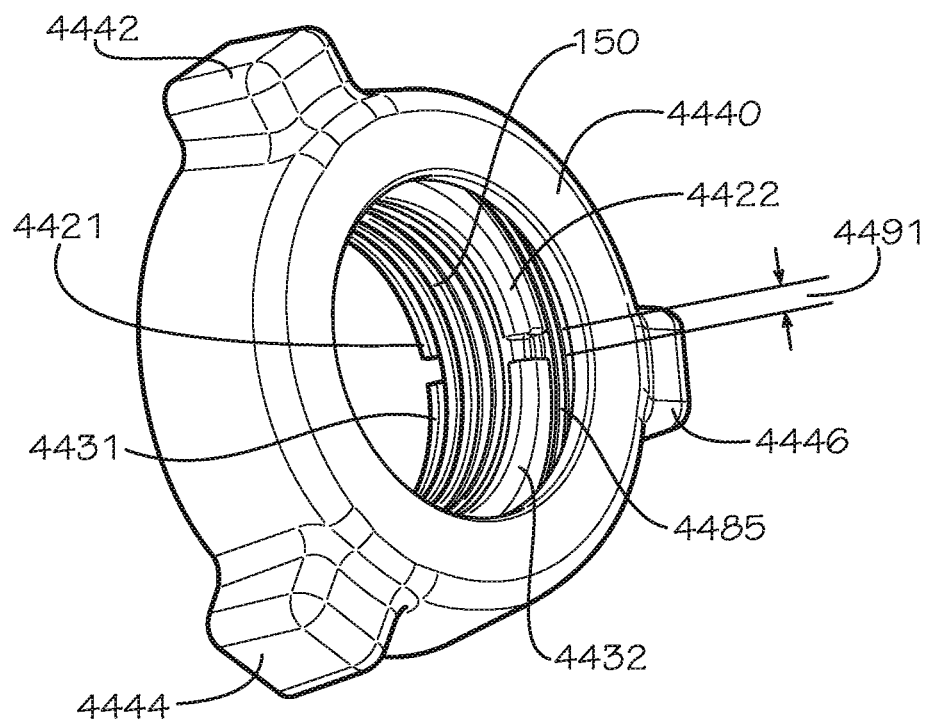
FIG. 42 is a rear perspective view of the pipe coupling of FIG. 41.
Figure 43:
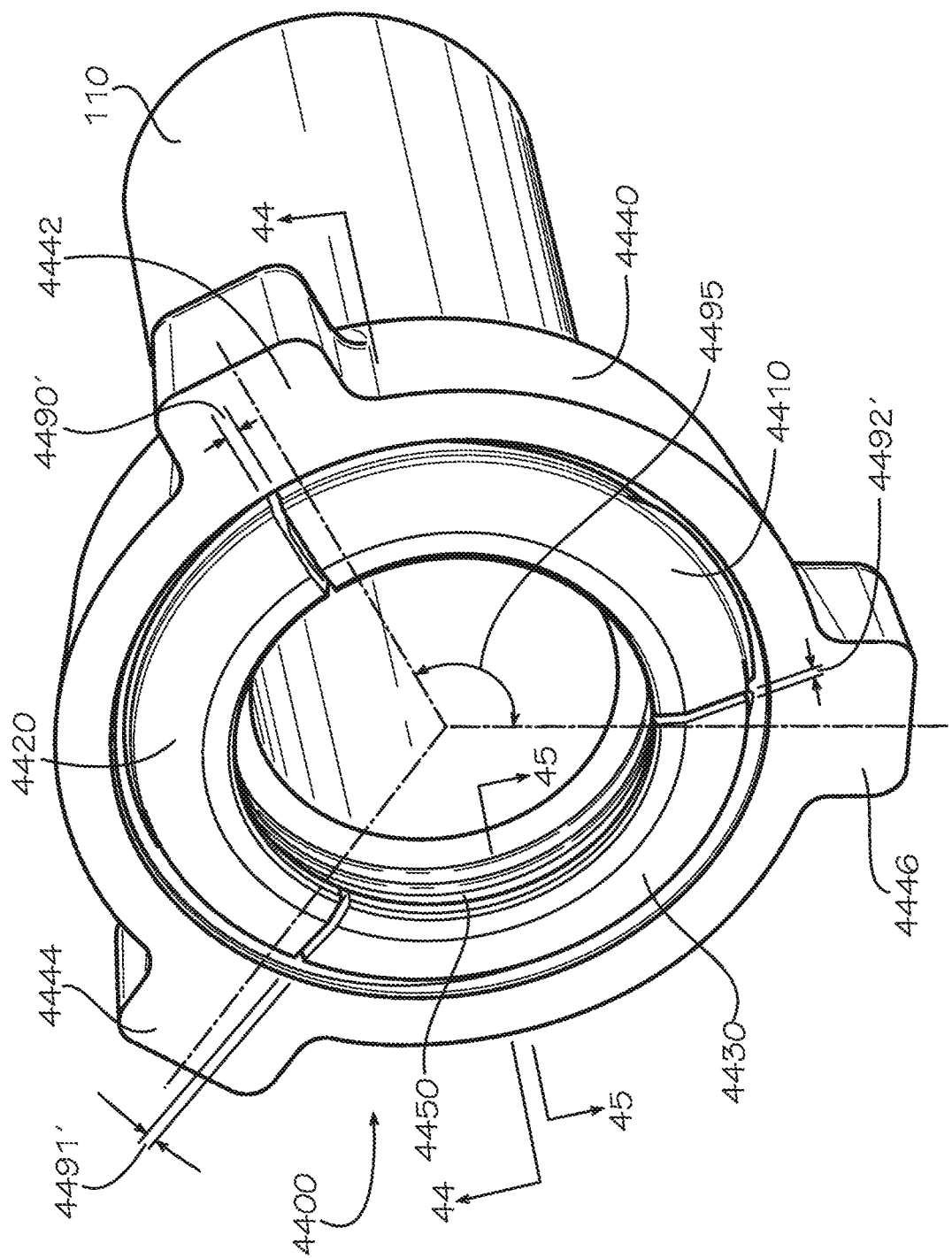
FIG. 43 is a front perspective view of a pipe system with the pipe coupling of FIG. 41 in a tightened position.

FIGS. 39-40 depict a pipe coupling constructed in accordance with another aspect of the current disclosure. In one aspect, an adjustable pipe coupling 4200 is constructed similarly to the pipe coupling 4100 in that the pipe coupling 4200 also employs use of a belt and multiple movable coupling segments, but uses a different number of coupling segments and a different securement mechanism. The pipe coupling 4200 includes four arcuate coupling segments 4210,4212,4214,4216, circumferentially spaced from one another as indicated by gaps 4290,4291,4292,4293 defined by the coupling segments 4210,4212,4214,4216. The coupling segments 4210,4212,4214,4216 have interior surfaces that define a gasket groove (not shown) receiving an annular gasket 4250. The pipe coupling 4200 also includes a belt 4240 constructed of a strip of rigid material such as metal, though the material of the belt 4240 can also be non-metallic. The belt 4240 includes an outer surface 4240a and opposed ends 4244,4244'. Bends 4242,4242' are formed into the belt 4240 proximate to the ends 4244,4244', respectively, such that the end portions of the belt 4240 contact and are permanently joined to, the outer surface 4240a using any sufficient method such as, for example and without limitation, welding, adhesives, or mechanical fastening. The belt 4240 is wrapped around the outer periphery of the coupling segments 4210,4212,4214,4216. Blocks 4230,4230', each having ends with internally-threaded bores (not shown), are passed through the loops in the belt 4240 formed at bends 4242,4242', respectively. Externally-threaded fasteners 4220a,b mesh with the internal threads of the bores in the blocks 4230,4230' to result in the assembled but untightened configuration shown in FIG. 39. The fasteners 4220a,b can include heads 4225a,b, which are configured with a hex or other recess to facilitate tightening of the fasteners 4220a,b. When the fasteners 4220a,b are tightened, the bends 4242, 4242' are drawn toward one another and result in the tightened configuration shown in FIG. 40. In this manner, the belt 4240 exerts circumferential compression upon the coupling segments 4210,4212,4214,4216, which in turn, exert such compression upon the annular gasket 4250 to effect sealing of a joint of the pipe elements 110,120 (pipe element 120 not shown) that are oriented end-to-end within the pipe coupling 4200. In a tightened configuration, the coupling segments 4210,4212 may contact each other at a joint 4294, the coupling segments 4212,4214 may contact each other at a joint 4295, the coupling segments 4214,4216 may contact one another at a joint 4296, and the coupling segments 4216,4210 may contact one another at a joint 4297.

FIGS. 41-45 depict a pipe coupling constructed in accordance with another aspect of the current disclosure. In one aspect, a twist-on adjustable pipe coupling 4400 includes three arcuate coupling segments 4410,4420,4430 having respective first axial ends 4411,4421,4431 and respective second axial ends 4412,4422,4432 (second axial ends 4422, 4432 shown in FIG. 42, second axial end 4412 shown in FIG. 44). The coupling segments 4410,4420,4430 are circumferentially spaced from one another as indicated by gaps 4490,4491,4492 defined by the coupling segments 4410, 4420,4430. The coupling segments 4410,4420,4430 each has an interior surface that defines a gasket groove receiving an annular gasket 150 (such as the gasket 150 shown in FIG. 3B) and have threads 4480 on their exterior surfaces. The pipe coupling 4400 also includes an annular collar 4440 having a circular body 4441 from which gripping lugs 4442,4444,4446 extend radially outwardly, the gripping lugs 4442,4444,4446 circumferentially spaced from one another by a predetermined angle 4495 (shown in FIG. 43). The annular collar 4440 is provided with internal threads 4485 (shown in FIG. 42), which mate with the external threads 4480 of the coupling segments 4410,4420,4430. Thus, when the pipe coupling 4400 is shipped, the annular collar 4440 can be screwed onto the coupling segments 4410,4420,4430 to hold them in place about the annular gasket 150, resulting in the configuration shown in FIGS. 41 and 42.

Figure 44:
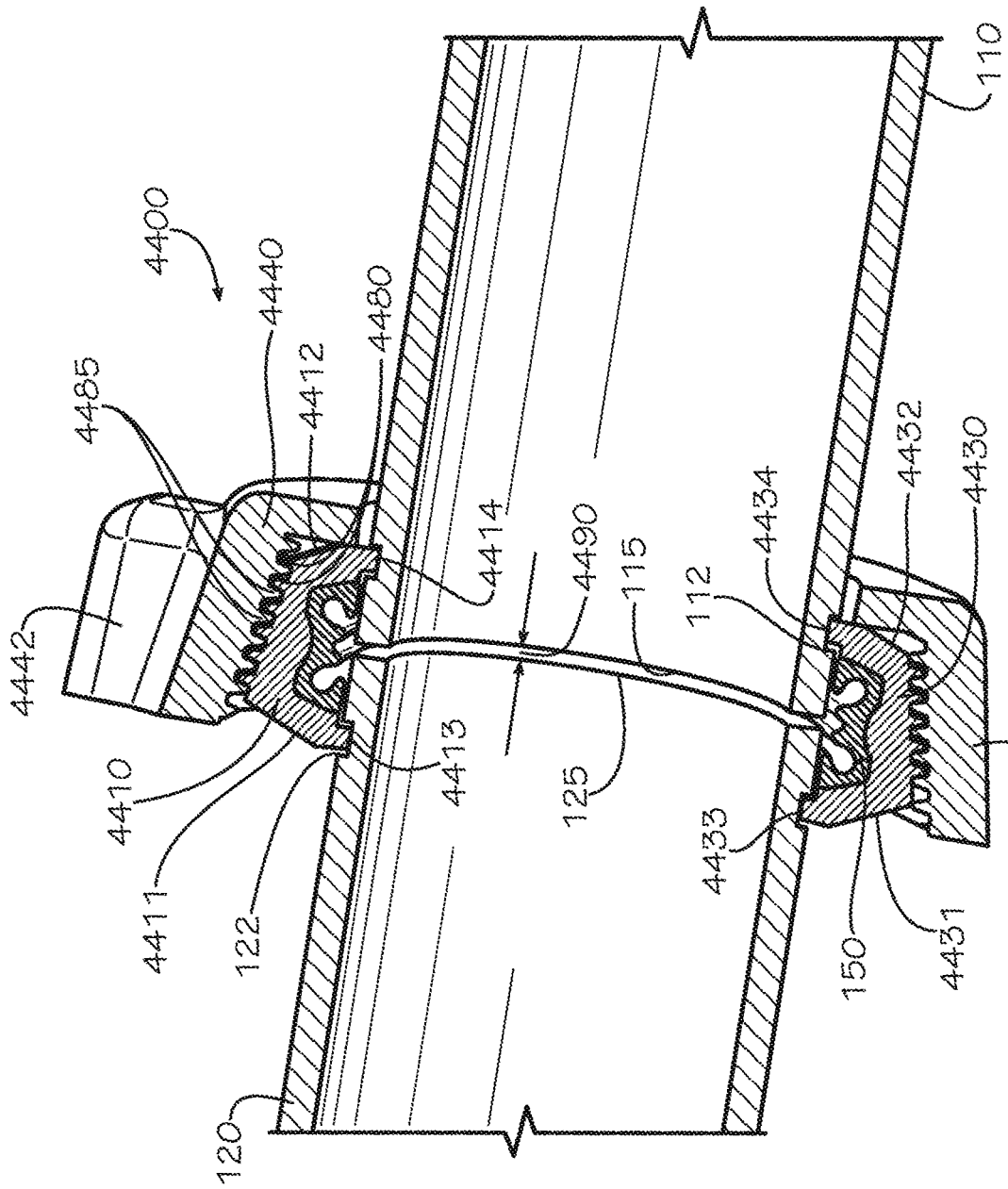
FIG. 44 is a sectional view of the pipe system of FIG. 43 taken along line 44-44 of FIG. 43 showing the pipe coupling in a tightened position.
Figure 45:
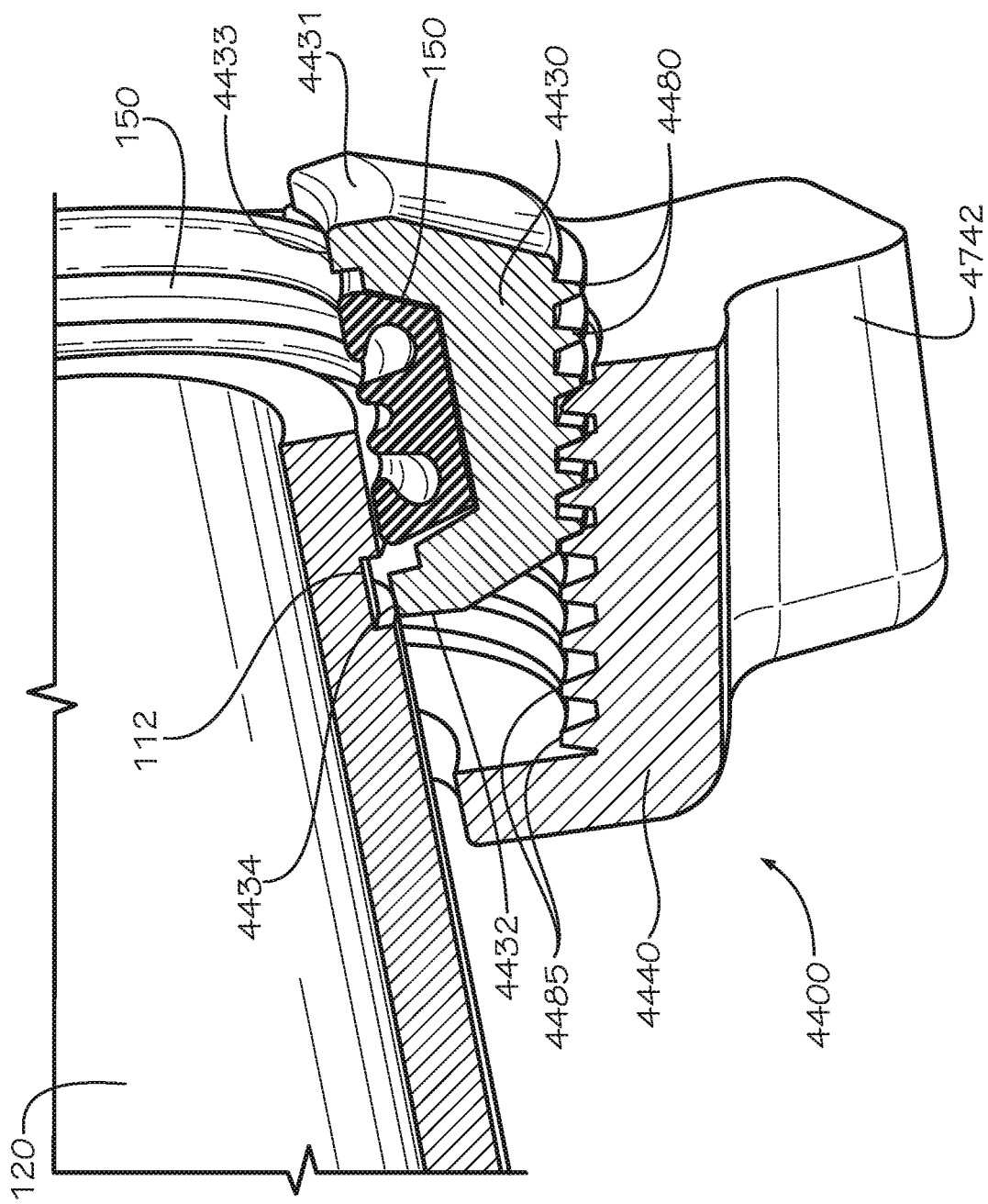
FIG. 45 is a sectional view of a portion of a pipe system with the pipe coupling of FIG. 41 in an untightened position.

FIGS. 44 and 45 illustrate the installation of the pipe coupling 4400 onto pipe elements 110,120 that have connection grooves 112,122 proximate their respective ends 115,125. The coupling segments 4410,4430 are shown housing the gasket 150, which straddles a gap 4490 remaining between the ends 115,125 of the pipe elements 110,120. Additionally, the axial ends 4410*a,b* of the coupling segment 4410 extend radially inward to terminate in respective edges 4413,4414 that align with connection grooves 122,112, respectively, similar to that shown with respect to the coupling segment 4430 in an untightened configuration of FIG. 45. Similarly, the axial ends 4431,4432 of the coupling segment 4430 extend radially inwardly to terminate in respective edges 4433,4434 that align with connection grooves 122,112, respectively, as shown in FIG. 45. Rotation of the annular collar 4440 about the coupling segments 4410,4430 results in a tightened configuration shown in FIG. 44, where the edges 4413,4414 and 4433,4434 now contact the connection grooves 122,112, thereby locking the pipe coupling 4400 onto the respective pipe elements 120,110.

Figure 46:
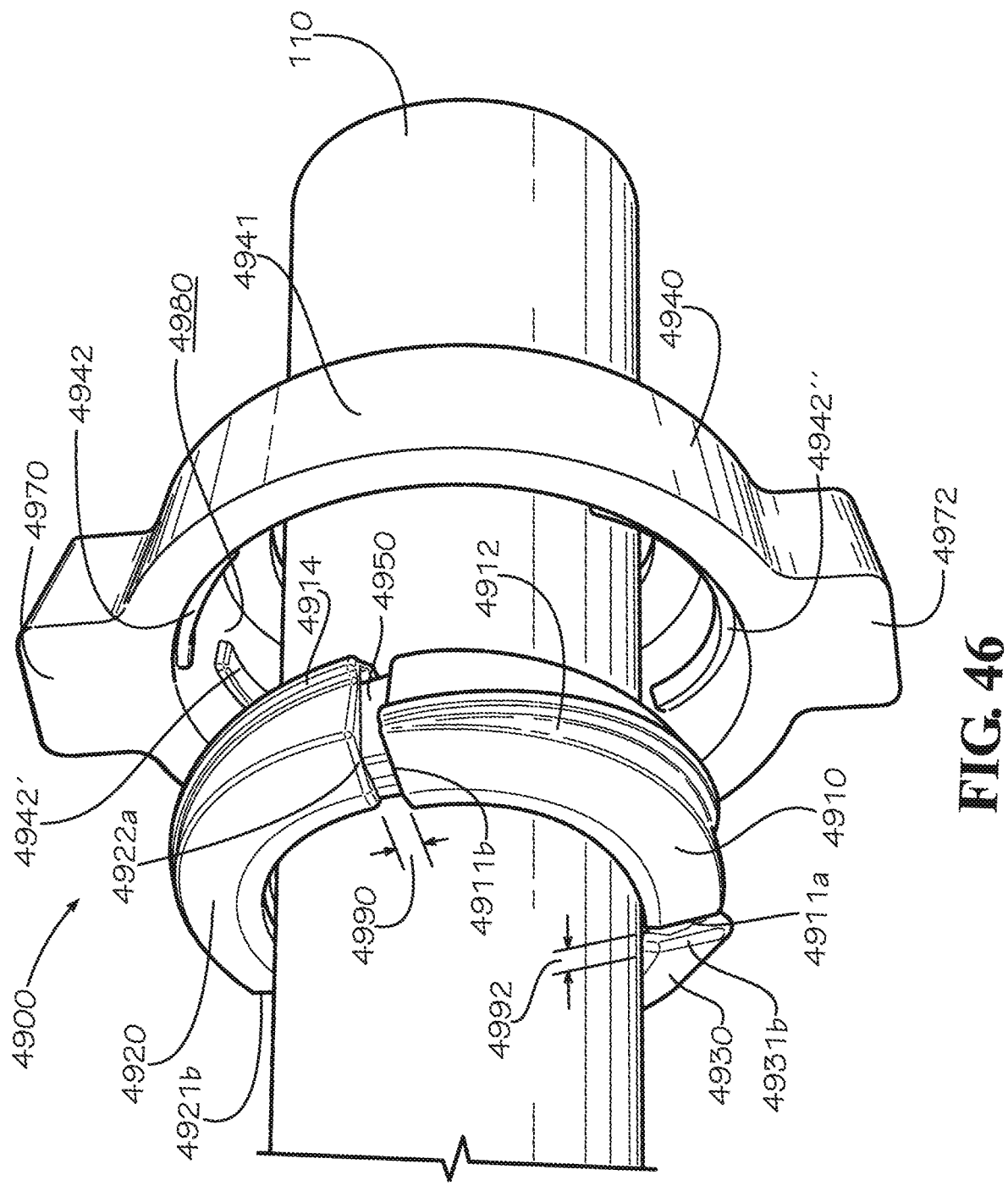
FIG. 46 is a perspective view of a pipe system constructed according to another aspect of the current disclosure.

FIG. 46 depicts a twist-on pipe coupling 4900 constructed similarly to the pipe coupling 100 shown in FIGS. 41-45, except that the pipe coupling 4900 uses different threading configurations. In one aspect, the twist-on pipe coupling 4900 includes three arcuate coupling segments 4910,4920, 4930 circumferentially spaced from one another as indicated by gaps 4990,4991,4992 (gap 4991 not shown) defined by the coupling segments 4910,4920,4930. The coupling segments 4910,4920,4930 each has an interior surface that defines a gasket groove receiving an annular gasket 4950, and have threading 4912,4914,4916 on their exterior surfaces (threading 4916 not shown). The width of the region of threading 4912 tapers from a first end 4911*a* to a second end 4911*b* of the coupling segment 4910, and the width of the region of threading 4914 tapers from a first end 4921*a* to a second end 4921*b* of the coupling segment 4920. Though not shown, coupling segment 4930 exhibits the same tapering of the region of the threading 4916 on its exterior surface from a first end 4931*a* (not shown) to a second end 4931*b*. The pipe coupling 4900 also includes an annular collar 4940 having a circular body 4941 from which gripping lugs 4970,4972 extend radially outward, the gripping lugs circumferentially spaced from one another by a predetermined angle (similarly to the angle 4495 in FIG. 43)—the angle measuring approximately 180 degrees in FIG. 46. The annular collar 4940 includes an inner surface 4980 that carries a plurality of threading ribs 4942,4942',4942", which mate with the external threading 4912,4914,4916 of the coupling segments 4910,4920,4930. Rotation of the annular collar 4940 onto the coupling segments 4910,4920,4930 compresses those segments upon the annular gasket 4950, which effects a seal at the joint between the ends of the pipes contacted by the annular gasket 4950. Prior to that tightening, the pipe coupling 4900 can be slid along a pipe such as the pipe element 110 and positioned at the joint to be sealed.

Figure 47:
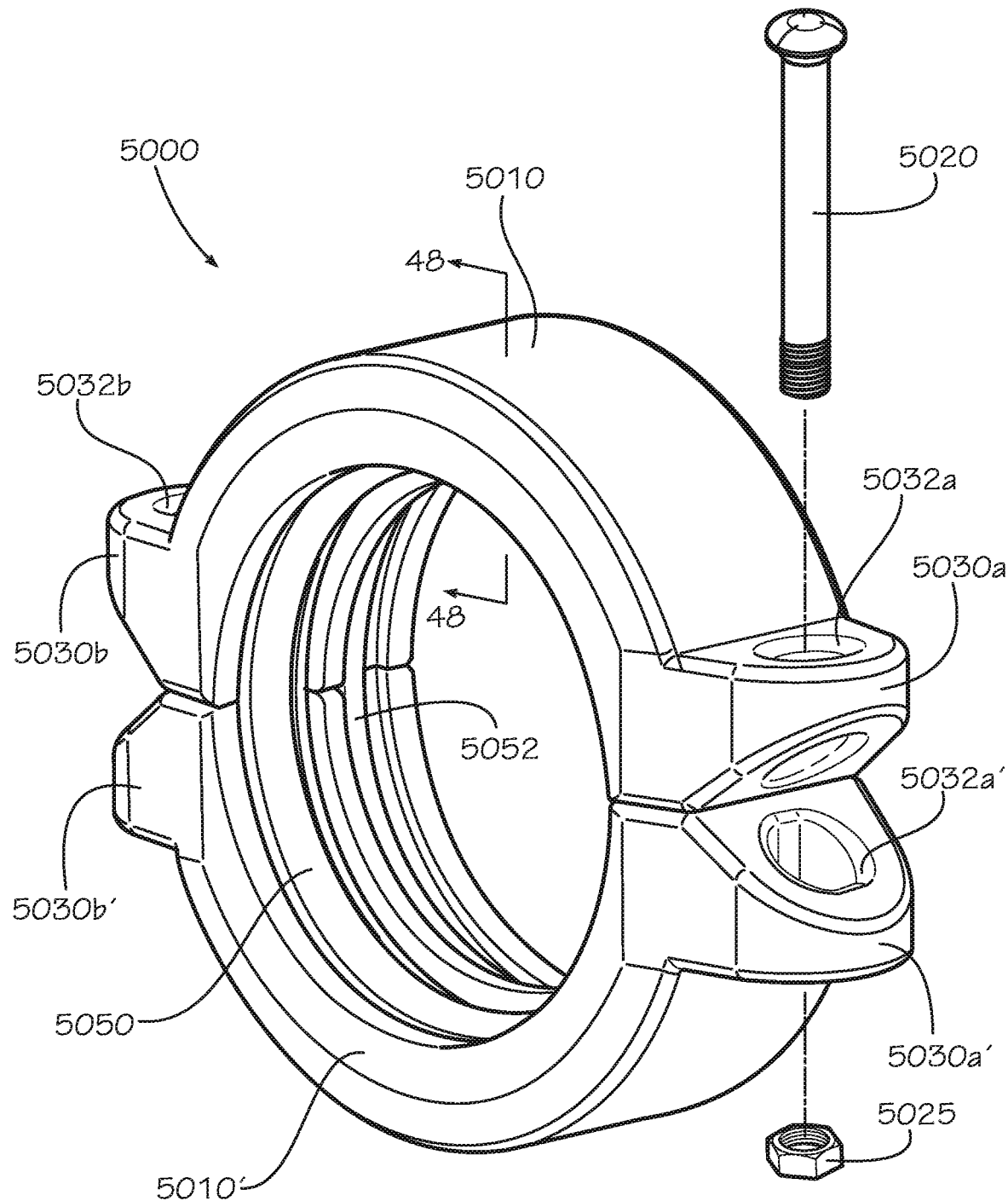
FIG. 47 is a perspective view of a pipe coupling constructed according to another aspect of the current disclosure.
Figure 48:
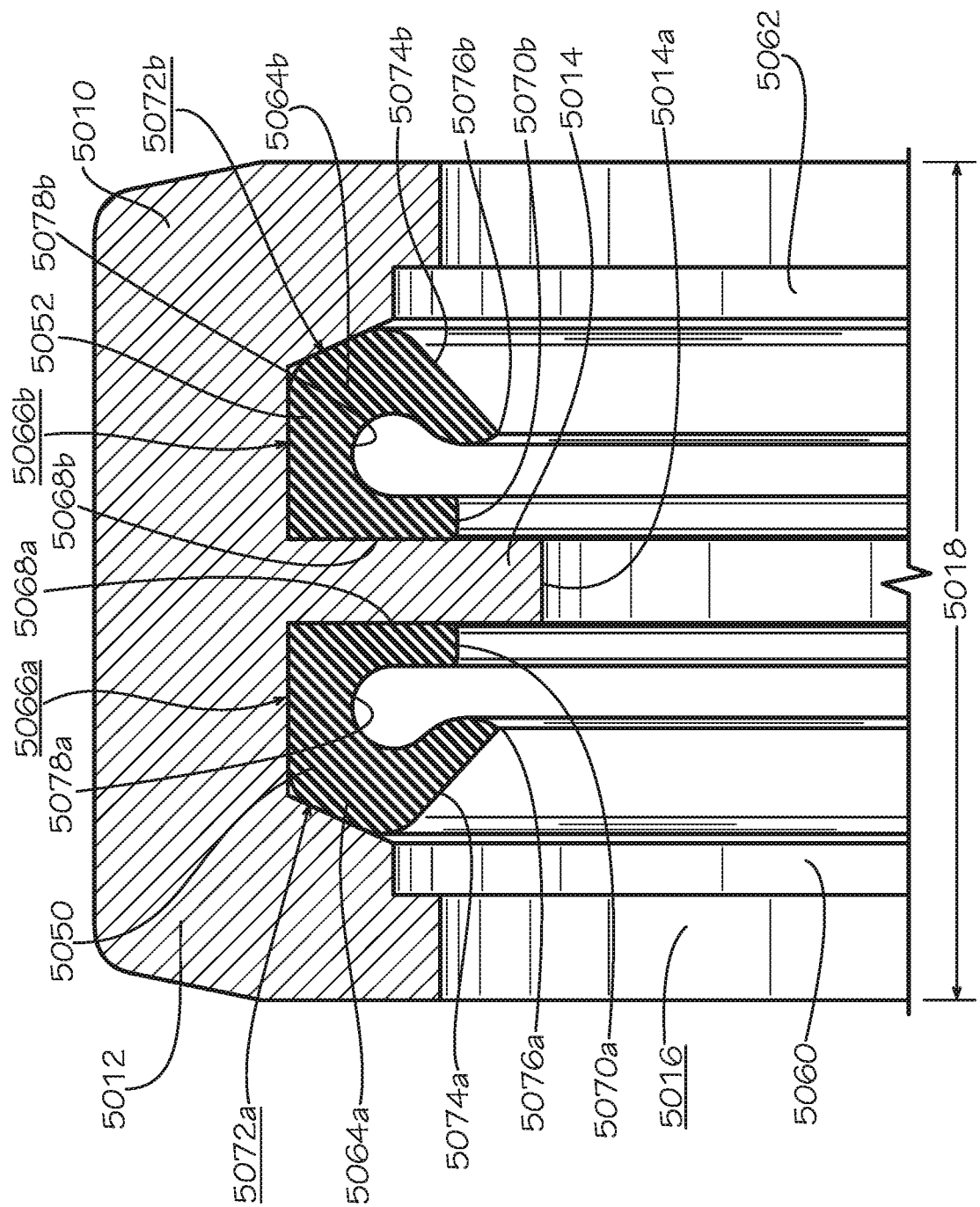
FIG. 48 is a sectional view of the pipe coupling of FIG. 47 taken along line 48-48 in FIG. 47.

FIGS. 47 and 48 depict a pipe coupling constructed in accordance with another aspect of the current disclosure. In one aspect, a coupling 5000 includes coupling segments 5010,5010', each generally arch-shaped in the same manner as the pipe coupling shown in FIGS. 1-3B. Referring to FIG. 47, the coupling segment 5010 has two ends, with a fastener pad 5030*a* protruding proximate to one end, and another fastener pad 5030*b* protruding from an opposite end. Similarly, the coupling segment 5010' has two ends, with a fastener pad 5030*a'* protruding proximate to one end, and another fastener pad 5030*b'* protruding from an opposite end. Fastener holes 5032*a,b* are defined in the fastener pads 5030*a,b*, respectively, and fastener holes 5032*a'*, b' (fastener hole 5032*b'* not shown) are defined in the fastener pads 5030*a'*, b', respectively. A fastener 5020 extends through the fastener holes 5032*a,a'* and is secured in place with a nut 5025; though not shown, a fastener identical to fastener 5020 extends through the fastener holes 5032*b,b'* and is likewise secured by a nut. The coupling segments have inner surfaces defining a gasket groove in which are seated a pair of annular gaskets 5050,5052.

FIG. 48 shows the shape of annular gaskets 5050,5052, along with the associated inner surfaces of coupling segment 5010 (which mirror those of the coupling segment 5010'). Coupling segment 5010 includes an arcuate body 5012 and a central annular rib 5014 extending radially inwardly from the body 5012 at a center of a width 5018 of the coupling segment 5010, the central annular rib 5014 having an end 5014*a*. The coupling segment 5010 includes an inner surface 5016 defining a first pipe seat 5060 and a second pipe seat 5062. Gaskets 5050,5052 are seated within the coupling segment 5010, the gasket 5050 disposed between the central annular rib 5014 and the pipe seat 5060, and the gasket 5052 disposed between the central annular rib 5014 and the pipe seat 5062. Gasket 5050 is ring-shaped and includes an annular body 5064*a* having a radially outer surface 5066*a*. The radially outer surface 5066*a* interacts with the inner surface 5016 of the coupling segment 5010. The annular body 5064*a* includes a side portion 5068*a* extending radially inwardly from the radially outer surface 5066*a*, the side portion 5068*a* contacting a surface of the central annular rib 5014 and terminating at an end 5070*a*. The annular body 5064*a* also includes an axially outer surface 5072*a* extending from the radially outer surface 5066*a*, opposite the side portion 5068*a*, at an angle with respect to the radially outer surface 5066a. Extending radially inwardly from the axially outer surface 5072a is a sealing rib 5074a, terminating in a tip 5076a. The body 5064a further defines a gasket channel 5078a axially between the end 5070a and the tip 5076a. The gasket channel 5078a is a pocket into which fluid media may flow when the gasket 5050 is in use. The gasket channel 5078a is shown as a tubular channel but can have other shapes. When placed in sealing contact with an exterior surface of a pipe element, the gasket channel 5078a allows some fluid pressure to aid in sealing the sealing rib 5074a against a pipe element, although such use is not necessary for successful sealing of the gasket 5050.

Gasket 5052 in FIG. 48 has a shape in cross-section that is a mirror reflection of the shape in cross-section of the gasket 5050. Thus, the corresponding elements of gasket 5052 have been numbered identically to those of gasket 5050 except with a "b" suffix.

Figure 49:
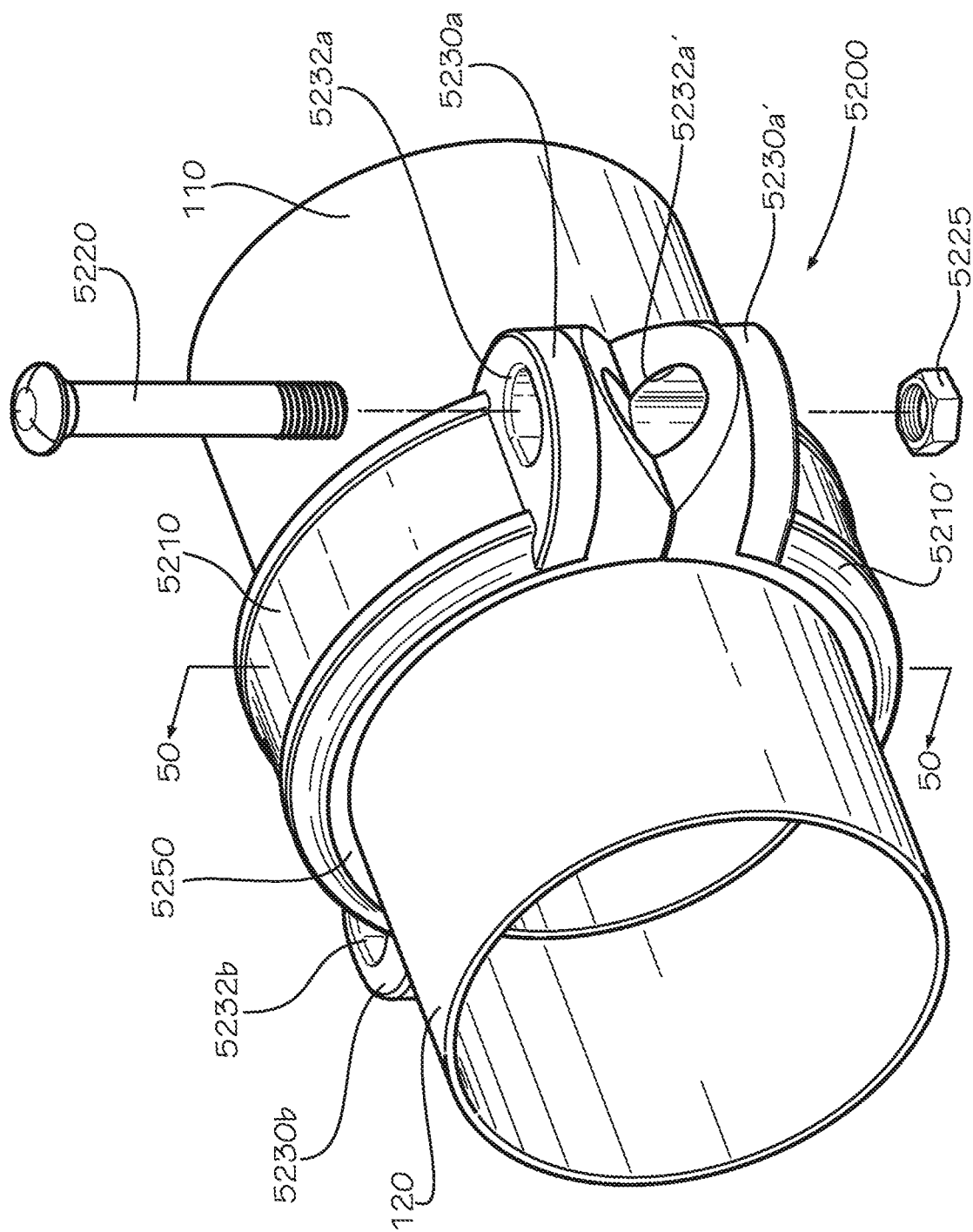
FIG. 49 is a perspective view of a pipe system constructed according to another aspect of the current disclosure.
Figure 50:
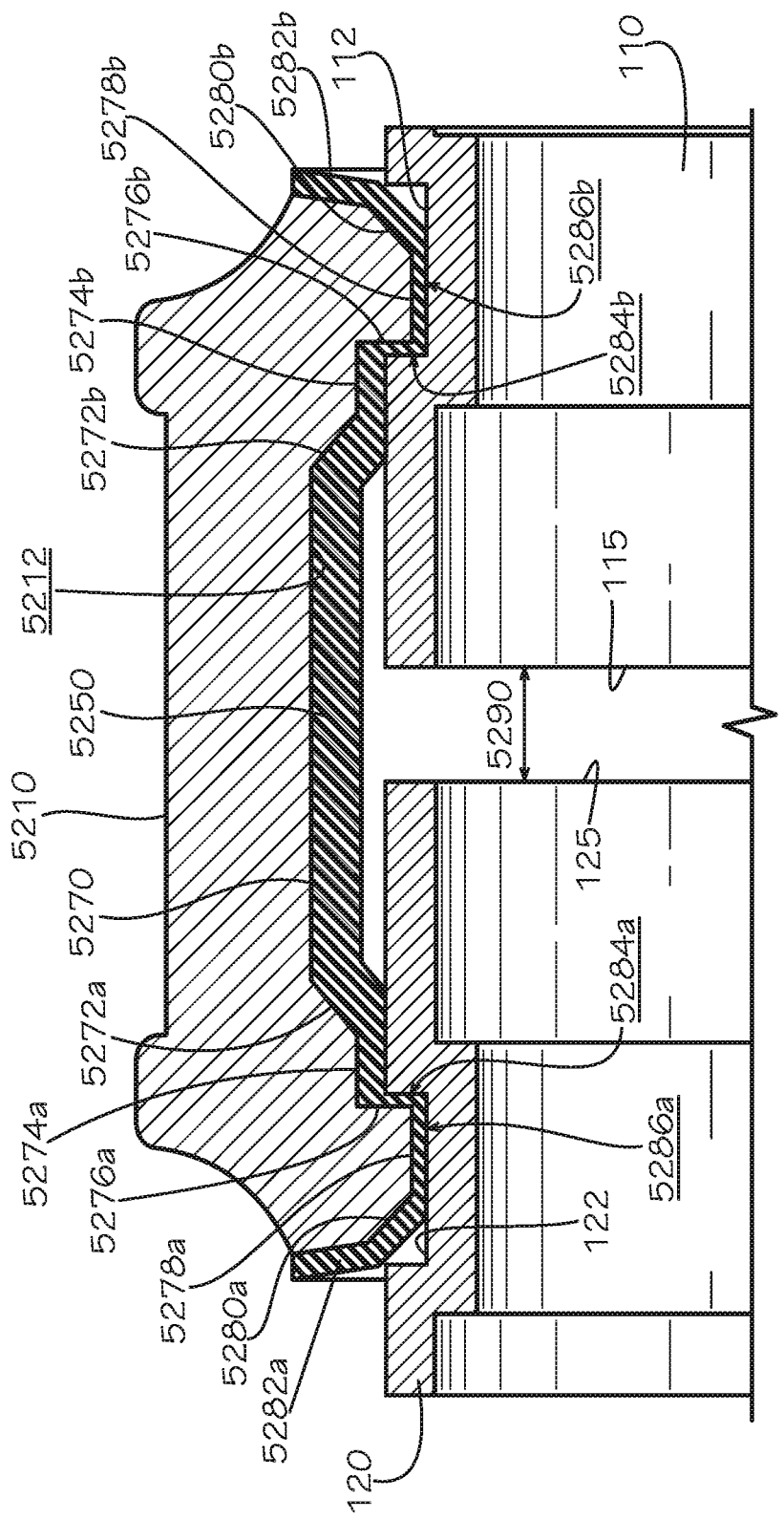
FIG. 50 is a sectional view of the pipe system of FIG. 49 taken along line 50-50 of FIG. 49.

FIGS. 49 and 50 depict a pipe coupling constructed in accordance with another aspect of the current disclosure. In one aspect, a gasketless pipe coupling 5200 includes coupling segments 5210,5210', each generally arch-shaped in the same manner as the pipe coupling 100 shown in FIGS. 1-3B. Referring to FIG. 49, the coupling segment 5010 has two ends, with a fastener pad 5230a protruding proximate to one end, and another fastener pad 5230b protruding from an opposite end. Similarly, the coupling segment 5210' has two ends, with a fastener pad 5230a' protruding proximate to one end, and another fastener pad 5230b' (not shown) protruding from an opposite end. Fastener holes 5232a,b are defined in fastener pads 5230a,b, respectively, and fastener holes 5232a', b' (hole 5232b' not shown) are defined in fastener pads 5230a', b', respectively. A fastener 5220 extends through the fastener holes 5232a,a' and is secured in place with a nut 5225; though not shown, a fastener identical to fastener 5220 extends through the fastener holes 5032b,b' and is likewise secured by a nut.

Referring to the sectional view of FIG. 50, the coupling segment 5210 includes an inner surface 5212 on which a coating 5250 adheres. The coating 5250 is molded to conform to the geometry of the inner surface 5212 and may be constructed of rubber. The coating 5250 may include a central section 5270 extending over a gap 5290 between ends 115,125 of pipe elements 110,120, respectively. The coating 5250 may further include first angled sections 5272a,b extending radially inwardly at an angle from respective ends of the central section 5270 and first straight sections 5274a,b extending axially outwardly from the angled sections 5272a,b. Shoulder sections 5276a,b extend radially inwardly from respective straight sections 5274a,b. Second straight sections 5278a,b extend axially outwardly from respective shoulder sections 5276a,b, and second angled sections 5280a,b extend radially outwardly at an angle from respective ends of the second straight sections 5278a,b. Finally, end sections 5282a,b extend radially outwardly from respective ends of the second angled sections 5280a,b. Thus, sections 5276a,b, 5278a,b, and 5280a,b, together with the portions of inner surface 5212 contacting those sections, form key sections that extend into connection grooves 122,112 of pipe elements 120,120. Upon full tightening, at least the axially inner surfaces 5284a,b and the radially inner surfaces 5286a,b respectively contact the connection grooves 122,112, thereby effecting a seal of the gap 5290 without a gasket. The gap 5290 may be effectively zero in some installations.

FIGS. 51-55 disclose various gasket configurations that may be used with one or more of the pipe coupling configurations exemplified herein.

Figure 52:
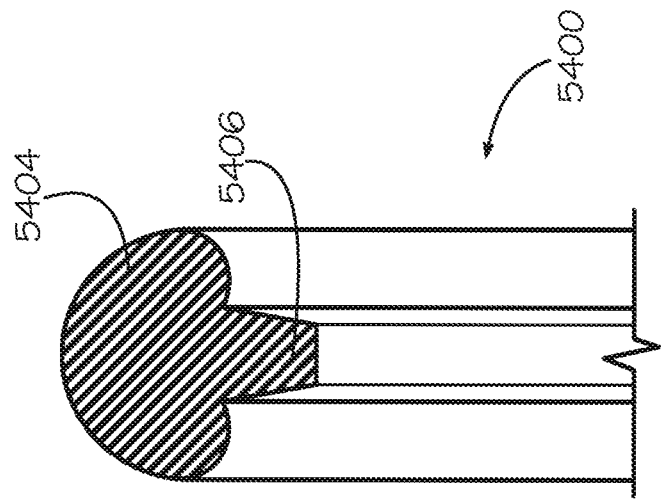
FIG. 52 is a sectional view of the gasket of FIG. 51.
Figure 51:
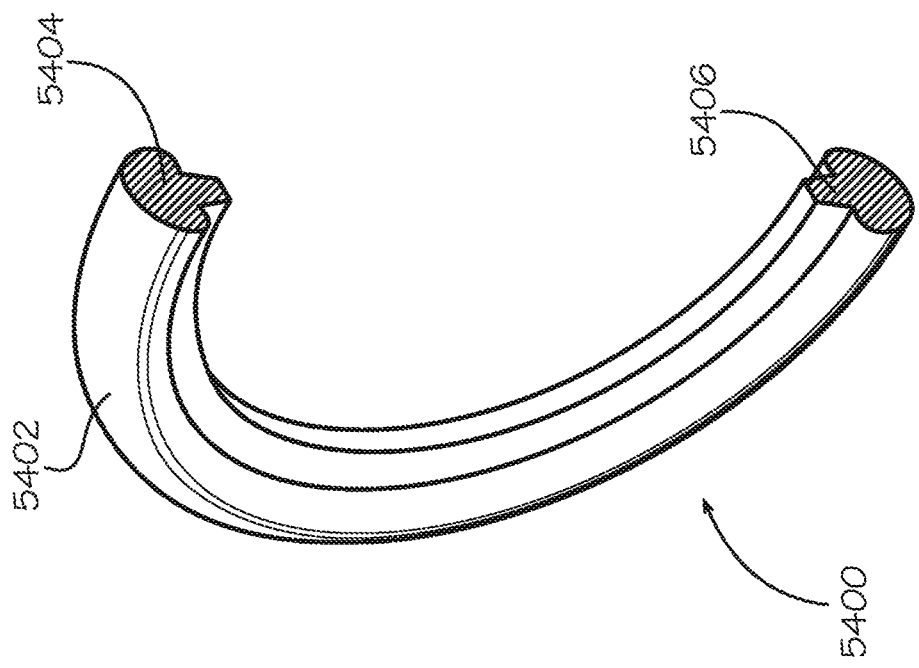
FIG. 51 is a perspective view of a semicircular portion of a gasket constructed according to another aspect of the current disclosure.

FIGS. 51 and 52 depict sections of an annular gasket 5400 constructed similarly to the gasket 2950 disclosed in FIG. 29. Gasket 5400 is shown having an annular body 5402 with a cross-sectional shape that includes a mushroom-shaped portion 5404 from which an annular tongue 5406 extends radially inwardly, the annular tongue 5406 configured to extend within a gap between pipe ends when assembled into a coupling.

FIGS. 53 and 54 depict sections of an annular gasket 5600, having an overall cross-sectional shape resembling a stylized letter "C." The gasket 5600 includes an annular body 5610 having an arcuate radially outer surface 5620. Side sections 5622a,b extend radially inwardly from ends of the arcuate radially outer surface 5620, and side sections 5622a,b terminate in respective ridges 5630a,b. Sealing ribs 5640a,b extend radially inwardly at an angle from the ridges 5630a,b, and terminate at respective ends 5650a,b. The body 5610 further defines a gasket channel 5670 extending radially outwardly from ends 5650a,b. A gasket channel 5670 is a pocket into which fluid media may flow when the gasket 5600 is in use. The gasket channel 5670 is shown as a tubular channel but can have other shapes. When placed in sealing contact with an exterior surface of a pipe element, the gasket channel 5070 allows some fluid pressure to aid in sealing the sealing ribs 5640a,b against a pipe element, although such use is not necessary for successful sealing of the gasket 5600.

Figure 55:
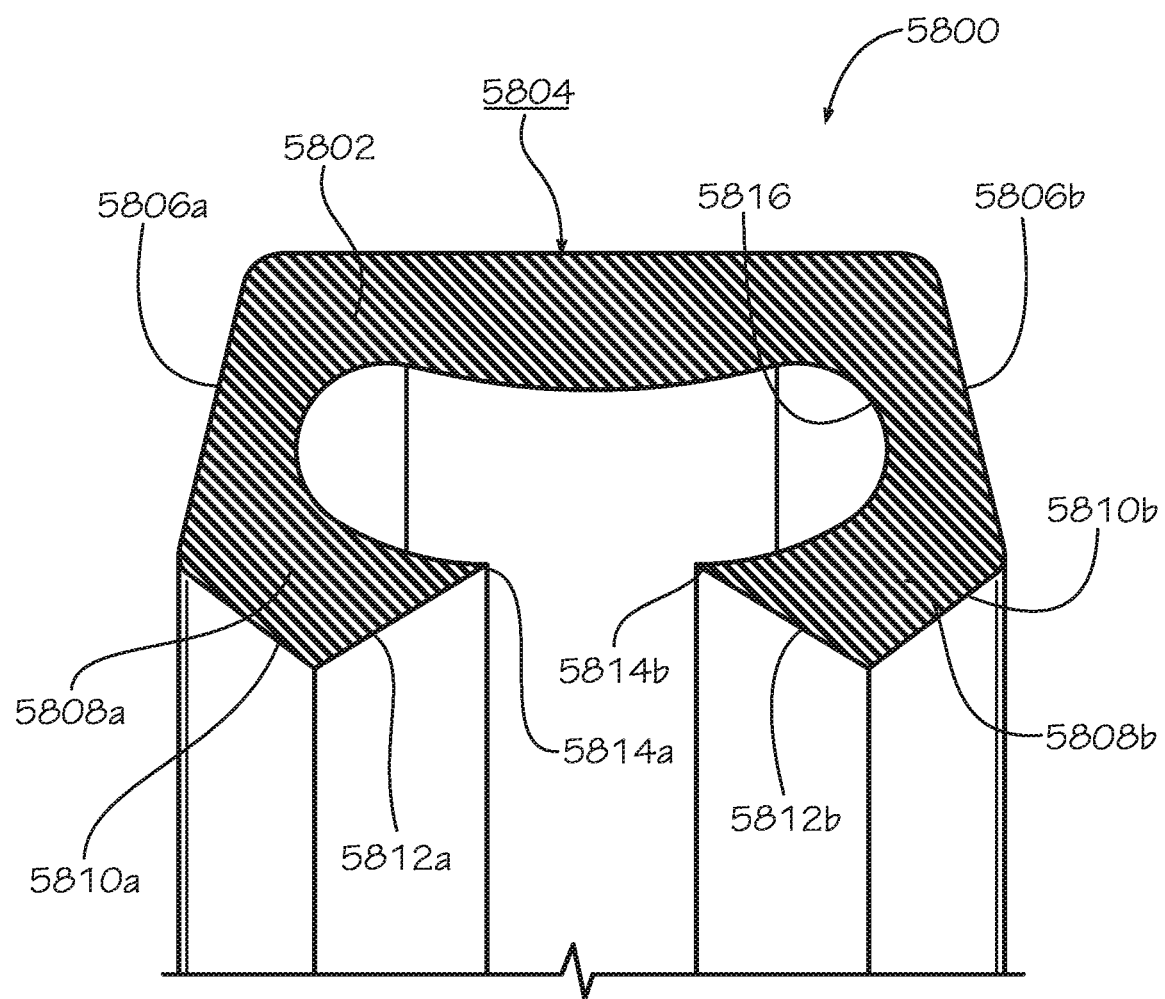
FIG. 55 is a sectional view of a gasket constructed according to another aspect of the current disclosure.

FIG. 55 depicts a cross-section of a portion of another annular gasket 5800. The gasket 5800 is ring-shaped and includes an annular body 5802 having a substantially straight radially outer surface 5804 having opposed ends from which side sections 5806a,b extend radially inwardly and axially outwardly. Sealing ribs 5808a,b extend radially inwardly from the side sections 5806a,b and are defined by first angled sections 5810a,b respectively extending radially inwardly and axially inwardly at an angle from the side sections 5806a,b and further defined by second angled sections 5812a,b respectively extending axially inwardly and radially outwardly at an angle from the first angled sections 5810a,b. The second angled sections 5812a,b terminate in respective tips 5814a,b. The body 5802 further defines a gasket channel 5816 extending radially outwardly from the tips 5814a,b. The gasket channel 5816 is a pocket into which fluid media may flow when the gasket 5800 is in use. The gasket channel 5816 is shown as a tubular channel but can have other shapes. When placed in sealing contact with an exterior surface of a pipe element, the gasket channel 5816 allows some fluid pressure to aid in sealing the sealing ribs 5808a,b against a pipe element, although such use is not necessary for successful sealing of the gasket 5800.

In one aspect, the gasket 150 comprises the geometry shown in FIGS. 56 through 58 including a pair of sealing ribs 520a,b and a plurality of tabs 550 distributed circumferentially about and protruding from the central rib 530. In cross-section, the gasket 150 defines the overall height 570 measured from the radially outer surface 515 to the sealing surfaces 526a,b of the sealing ridges 525a,b. The overall height 570 can be reduced as shown—in comparison to the overall height 570 of the gasket 150 shown in FIG. 3B. In one aspect, reducing the overall height 570 causes the gasket 150 to protrude radially outward less with respect to a given inner diameter of the gasket 150, giving the gasket 150 a lower profile to allow the coupling segments 200a,b and the pipe connection rings 300 to have smaller diameters to closer match the diameter of the pipes and thereby lower the amount of tightening necessary to engage the pipe elements 110,120.

In another aspect, reducing the overall height 570 causes the gasket 150 to protrude radially inward less than the distance shown in FIG. 3B relative to the respective inner surface 202a,b of the coupling segments 200a,b or the respective inner surfaces of the pipe connection rings 300a, b. By reducing the overall height 570 of the gasket 150 as shown, with or without the inclusion of the tabs 550, the pipe connection rings 300a,b of the pipe coupling 100 can be made to align with the connection grooves 112,122 or on the outside of the shoulders 118,128, at a point in the installation process before the gasket 150 contacts the pipe elements 110,120 or before the gasket 150 compresses significantly. In one aspect, a user may choose to rely on tactile sensation (i.e., may rely on "feel") in addition to or instead of visual clues to confirm proper alignment of the pipe coupling 100 with the pipe elements 110,120. In one aspect, tactile confirmation that both of the pipe connection rings 300a,b are simultaneously engaged in the connection grooves 112,122 or on the outside of the shoulders 118,128 can be more difficult as the gasket 150 compresses. Delaying compression of the gasket 150 can be achieved, for example and without limitation, by reducing the overall height 570 of the gasket 150.

In one aspect, as shown, each of the tabs 550 when bent individually and the plurality of tabs 550 when bent simultaneously are easily bendable in an axial direction so as not to interfere with installation of the gasket completely over the ends 115,125 of either of the pipe elements 110,120. In one aspect, an innermost diameter of the gasket 150, as measured to a radially inward facing portion of a tab surface 551, is less than the outer diameter of the pipe elements 110,120. When sliding a gasket such as the gasket 150 shown in FIG. 58 completely over the end 115,125 of either of the pipe elements 110,120, one of the respective ends 115,125 of the pipe elements 110,120 contacts an axially outward facing portion of the tab surface 551 of each of the tabs 550, causing each of the tabs 550 to bend. When the gasket 150 is slid back in the other direction, including when the pipe elements 110,120 are positioned end-to-end but with a slight gap, the tabs 550 can unbend and extend into the gap between the pipe elements 110,120. In such aspect, axially outward facing portions of the tabs 550 face axially outward facing portions of the respective ends 115,125 of the pipe elements 110,120. The tabs 550 can thus engage the ends 115,125 to separate the end 115 from the end 125 and to provide proper spacing for the pipe connection rings 300a,b to align with the connection grooves 112,122. The gap created between the end 115 and the end 125 by the tabs 550 can be at least equal to an axial thickness of the tab 550 as viewed in cross-section such as in FIG. 58. The geometry of the pipe elements 110,120 and or features of the pipe coupling 100 can be adjusted as necessary to accommodate the axial thickness of the tab 550 including additional space for any manufacturing tolerances.

In one aspect, each of the tabs 550 bends easily when the gasket 150 is slid completely over the end 115,125 of one of the pipe elements 110,120 because each of the tabs 550 is rounded on each axially outward edge. In another aspect, each of the tabs 550 bends easily in the described condition because each tab 550 is separate and distinct from every other tab 550 and therefore bending of each of the tabs 550 in an axial direction does not require the simultaneously stretching or deformation of any material adjacent to the tab 550—such as would be the case were the geometry of the tab 550 such as that shown in FIG. 58 to continue circumferentially around the gasket 150. In one aspect, when the gasket 150 is viewed along its axis, each of the tabs 550 also tapers from the central rib 530, defining taper tangent lines 555a,b extending toward a radially inward facing portion of the tab surface 551 and angled with respect to a line 557 extending through a center of the gasket. With this taper, the cross-sectional area of the tab 550 effectively decreases towards the radially inward facing portion of the tab surface 551 and therefore increasing less force is required to cause the tab 550 to bend at the radially inward facing portion of the tab surface than is required to cause the tab 550 to bend proximate to its connection to the central rib 530. In addition, because the taper on each tab 550 causes less surface area of each of the tabs 550 to contact the pipe elements 110,120, the frictional forces created when sliding the gasket 150 completely over either of the respective ends 115,125 of the pipe elements 110,120 are reduced. In one aspect, for example and without limitation, the circumferential length of the gasket including tabs 550 can be less than the circumferential length of the gasket not including tabs. In one aspect, a total of six tabs 550 are evenly spaced circumferentially around the gasket 150, where each tab 550 is spaced apart from each adjacent tab by an angle of 60°. In another aspect, a smaller quantity or a greater quantity of tabs 550 are spaced circumferentially around the gasket 150, and the tabs 550 need not be spaced evenly. In one aspect, an intersection between the tab surface 551 and a radially inward facing surface of the gasket 150 includes a radius or other fillet, reducing or eliminating any stress concentration at the intersection.

In one aspect, each of the sealing ribs 520a,b extends substantially radially inwardly and increases in thickness from a radially outside position to a radially inside position. In one aspect, each of the sealing ribs 520a,b defines an axially outer surface 521a,b extending from the radially outer surface 515 to an end of an axially outer drafted surface 522a,b, respectively. Each of the axially outer surfaces 521a,b is angled or slanted with respect to a radial direction of the gasket 150. The angle of each of the axially outer surfaces 521a,b is consistent around the circumference of the gasket 150, so that each of the axially outer surfaces 521a,b is shaped as a truncated cone. In one aspect as shown, each of the axially outer surfaces 521, a,b is angled, for example and without limitation, between about 19° and about 22° degrees with respect to a radial direction.

Each of the axially outer drafted surfaces 522a,b extends from an axially outermost edge of the gasket 150 to the corresponding sealing surface 526a,b. In one aspect, each of the axially outer drafted surfaces 522a,b may be rounded, slanted, or have any one of various other shapes in cross-section. In one aspect, such cross-sectional shapes translate to the three-dimensional shape of a cone or a paraboloid. Such shapes are truncated, as a full cone or paraboloid would not typically allow insertion of pipe elements in the gasket 150. In one aspect as shown, each of the axially outer drafted surfaces 522a,b is angled, for example and without limitation, between about 27° and about 28° with respect to a radial direction. Extending from each of the sealing surfaces 526a,b is an axially inner drafted surface 527a,b. In one aspect, each of the axially inner drafted surfaces 527a,b may be rounded, slanted, or have any one of various other shapes in cross-section. In one aspect, such cross-sectional shapes translate to the three-dimensional shape of a cone or a paraboloid. Such shapes are truncated, as a full cone or paraboloid would not typically allow insertion of pipe elements in the gasket 150. Each of the axially inner drafted surfaces 527a,b defines the termination of the sealing ridge 525a,b along an axially inward direction.

In another aspect, the gasket 150 comprises the geometry shown in FIGS. 59 through 61 including the pair of sealing ribs 520a,b and the plurality of tabs 550 distributed circumferentially about and protruding from the central rib 530. In one aspect, each of the tabs 550 is positioned axially between the sealing member 557a and the sealing member 557b. In one aspect, the overall height 570 can be further reduced as shown—in comparison to the overall height 570 of the gasket 150 shown in FIG. 3B and in comparison to the overall height 570 of the gasket 150 shown in FIG. 58. In one aspect, reducing the overall height 570 causes the gasket 150 to protrude radially outward less with respect to a given inner diameter of the gasket 150, giving the gasket 150 a lower profile to allow the coupling segments 200a,b and the pipe connection rings 300 to have smaller diameters to closer match the diameter of the pipes and thereby lower the amount of tightening necessary to engage the pipe elements 110, 120.

In another aspect, reducing the overall height 570 causes the gasket 150 to protrude radially inward by less than the distances shown in FIGS. 3B and 58 relative to the respective inner surface 202a,b of the coupling segments 200a,b or the respective inner surfaces of the pipe connection rings 300a,b.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of installing a 3-piece pipe coupling to connect a first pipe element to a second pipe element, comprising the steps of:
bringing the 3-piece pipe coupling into engagement with a first connection groove located proximate a first pipe element end of the first pipe element and with a second connection groove located proximate a second pipe element end of the second pipe element, the 3-piece pipe coupling comprising three pieces; and
tightening the 3-piece pipe coupling about the first and second pipe element ends with a fastener extending through a first fastener pad and through a second fastener pad formed at respective distal ends of two pieces of the three pieces comprising the 3-piece pipe coupling;
wherein the 3-piece pipe coupling comprises:
a first coupling segment defining a first end and a second end opposite the first end, the first end of the first coupling segment defining a first pivotal mount, and the second end of the first coupling segment defining a second pivotal mount;
a second coupling segment defining a proximal end and a distal end, the proximal end of the second coupling segment configured to pivotally connect to the first pivotal mount, and the distal end of the second coupling segment forming the first fastener pad; and
a third coupling segment defining a proximal end and a distal end, the proximal end of the third coupling segment configured to pivotally connect to the second pivotal mount, and the distal end of the third coupling segment forming the second fastener pad;
wherein the step of bringing the 3-piece pipe coupling into engagement with the first connection groove located proximate the first pipe element end and with the second connection groove located proximate the second pipe element end comprises the step of pivoting both the second coupling segment and the third coupling segment with respect to the first coupling segment until the first fastener pad and the second fastener pad abut one another;
wherein the 3-piece pipe coupling further comprises:
a first connection member extending from the proximal end of the second coupling segment, the first connection member circumferentially overlapping with the first pivotal mount of the first coupling segment; and
a second connection member extending from the proximal end of the third coupling segment, the second connection member circumferentially overlapping with the second pivotal mount of the first coupling segment; and
wherein the first pivotal mount is an upper arcuate slot formed into an arcuate rail member; and
the second pivotal mount is a lower arcuate slot formed into the arcuate rail member.

2. The method of claim 1, wherein the three pieces of the 3-piece pipe coupling comprise a first coupling segment, a second coupling segment, and a third coupling segment, and wherein the first coupling segment is disposed substantially between the second coupling segment and the third coupling segment.

3. The method of claim 1, further comprising the steps of:
bringing the 3-piece pipe coupling into engagement with a radially outer surface of a gasket; and
causing a portion of the gasket to extend into a gap defined between the first and second pipe element ends.

4. The method of claim 3, wherein the gasket defines a mushroom-shaped cross section.

5. The method of claim 1, wherein:
the first connection member comprises a first pair of bearing blocks protruding from a first exterior surface of the second coupling segment proximate the proximal end of the second coupling segment; and
the second connection member comprises a second pair of bearing blocks protruding from a second exterior surface of the third coupling segment proximate the proximal end of the third coupling segment.

6. The method of claim 5, wherein the arcuate rail member defines a third exterior surface and a support block extending radially outwardly from the third exterior surface, the support block supporting an upper rail and a lower rail, wherein the arcuate rail member is configured to permit arcuate movement of the second coupling segment along the upper rail, and configured to permit arcuate movement of the third coupling segment along the lower rail.

7. The method of claim 5, wherein:
the first pair of bearing blocks supports a first guide pin extending through the upper arcuate slot; and
the second pair of bearing blocks supports a second guide pin extending through the lower arcuate slot.

8. The method of claim 5, wherein the arcuate rail member defines an inner surface, and further comprising a gasket seated within the inner surface, the gasket configured to be positioned within a gap between opposing ends of pipe elements when the pipe elements are inserted into the 3-piece pipe coupling.

9. The method of claim 5, wherein:
the arcuate rail member defines a rail member cross-section, the rail member cross-section defining a first leg terminating in a first end configured to engage the first connection groove of a first pipe element;
the rail member cross-section further defines a second leg terminating in a second end configured to engage the second connection groove of a second pipe element; and
the rail member cross-section is configured to straddle a gasket cross-section when the 3-piece pipe coupling is in an assembled state.

10. A method of installing a 3-piece pipe coupling to connect a first pipe element to a second pipe element, comprising the steps of:
bringing the 3-piece pipe coupling into engagement with a first connection groove located proximate a first pipe element end of the first pipe element and with a second connection groove located proximate a second pipe element end of the second pipe element, the 3-piece pipe coupling comprising three pieces; and
tightening the 3-piece pipe coupling about the first and second pipe element ends with a fastener extending through a first fastener pad and through a second fastener pad formed at respective distal ends of two pieces of the three pieces comprising the 3-piece pipe coupling;
wherein:
the 3-piece pipe coupling comprises:
a first coupling segment defining a first end and a second end opposite the first end and defining a first exterior surface, the first end of the first coupling segment defining the first fastener pad, the first coupling segment further defining a first pair of bearing blocks protruding from the first exterior surface proximate the second end of the first coupling segment;
a second coupling segment defining a first end and a second end opposite the first end and defining a second exterior surface, the first end of the second coupling segment defining the second fastener pad, the second coupling segment further defining a second pair of bearing blocks protruding from the second exterior surface proximate the second end of the second coupling segment; and
an arcuate rail member along which the first coupling segment and the second coupling segment are slidably mounted, the arcuate rail member defining an upper arcuate slot and a lower arcuate slot;
the first pair of bearing blocks supports a first guide pin extending through the upper arcuate slot;
the second pair of bearing blocks supports a second guide pin extending through the lower arcuate slot; and
the step of bringing the 3-piece pipe coupling into engagement with the first connection groove located proximate the first pipe element end and with the second connection groove located proximate the second pipe element end comprises the step of moving the first coupling segment and the second coupling segment along the arcuate rail member until the first fastener pad and the second fastener pad abut one another.

11. The method of claim 10, wherein:
the arcuate rail member defines a third exterior surface and a support block extending radially outwardly from the third exterior surface, the support block supporting an upper rail and a lower rail, the arcuate rail member configured to permit arcuate movement of the first coupling segment along the upper rail and configured to permit arcuate movement of the second coupling segment along the lower rail; and
the step of bringing the 3-piece pipe coupling into engagement with the first connection groove located proximate the first pipe element end and with the second connection groove located proximate the second pipe element end further comprises the step of moving the first coupling segment along the upper rail and moving the second coupling segment along the lower rail until the first fastener pad and the second fastener pad abut one another.

* * * * *